US012598637B2

(12) United States Patent
Li et al.

(10) Patent No.: US 12,598,637 B2
(45) Date of Patent: Apr. 7, 2026

(54) UPLINK TRANSMISSION IN A NEW RADIO SYSTEM OPERATING ON UNLICENSED SPECTRUM

(71) Applicant: Apple Inc., Cupertino, CA (US)

(72) Inventors: Yingyang Li, Beijing (CN); Salvatore Talarico, Sunnyvale, CA (US); Yongjun Kwak, Portland, OR (US); Jose Armando Oviedo, Santa Clara, CA (US); Hong He, Sunnyvale, CA (US); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 17/440,678

(22) PCT Filed: Apr. 29, 2020

(86) PCT No.: PCT/US2020/030508
§ 371 (c)(1),
(2) Date: Sep. 17, 2021

(87) PCT Pub. No.: WO2020/223372
PCT Pub. Date: Nov. 5, 2020

(65) Prior Publication Data
US 2022/0183053 A1 Jun. 9, 2022

Related U.S. Application Data

(60) Provisional application No. 62/839,952, filed on Apr. 29, 2019.

(51) Int. Cl.
*H04W 4/00* (2018.01)
*H04W 74/00* (2009.01)
*H04W 74/0808* (2024.01)

(52) U.S. Cl.
CPC ..... *H04W 74/006* (2013.01); *H04W 74/0808* (2013.01)

(58) Field of Classification Search
CPC .... H04W 74/006; H04W 72/04; H04W 72/12
See application file for complete search history.

(56) References Cited

U.S. PATENT DOCUMENTS 10,206,223 B2 2/2019 Belghoul et al.
10,721,762 B2 * 7/2020 Amuru .............. H04W 74/0808
(Continued)

FOREIGN PATENT DOCUMENTS

CN 107210871 A 9/2017
CN 107734713 A 2/2018
(Continued)

OTHER PUBLICATIONS

International Search Report and Written Opinion of the International Searching Authority directed to related International Patent Application No. PCT/US2020/030508, mailed Jul. 13, 2020; 9 pages.
(Continued)

*Primary Examiner* — Shantell L Heiber
(74) *Attorney, Agent, or Firm* — Sterne, Kessler, Goldstein & Fox P.L.L.C.

(57) ABSTRACT

Systems, methods, and apparatuses disclosed herein can perform uplink (UL) transmission in new radio (NR) systems operating on an unlicensed spectrum. These systems, methods, and apparatuses can receive a downlink (DL) signal comprising information associated with listen before talk (LBT) type. These systems, methods, and apparatuses can perform the UL transmission based on the LBT type.

19 Claims, 23 Drawing Sheets

(56) References Cited

U.S. PATENT DOCUMENTS

| | | | |
|---|---|---|---|
| 10,973,050 B2 | 4/2021 | Urabayashi | |
| 2015/0045043 A1* | 2/2015 | Chou | G01S 5/12 |
| | | | 455/446 |
| 2017/0048880 A1* | 2/2017 | Anderson | H04W 72/1268 |
| 2017/0230843 A1* | 8/2017 | Ouchi | H04W 52/325 |
| 2017/0367116 A1* | 12/2017 | Li | H04W 72/23 |
| 2018/0110085 A1* | 4/2018 | Tseng | H04W 76/28 |
| 2018/0191547 A1* | 7/2018 | Mukherjee | H04W 72/0446 |
| 2019/0029040 A1* | 1/2019 | Sun | H04W 72/0446 |
| 2019/0046034 A1* | 2/2019 | Hawkes | H04L 1/1812 |
| 2019/0116616 A1* | 4/2019 | Si | H04W 72/0446 |
| 2019/0174546 A1* | 6/2019 | Jeon | H04W 74/006 |
| 2019/0261412 A1* | 8/2019 | Novlan | H04W 16/14 |
| 2019/0289614 A1 | 9/2019 | Li et al. | |
| 2020/0267694 A1* | 8/2020 | Zhang | H04W 74/0808 |
| 2021/0195639 A1* | 6/2021 | Kim | H04W 16/14 |

FOREIGN PATENT DOCUMENTS

| | | | |
|---|---|---|---|
| WO | WO 2016123568 A1 | 8/2016 | |
| WO | WO 2017/170326 A1 | 10/2017 | |

OTHER PUBLICATIONS

Intel Corporation, "Channel access mechanism for NR-unlicensed," R1-1902471, 3GPP TSG RAN WG1 Meeting #96, Athens, Greece, Apr. 7, 2019; 13 pages.

MediaTek Inc., "On Channel Access Procedure," R1-1904482, 3GPP TSG RAN WG1 Meeting #96bis, Xi'an, China, Apr. 7, 2019; 13 pages.

LG Electronics, "Initial access and mobility for NR-U," R1-1904623, 3GPP TSG RAN WG1 Meeting #96bis, Xi'an, China, Apr. 7, 2019; 21 pages.

3rd Generation Partnership Project, Technical Specification Group Radio Access Network, "Study on NR-based access to unlicensed spectrum (Release 16)," 3GPP TR 38.889 V16.0 (Dec. 2018), 2018; 119 pages.

Qualcomm Incorporated, Channel access procedures for NR unlicensed [online], 3GPP TSG RAN WG1 #96b R1-1904999, Internet <URL:https://www.3gpp.org/ftp/tsg_ran/WG1_RL1/TSGR1_96b/Docs/R1-1904999.zip>, Mar. 30, 2019.

LG Electronics, HARQ procedure for NR-U [online], 3GPP TSG RAN WG1 #96b R1-1904624, Internet <URL:https://www.3gpp.org/ftp/tsg_ran/WG1_RL1/TSGR1_96b/Docs/R1-1904624.zip>, Mar. 30, 2019.

Nokia, Nokia Shanghai Bell, Channel access and co-existence for NR-U operation [online], 3GPP TSG RAN WG1 #96b R1-1904186, Internet <URL:https://www.3gpp.org/ftp/tsg_ran/WG1_RL1/TSGR1_96b/Docs/R1-1904186.zip>, Mar. 29, 2019.

Second Office Action and Search Report directed to Chinese Application No. 202080031977.3, dated Oct. 27, 2024, with English-language machine translation attached; 14 pages.

* cited by examiner

UPLINK TRANSMISSION IN A NEW RADIO SYSTEM OPERATING ON UNLICENSED SPECTRUM

CROSS-REFERENCE TO RELATED APPLICATIONS

The present application is a U.S. National Phase of International Application No. PCT/US2020/030508, filed on Apr. 29, 2020, which claims the benefit of U.S. Provisional Patent Appl. No. 62/839,952, filed Apr. 29, 2019, all of which are incorporated herein by reference in their entireties.

FIELD

Various embodiments generally may relate to the field of wireless communications.

SUMMARY

Some embodiments can include a method of performing uplink (UL) transmission in a new radio (NR) system operating on an unlicensed spectrum. The method can include receiving, by a user equipment (UE), a downlink (DL) signal comprising information associated with a listen before talk (LBT) type, and performing, by the UE, the UL transmission based on the LBT type.

In these embodiments, the LBT type comprises can include a category 1 (CAT-1) LBT type, a category 2 (CAT-2) LBT type, or a category 4 (CAT-4) LBT type.

In these embodiments, wherein, when the LBT type is the CAT-1 LBT type, the performing can include:

determining that the UL transmission is to begin no later than T microseconds ($\mu$s) after receiving the DL signal, wherein T is a number, and performing the UL transmission at or before T $\mu$s.

In these embodiments, the T $\mu$s can be 16 $\mu$s.

In these embodiments wherein, when the LBT type is the CAT-2 LBT type, the performing can include:

determining that a duration of the UL transmission will exceed a threshold; and performing the UL transmission at T microseconds ($\mu$s) after receiving the DL signal in response to determining that the duration of the UL transmission will exceed the threshold, wherein T is a number.

In these embodiments, the T $\mu$s can be 16 $\mu$s or 25 $\mu$s.

In these embodiments, the threshold can be 584 $\mu$s.

Some embodiments can include a user equipment (UE) for performing uplink (UL) transmission in a new radio (NR) system operating on an unlicensed spectrum. The UE can include radio front end circuitry and processing circuitry. The radio front end circuitry can perform wireless communication over the unlicensed spectrum. The processing circuitry can receive a downlink (DL) signal comprising information associated with a listen before talk (LBT) type, and perform the UL transmission based on the LBT type.

In these embodiments, the LBT type comprises can include a category 1 (CAT-1) LBT type, a category 2 (CAT-2) LBT type, or a category 4 (CAT-4) LBT type.

In these embodiments, wherein, when the LBT type is the CAT-1 LBT type, the processing circuitry can:

determine that the UL transmission is to begin no later than T microseconds ($\mu$s) after receiving the DL signal, wherein T is a number; and perform the UL transmission at or before T $\mu$s.

In these embodiments, the T $\mu$s can be 16 $\mu$s.

In these embodiments, when the LBT type is the CAT-2 LBT type, the processing circuitry can:

determine that a duration of the UL transmission will exceed a threshold, and perform the UL transmission at T microseconds ($\mu$s) after receiving the DL signal in response to determining that the duration of the UL transmission will exceed the threshold, wherein T is a number.

In these embodiments, the T $\mu$s can be 16 $\mu$s or 25 $\mu$s.

In these embodiments, the threshold can be 584 $\mu$s.

Some embodiments can include a system for performing uplink (UL) transmission in a new radio (NR) system operating on an unlicensed spectrum. The system can include an access node and a user equipment (UE). The access node can provide a downlink (DL) signal comprising information associated with a listen before talk (LBT) type. The UE can perform the UL transmission based on the LBT type.

In these embodiments, the LBT type comprises can include a category 1 (CAT-1) LBT type, a category 2 (CAT-2) LBT type, or a category 4 (CAT-4) LBT type.

In these embodiments, wherein, when the LBT type is the CAT-1 LBT type, the UE is can:

determine that the UL transmission is to begin no later than T microseconds ($\mu$s) after receiving the DL signal, wherein T is a number; and perform the UL transmission at or before T $\mu$s.

In these embodiments, the T $\mu$s can be 16 $\mu$s.

In these embodiments, wherein, when the LBT type is the CAT-2 LBT type, the UE can:

determine that a duration of the UL transmission will exceed a threshold; and perform the UL transmission at T microseconds ($\mu$s) after receiving the DL signal in response to determining that the duration of the UL transmission will exceed the threshold, wherein T is a number.

In these embodiments, the T $\mu$s can be 16 $\mu$s or 25 $\mu$s.

In these embodiments, the threshold can be 584 $\mu$s.

Any of the above-described embodiments may be combined with any other embodiments (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1 graphically illustrates an exemplary time resource of multi-slot PUSCH in accordance with various embodiments;

FIG. 2 graphically illustrates another exemplary time resource of multi-slot PUSCH in accordance with various embodiments;

FIG. 3 graphically illustrates an exemplary time resource of CG PUSCH in accordance with various embodiments;

FIG. 4 graphically illustrates another exemplary time resource of CG PUSCH in accordance with various embodiments;

FIG. 5A and FIG. 5B graphically illustrates exemplary demodulation reference signal (DMRS) patterns in accordance with various embodiments;

FIG. 6 graphically illustrates an exemplary applicable LBT type for PUSCH in accordance with various embodiments FIG. 7 graphically illustrates an exemplary slot-type-dependent $N_{TA}$ determination for PUSCH transmission in accordance with various embodiments;

FIG. 8 graphically illustrates an exemplary slot-type-dependent $N_{TA}$ determination for PUSCH transmission in accordance with various embodiments;

FIG. 9 graphically illustrates an exemplary PUSCH transmission timing determination in accordance with various embodiments;

FIG. 10 graphically illustrates exemplary offsets having start positions no earlier than OS k in accordance with various embodiments;

FIG. 11 graphically illustrates exemplary offsets having start positions no later than OS k in accordance with various embodiments;

FIG. 12 graphically illustrates exemplary offsets having start positions fixed to OS k in accordance with various embodiments;

Figure 22:
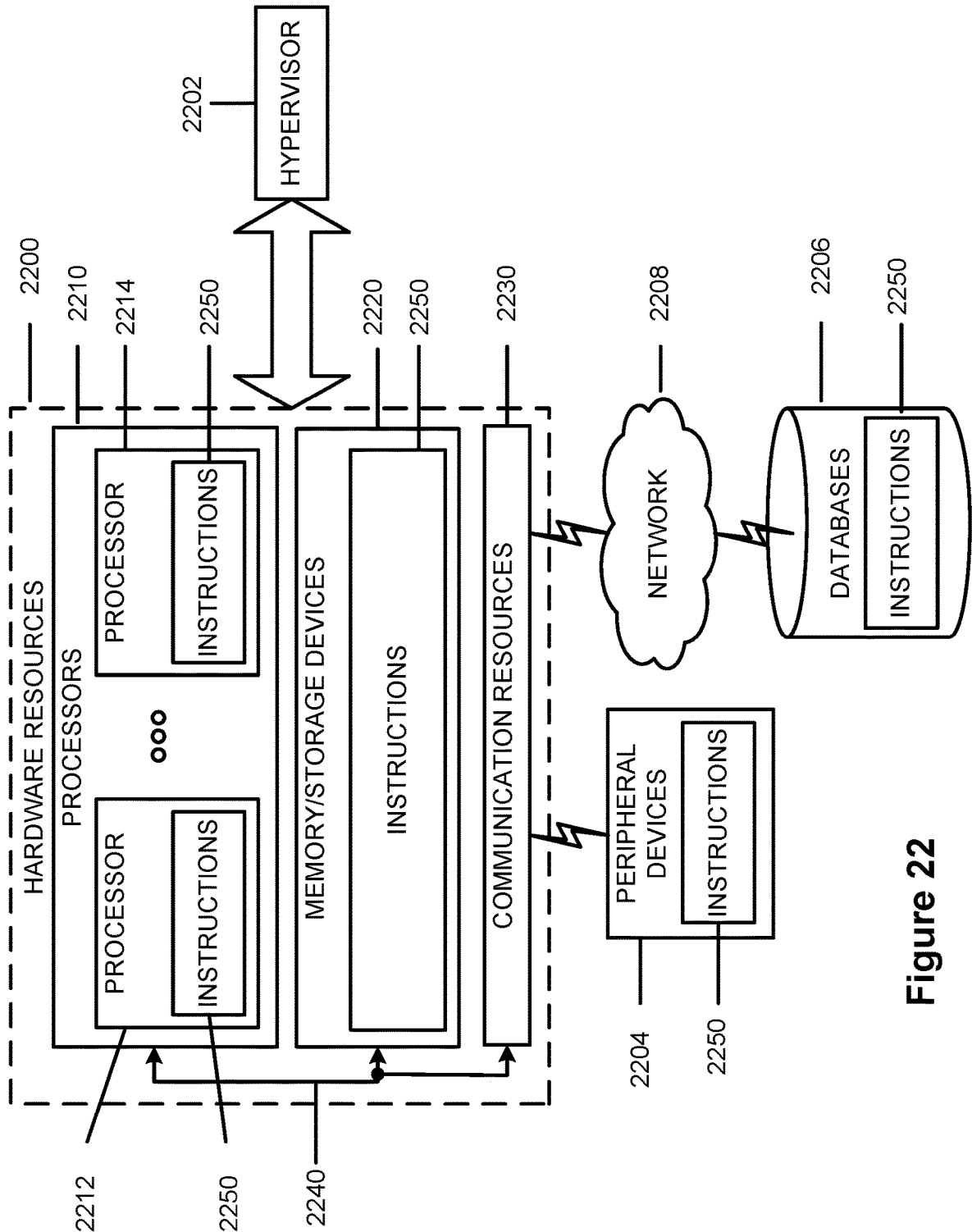
Figure 23:
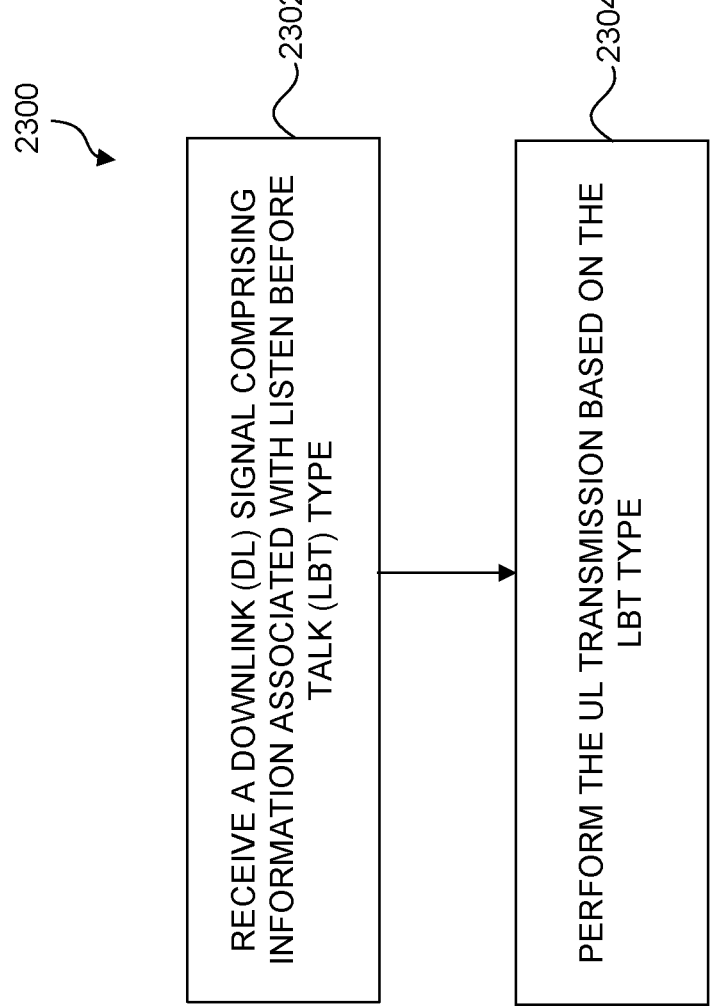

FIG. 22 is a block diagram illustrating components, according to some example embodiments, able to read instructions from a machine-readable or computer-readable medium (for example, a non-transitory machine-readable storage medium) and perform any one or more of the methodologies described herein; and FIG. 23 illustrates a flowchart for operating on an unlicensed spectrum according to some embodiments.

The present disclosure will now be described with reference to the accompanying drawings.

DETAILED DESCRIPTION OF THE DISCLOSURE

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Each year, the number of mobile devices connected to wireless networks significantly increases. Some embodiments described herein describe changes to be made to system requirements to meet these demands to keep up with the demand in mobile data traffic. For example, many critical areas that need to be enhanced to deliver this increase in traffic can include larger bandwidth, lower latency, and/or higher data rates to provide some examples.

One of the limiting factors in wireless innovation can include the availability of spectrum. To mitigate this, the unlicensed spectrum has been an area of interest to expand the availability of LTE. In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, some embodiments described herein can similarly operate in the unlicensed spectrum. To facilitate NR operation in unlicensed spectrum, these embodiments can include:

Exemplary physical layer aspects including [RAN1]:

Some embodiments can include a frame structure having single and multiple downlink (DL) to uplink (UL) and UL to DL switching points within a shared channel occupancy time (COT) with associated identified listen before talk (LBT) requirements (technical report (TR) Section 7.2.1.3.1).

Some embodiments can include a UL data channel having an extension of the physical uplink shared channel (PUSCH). These embodiments can support physical resource block (PRB) based frequency block-interlaced transmission. These embodiments can support multiple PUSCH(s) starting positions in one or multiple slot(s) depending on the LBT outcome with the understanding that the ending position is indicated by the UL grant. These embodiments do not require the UE to change a granted transport block size (TB S) for a PUSCH transmission depending on the LBT outcome. These embodiments can include PUSCH enhancements based on cyclic prefix orthogonal frequency division multiplexing (CP-OFDM). These embodiments can decide, for example, by RAN1, the applicability of sub-PRB frequency block-interlaced transmission for approximately 60 kilohertz (kHz).

Exemplary physical layer procedure(s) including [RAN1, RAN2]:

Some embodiments can include, for Load Based Equipment (LBE), channel access mechanism in compliance with the NR unlicensed spectrum (NR-U) study item (TR 38.889, Section 7.2.1.3.1). These embodiments can be performed by RAN1.

Some embodiments can include hybrid automatic repeat request (HARQ) operation. In these embodiments, NR HARQ feedback mechanisms can represent a baseline for NR-U operation with extensions in compliance with the study phase (NR-U TR section 7.2.1.3.3), for example, immediate transmission of HARQ acknowledgment/negative acknowledgment (A/N) for the corresponding data in the same shared COT and/or transmission of HARQ A/N in a subsequent COT. These embodiments can support mechanisms to provide multiple and/or supplemental time and/or frequency domain transmission opportunities. (RAN1).

Some embodiments can include scheduling multiple transmission time intervals (TTIs) for PUSCH in compliance with the study phase (TR 38.889, Section 7.2.1.3.3). (RAN1)

Some embodiments can include configured grant operation. In these embodiments, NR Type-1 and Type-2 configured grant mechanisms can be the baseline for NR-U operation with modifications in compliance with the study phase (NR-U TR section 7.2.1.3.4). (RAN1).

Some embodiments can include data multiplexing aspects (for both UL and DL) considering LBT and channel access priorities. (RAN1/RAN2).

Some embodiments maintain fair coexistence with other incumbent technologies. In these embodiments, depending on the particular band in which it might operate, some restriction can be taken into account. For instance, if operating in the 5 gigahertz (GHz) band, these embodiments can perform a LBT procedure to acquire the medium before a transmission can occur. In these embodiments, a grant based PUSCH (GB PUSCH) and configured grant based PUSCH (CG PUSCH) can exist in the same cell. In these embodiments, proper handling of these two kinds of transmission schemes can be included for efficient cell operation, especially considering grant based (GB) multi-TTI transmission and CG PUSCH with repetitions. Some embodiments can include a design of GB PUSCH transmission and CG PUSCH transmission of NR to allow efficient operating in an unlicensed spectrum.

Some embodiments, for example, in a NR system operating on an unlicensed spectrum, the impact of LBT on PUSCH transmission should be minimized since a transmission is conditional on the success of the LBT procedure. For example, GB PUSCH can be prioritized over CG PUSCH. In these embodiments, DL control information (DCI) format scheduling multi-TTI PUSCH can be designed considering overhead and blind detection. In these embodiments, direct forwarding indication (DFI) overhead can be minimized considering code block group (CBG) based CG PUSCH transmission.

Exemplary DCI Formats for Single-TTI/Multi-TTI PUSCH

NR-U can support scheduling multiple TTIs for PUSCH, for example, scheduling multiple transport blocks (TBs) with different HARQ process identifiers (IDs) over multiple slots, using a single UL grant. Based on the two DCI formats 0_0 and 0_1 defined in NR release 15 (Rel-15), some embodiments can include DCI formats scheduling multi-TTI PUSCH. In these embodiments, due to the regulation limitation on occupied channel bandwidth (OCB), the PUSCH resource allocation can be redesigned compared to Rel-15. In these embodiments, frequency resource allocation field(s) in a DCI can be changed which results in different DCI from DCI 0_0 and 0_1. In these embodiments, frequency resource allocation field(s) in a DCI can follow frequency resource allocation in NR-U. Herein, the term "single-TTI scheduling" refers to scheduling of a single TB, while, the term "multi-TTI scheduling" refers to the scheduling of multiple TBs.

In some embodiments, two new DCI formats can derived based on DCI 0_0, denoted as DCI 0_0A and 0_0B. In these embodiments, these two new DCI formats can support single-TTI scheduling and multi-TTI scheduling, respectively. In these embodiments, these two new DCI formats can be derived based on DCI 0_1, denoted as DCI 0_1A and 0_1B, which support single-TTI scheduling and multi-TTI scheduling, respectively.

In some embodiments, one new DCI format can be derived based on DCI 0_0, denoted as DCI 0_0A. In these embodiments, this new DCI format can support single-TTI scheduling. In these embodiments, two new DCI formats can derived based on DCI 0_1, denoted as DCI 0_1A and 0_1B. In these embodiments, these two new DCI formats can support single-TTI scheduling and multi-TTI scheduling, respectively. In these embodiments, DCI 0_0 can represent a fallback DCI to provide robustness of transmission.

In some embodiments, only one new DCI format can be derived based on DCI 0_0, denoted as DCI 0_0A. In these embodiments, this new DCI format can support single-TTI scheduling. In these embodiments, only one new DCI format can be derived based on DCI 0_1, denoted as DCI 0_1C. In these embodiments this new DCI format can support dynamic switching between single-TTI scheduling and multi-TTI scheduling.

In some embodiments, for example, the above mentioned DCI format 0_0B, 0_1B or 0_1C, at least some of the following fields can be included:

A new data indicator (NDI) per transport block (TB).

A redundancy version (RV) per TB, for example, 1 or 2 bits.

A single HARQ process number h, for example, the single number h can be assigned to the first TB, while the $k^{th}$ TB uses HARQ process number h+k, h=0,1, . . . ,N−1, where N represents the number of TBs predefined or configured for the multi-TTI PUSCH.

A channel access type, for example, NO LBT, an aggressive LBT, for example, one shot LBT with 25 μs clear channel assessment (CCA), or a conservative LBT, for example, CAT-4 LBT. Herein "NO LBT" represents direct transmission without LBT with a gap smaller than, for example, 16 μs.

A channel access priority class, for example, 2 bits as defined in LTE license assisted access (LAA).

A number of scheduled slots, representing the maximum number of scheduled slots, can be predefined or configured by RRC signaling. In embodiments where both DCI 0_1A and 0_1B are used, DCI 0_1B can indicate number of scheduled slots from 2 to N. In embodiments, for example, for DCI 0_1C, the number of scheduled slots can range from 1 to N, where N represents number of TBs predefined or configured in the multi-TTI PUSCH.

A start position of PUSCH, for example, LTE LAA can support 4 start positions, for example, start of orthogonal sequence (OS) 0, 25 μs after start of orthogonal frequency division multiplex symbol (OS) 0, 25 μs+timing advance (TA) after start of OS 0, and start of OS 1. In some embodiments, values can be defined for NR-U. In some embodiments, the start position of PUSCH is OS X, OS X+25 μs, OS X+25 μs+TA, and OS X+1, where X represents the start symbol, which can be indicated in a different field.

A start symbol index and end symbol index of the time resource. In some embodiments, these two indexes can be signaled separately or jointly coded.

A CBG transmission information (CBGTI), which can exists when CBG based transmission can be configured.

An indication of whether COT sharing is allowed or not for a CG user equipment (UE). In some embodiments, this field can be composed by one bit, and indicate whether COT sharing is enabled or disabled. In some embodiments, this field can be composed by ⅔ bits to indicate the length of the available shared COT, so that a CG UE can evaluate in advance whether to transmit in the shared COT or not. In these embodiments, a CG UE can perform a transmission within the shared COT when enough data to utilize those time domain resources available.

In some embodiments, channel access field in DCI 0_0A or 0_0B can be implemented using one bit, and channel access field in DCI 0_1A, 0_1B or 0_1C can be implemented using two bits. In some embodiments, channel access field in DCI 0_0A or 0_0B can indicate NO LBT or one-shot LBT, while channel access field in DCI 0_1A, 0_1B or 0_1C can indicate NO LBT, one-shot LBT or CAT-4 LBT. In some embodiments, channel access field is one bit for all DCI formats 0_0A, 0_0B, 0_1A, 0_1B, or 0_1C, and the two states indicated by the field are configured by radio resource control (RRC) signaling. In some embodiments, the channel access field in DCI 0_0A can be implemented using two bits, indicating NO LBT, one-shot LBT. or category 4 (CAT-4) LBT.

In some embodiments, both DCI 0_1A and 0_1B are used, and the two DCI can have different sizes. In some embodiments, CBGTI of DCI 0_1A can be implemented using bits to indicate whether/which CBG(s) are transmitted for the one TB. In some embodiments, CBGTI of DCI 0_1B can be implemented using M bits per TB, assuming there are N TBs in the multi-TTI PUSCH with the total number of CBGTI bits being MN bits. In some embodiments, S, M, and/or N can be predefined or configured by RRC signaling. In some embodiments, MN can be much larger than S. In these embodiments, to limit the size of DCI 0_1B, the maximum value of M can be reduced compared to S. For example, S can be 2, 4, or 8, while M can be 2 or 4.

In some embodiments, a TB scheduled by DCI 0_1A cannot be rescheduled by DCI 0_1B, a TB scheduled by DCI 0_1B cannot be rescheduled by DCI 0_1A. In some embodiments, any DCI formats including DCI 0_1A, 0_1B and others can be used to schedule any transmission or retransmission of a TB. Specifically, number of CBGTI bits is S and M per TB for DCI 0_1A and DCI 0_1B, respectively, with S being normally larger and M. In these embodiments, assuming S greater than M, the S CBGs for the TB can be grouped into M CBG groups. Each CBG group uses one CBGTI bit for the TB in DCI 0_1B. In some embodiments, a CBG with index k is grouped into CBG group mod(k,M), k=0, 1 . . . S–1. If a CBGTI bit for a TB in DCI 0_1B is ACK, then the CBGs for a TB in the CBG group corresponding to the CBGTI bit are rescheduled. Alternatively, a TB can be first divided into M CBGs which applies to DCI 0_1B, then each of the M CBGs can be divided into ceil(S/M) or floor(S/M) subgroups. Each subgroup then uses one CBGTI bit for the TB in DCI 0_1A. In some embodiments, CBG with index k from the M CBGs is divided into ceil(S/M) subgroups if k<mod(k,M), ceil(S/M) otherwise, k=0, 1 . . . M–1. If a CBGTI bit for a TB in DCI 0_1A is ACK, then the subgroup of the corresponding CBG for the TB corresponding to the CBGTI bit can be rescheduled.

In some embodiments, DCI 0_1C can be used to support dynamic switching between single-TTI scheduling and multi-TTI scheduling. In these embodiments, CBGTI of DCI 0_1C can be M bits per TB, assuming there are N TBs in the multi-TTI PUSCH, and the total number CBGTI bits is MN bits. When less than N TBs are scheduled, the number of CBGs per TB can be larger than M.

In some embodiments, for example, when only single TB is scheduled by DCI 0_1C, M CBG bits can be used for the TB. In these embodiments, there is no needed for special handling CBG grouping. In some embodiments, for example, when single TB is scheduled by DCI 0_1C, S CBGTI bits from the MN bits, S>M can be used for the TB. In these embodiments, a TB can be first divided into S CBGs, which applies to single-TTI scheduling, then the S CBGs are grouped into M CBG groups. Each CBG group can use one CBGTI bit for the TB in multi-TTI scheduling. In some embodiments, CBG with index k can be grouped into CBG group mod(k,M), k=0, 1 . . . S–1. If a CBGTI bit for a TB in multi-TTI scheduling is ACK, then CBGs in the CBG group for the TB corresponding to the CBGTI bit can be rescheduled. In some embodiments, a TB can be first divided into M CBGs which applies to multi-TTI scheduling. In these embodiments, each of the M CBGs can be divided into cell (S/M) or floor(S/M) subgroups. Each subgroup then uses one CBGTI bit for the TB in single-TTI scheduling. In some embodiments, CBG with index k from the M CBGs can be divided into cell (S/M) subgroups if k<mod(k, M), ceil(S/M) otherwise, k=0, 1 . . . M–1. If a CBGTI bit for a TB in single-TTI scheduling is ACK, then the subgroup of the corresponding CBG for the TB corresponding to the CBGTI bit can be rescheduled.

In some embodiments, for example, when n TBs are scheduled by DCI 0_1C, 1≤n≤N, the MN bits of CBGTI can be reallocated to the n TBs. In these embodiments, f(n) bits of CBGTI can be allocated to one TB. As an example, T=MN/n or T=min(MN/n, S) where S represents the maximum number of CBG used for a TB. In these embodiments, a TB can be divided into f(1) CBGs, then the f(1) CBGs can be grouped into f(n) CBG groups. In these embodiments, CBG with index k can be grouped into CBG group mod(k, f(1)), k=0, 1 . . . f(1)–1. A CBG group maps to one CBGTI bit. In some embodiments, a TB can be divided into the f(m) CBGs, then m TBs are group into f(m+1) CBGs for the case of m+1 TBs, m=1 N–1. CBG with index k can be grouped into CBG group mod (k, f(m+1)), k=0, 1 . . . f(m)–1. In these embodiments, a CBG group can be mapped to one CBGTI bit. In these embodiments, f(m+1) can be a factor of f(m).

In some embodiments, DCI 0_1C, for example, a single TB is scheduled, RV of 2 bits can be used by the TB, otherwise, RV can be 1 bit per TB.

In some embodiments, if CBG based transmission is not configured, only one DCI format, for example, DCI 0_1C can be used to dynamically switch between single-TTI scheduling and multi-TTI scheduling, otherwise, two DCI format 0_1A and 0_1B are both used.

Exemplary HARQ Feedback Using DFI

In some embodiments, for example, in further enhanced LAA (FeLAA) autonomous UL (AUL), DFI can be introduced to indicate HARQ-ACK for the PUSCH. In these embodiments, one HARQ-ACK bit can transmitted for each TB in the DFI. However, in some situations, a scheme may result in a large overhead since NR-U CG PUSCH could support CBG based transmission. In these situations, assuming 16 HARQ processes for CG, and each TB has 8 CBGs, 128 bits should be carried in DFI.

In some embodiments, N HARQ-ACK bits can be allocated for each HARQ process configured for CG, while only 1 bit can be allocated for other HARQ processes. In these embodiments, N can be a predefined or configured number by RRC signaling. N can be configured by same signaling of the configured number of CBG for a TB, or N can be configured by a separate RRC signaling. In these embodiments, the 1 bit for a HARQ processes not configured for CG is not used to trigger transmission or retransmission of a grant based PUSCH, but it can be a piece of information used in contention window size (CWS) adjustment. That means, even if GB PUSCH is also CBG based, only 1 bit is allocated in DFI for overhead reduction.

In some embodiments, DFI in NR-U can match to the size of a DCI with larger size, for example, DCI 0_1B or 0_1C. Specifically, DFI in NR-U can match to the size of a DL DCI with a larger size.

In some embodiments, HARQ processes for GB PUSCH and CG PUSCH can be divided into X subset where X is greater than 1. In these embodiments, each subset of HARQ processes can be mapped to a separate DFI to, for example, reduce the size of a DFI.

In some embodiments, HARQ processes configured for CG can be divided into X subsets, where X is greater than 1. In these embodiments, each subset of HARQ processes can be mapped to a separate DFI. In a DFI, for the corresponding subset of HARQ process configured for CG, N HARQ-ACK bits can be allocated for each HARQ process. While, for all other HARQ processes not belonging to this subset, regardless of whether configured for CG or not, 1 bit HARQ-ACK per HARQ process can be included. In these embodiments, N can be a predefined or configured number by RRC signaling. In these embodiments, N be configured by same signaling of the configured number of CBG for a TB, or N can be configured by a separate RRC signaling. In these embodiments, the 1 bit per HARQ process can be used in CWS adjustment. For HARQ processes configured for CG, UE can refer to this 1 bit for the new transmission or retransmission. For example, assuming this 1 bit per HARQ process is generated as NACK, if at least one CBG is erroneous, the UE could stop the ongoing repetition PUSCH transmission of the related HARQ process when this 1 bit is ACK.

In some embodiments, CBG grouping can be applied to reduce number of HARQ-ACK bits for each HARQ process configured for CG. Assuming configured number of CBG is S for a TB, and S CBGs needs to be grouped into N CBG groups. In these embodiments, N is a predefined or configured number by RRC signaling. In these embodiments, N can be configured by the same signaling of the configured number of CBG for a TB, or N can be configured by a separate RRC signaling. Assuming number of CBGTI bits per TB is different for single-TTI scheduling and multi-TTI scheduling, N can be equal to the smaller number of CBGTI bits per TB between single-TTI scheduling and multi-TTI scheduling. One HARQ-ACK bit for each CBG group can be included in DFI. Preferably, CBG with index k is grouped into CBG group mod (k, N), k=0, 1 . . . S−1. If one bit for a CBG group of a TB is ACK in DFI, then ACK for all CBGs in the CBG group, otherwise, a bundled NACK is signalled by DFI for the CBGs in the CBG group.

In some embodiments, CBG (re)-transmission can enabled for CG. In this case, 8 bits for CBGTI are carried in the CG UCI, and based on configuration only the first or last N (0, 2, 4, 6, 8) carry useful information, while the others can be interpreted as padding bits.

Exemplary Time Resource of Multi-Slot PUSCH

In NR-U, a UE cannot always get the channel when a PUSCH is triggered due to limitation of LBT. Consequently, a method of reducing the attempts of LBT can be beneficial.

Figure 1:
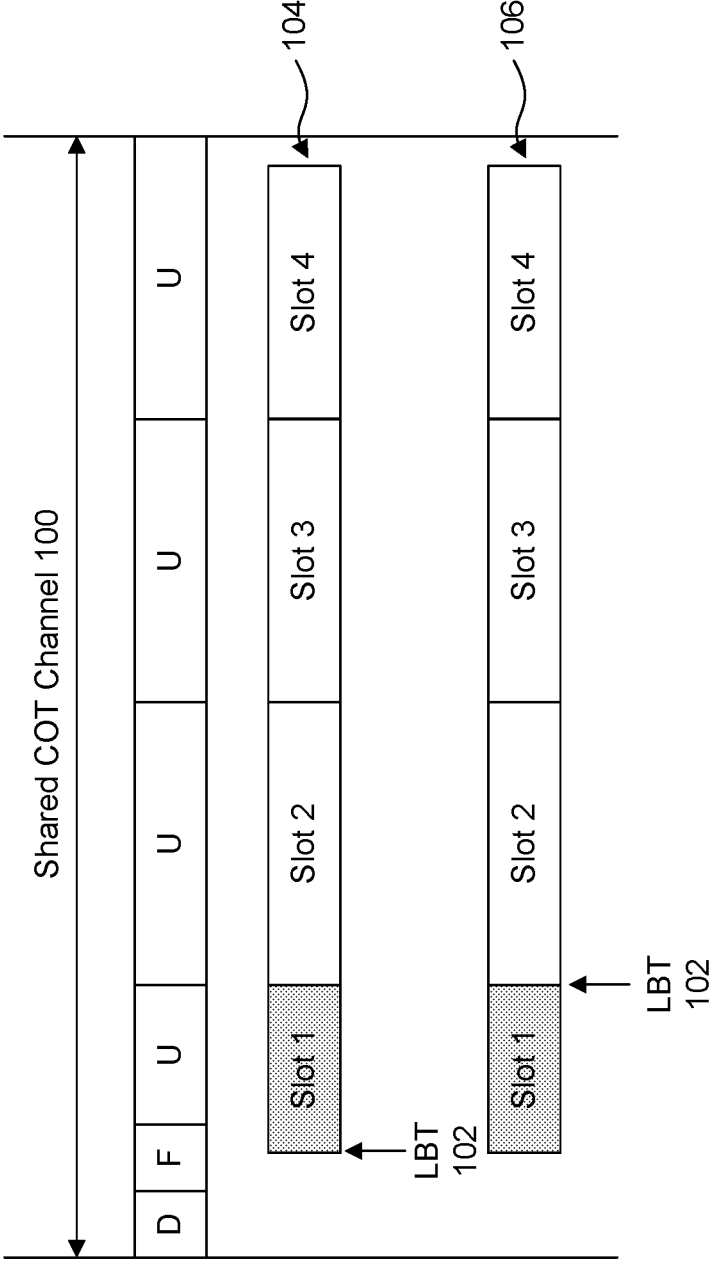

FIG. 1 graphically illustrates an exemplary time resource of multi-slot PUSCH in accordance with various embodiments. As illustrated in FIG. 1, for a grant based multi-slot PUSCH, once a UE occupies a shared COT channel 100 by successfully performing a LBT 102, the UE can transmit continuously in slots 1 through 4. In the exemplary embodiment illustrated in FIG. 1, communication through the shared COT channel 100 can be in accordance with a frame structure having shared downlink (DL) burst having slots, denoted by D in FIG. 1, and shared uplink (UL) burst having having UL slots, denoted by U in FIG. 1, separated by gap denoted by F in FIG. 1. Assuming information on a start symbol index and an end symbol index is indicated, these two pieces of information can be signaled separately or jointly coded. As illustrated in FIG. 1, in the first slot for the channel occupation, the UE can follow the start symbol indicated, while the last symbol in the first slot is last symbol of the slot, for example, symbol 13. In the last slot for the channel occupation, the UE can follow the end symbol indicated, while the first symbol in the last slot is symbol 0. For any middle slot(s) that exist, they are starting from symbol 0 and ending at symbol 13. In some embodiments, if the UE passes LBT 102 in a slot, then the UE can transmit continuously in slots 1 through 4 as highlighted by 104 in FIG. 1. In some embodiments, if the UE fails to pass LBT 102 in a slot, the UE can try LBT 102 again in the next slot as highlighted by 106 in FIG. 1. Preferably, as illustrated in FIG. 1, the UE can try LBT 102 at symbol 0 of the next slot. For example, as highlighted by 106 in FIG. 1, the UE fails to pass LBT 102 in slot 1, indicated by shading in FIG. 1, then the UE can try LBT 102 at the next slot 2. In some embodiments, within a slot, a UE can attempt to perform LBT 102 in multiple occasions, for example, a UE can attempt LBT 102 in symbol 0, 7 as follows: if LBT 102 succeeds at symbol 0, then the rest of the slot can be used to transmit a TB. However, if it fails, a UE can attempt LBT 102 at symbol 7, and if it succeeds the transmission can be either punctured or rate matched in the remaining 7 symbols of the slot.

In some embodiments, a UE can be configured to attempt LBT 102 on different occasions through DCI signaling or higher layer signaling. In some embodiments, a UE can start on a specific starting position, for example, not necessarily at the slot boundary.

Figure 2:
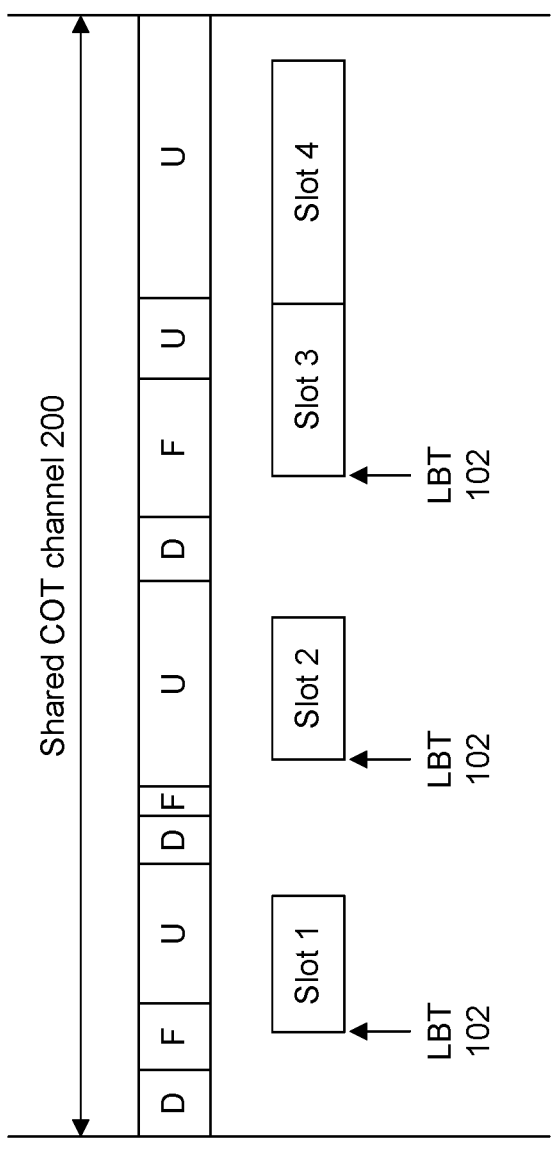

Inside a next generation NodeB's (gNB's) initiated shared COT with multiple DL to UL and UL to DL switching points, the UL symbols may not be continuous. For example, FIG. 2 graphically illustrates another exemplary time resource of mult-slot PUSCH in accordance with various embodiments. In some embodiments, as illustrated in FIG. 2, for a grant based multi-slot PUSCH, in the first slot of the multi-slot PUSCH in a shared UL burst, the start symbol in the first slot is determined by the start symbol indicated by DCI. In some embodiments, for example, where the next few slots are full UL slots, the UE can continue UL transmission in the consecutive UL slots. In the last slot of the multi-slot PUSCH in a shared UL burst, the UE can stop PUSCH transmission at the end symbol indicated by DCI. In some embodiments, if UE fails to pass LBT 102 in a slot, for example slot 1, the UE can to try LBT 102 again in the next slot, for example slot 2 followed by slot 3 if LBT 102 fails in slot 2. Preferably, as illustrated in FIG. 2, the UE can try LBT 102 at symbol 0 of the next slot if the next slot is a full UL slot. In some embodiments, within the shared COT channel 200 of the gNB, the UE can attempt to perform LBT 102 in multiple occasions within the shared resources, for example, a UE can attempt LBT 102 in symbol 0, 7 of each shared slots: such that if LBT 102 succeeds at symbol 0, then the rest of the slot can be used to transmit a TB. However, if LBT 102 fails, a UE can attempt LBT 102 at symbol 7, and if it succeeds the transmission can be either punctured or rate matched in the remaining 7 symbols of the slot. This same process can be applied to all the remaining UL slots within a shared COT In some embodiments, a UE can be configured to attempt LBT 102 on different occasions through DCI signaling or higher layer signaling. In some embodiments, a UE might be configured to start on a specific starting position, which is not necessarily at the slot boundary.

Notice that the above concepts can be equally applicable also in the case of multiple DL/UL switching points.

In some embodiments, the number of slots or mini-slots for a multi-slot PUSCH can be joint coded with PUSCH mapping type, K2 and start and length indicator value (SLIV). In these embodiments, the combinations of PUSCH mapping type, K2, SLIV and the number of slots can be configured by radio resource control (RRC signaling and dynamically indicated by DCI. The same overhead in the DCI can be used as in Rel-15. Alternatively, larger number of combinations, for example, more bits can be used to indicate a combination in the DCI for better flexibility.

In some embodiments, the number of TTIs for a multi-TTI PUSCH can be separate or jointly coded with PUSCH mapping type, K2 and SLIV. A TTI is defined as a time period equal to the duration of the SLIV. More specifically, PUSCH transmission over multiple mini-slots or slots can be consecutive in the time domain. The starting symbol in SLIV can be used to indicate the starting symbol in the first slot and the last symbol is determined based on a combination of the starting symbol in SLIV, length in SLIV, and the number of slots/mini-slots. Note that the applicable combinations of PUSCH mapping type, K2, SLIV and number of TTIs can be configured by RRC signaling and dynamically indicated by DCI. A TTI is restricted within a slot, or a TTI can be across slot boundary. If a TTI is within a slot, the last TTI could have a shorter length that the duration of the SLIV. Alternatively, the second last TTI and the last TTI can be merged and counted as a single longer TTI.

Time Resource of CG PUSCH

In NR-U, a UE cannot always get the channel when a PUSCH is triggered due to limitation of LBT. In some embodiments, assuming a high layer configures the slots for CG PUSCH, for example, there can be an N-bit bitmap. In these embodiments, a slot mapped to a '1' in the bitmap can be used for CG PUSCH transmission. In some embodiments, the bitmap can be 40 bits long independently of the subcarrier spacing. In some embodiments, for time domain resources that coincide with the discovery reference signal (DRS) occasions, even if the UE can be configured to perform CG transmission, the UE is not allowed to attempt CG, and the UE skips those resources. In some embodiments, the numerology followed for the interpretation of the bitmap is that configured for PUSCH.

Figure 3:
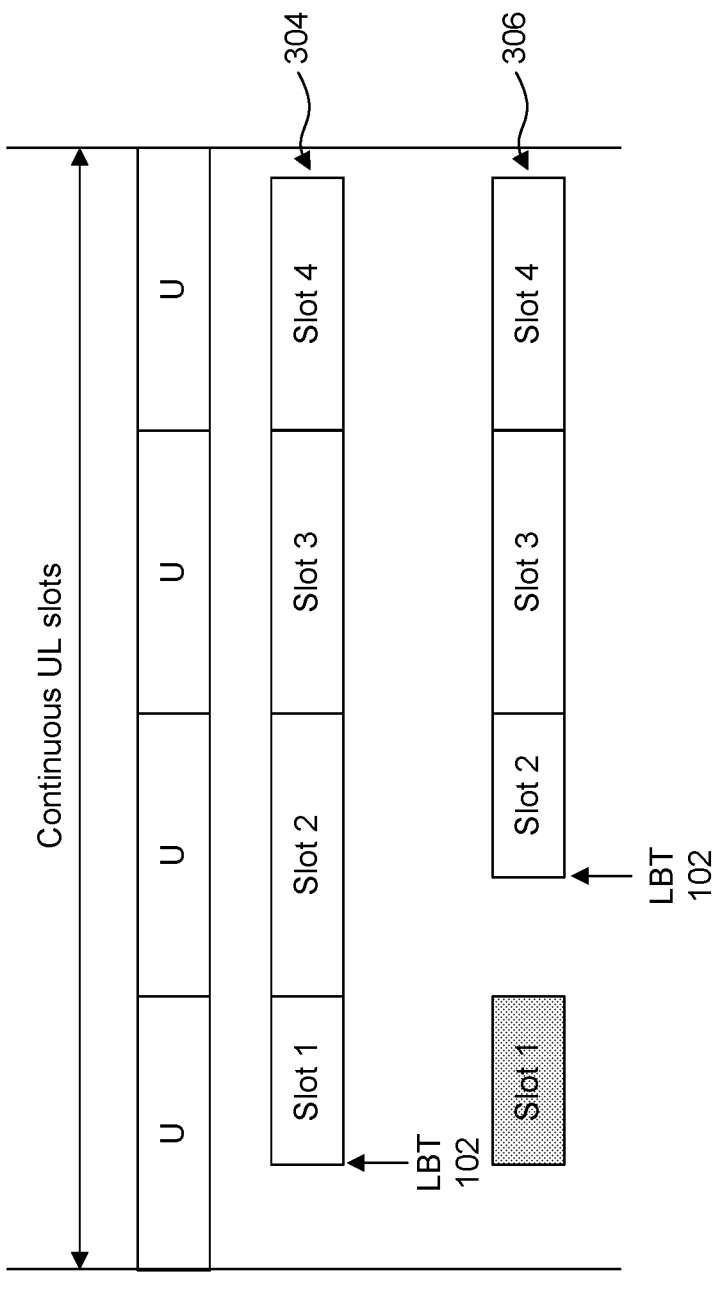

FIG. 3 graphically illustrates an exemplary time resource of CG PUSCH in accordance with various embodiments. In some embodiments, the UE can transmit continuously in multiple slots mapped by value '1' in the bitmap, once the UE occupies the channel by successfully performing a LBT 102. Assuming information on a start symbol index and an end symbol index is indicated or configured, these two pieces of information can be signaled separately or jointly coded. As illustrated in FIG. 3, in the first slot for the channel occupation, the UE should follow the start symbol indicated or configured, while the last symbol in the first slot is last symbol of the slot, for example, symbol 13. In the last slot for the channel occupation, the UE should follow the end symbol indicated or configured, while the first symbol in the last slot is symbol 0. For any middle slot(s) that exist, the middle slot(s) start from symbol 0 and end at symbol 13. In some embodiments, if the UE passes LBT 102 in a slot, then the UE can transmit continuously in slots 1 through 4 as highlighted by 304 in FIG. 3. In some embodiments, if the UE fails to pass LBT 102 in a slot, the UE has to try LBT 102 again in the next slot as highlighted by 306 in FIG. 3. Preferably, as illustrated in FIG. 3, the UE could again try LBT 102 following the start symbol indicated or configured. By this way, a GB PUSCH scheduled to start from an early position than CG PUSCH in the slot can be prioritized.

Figure 4:
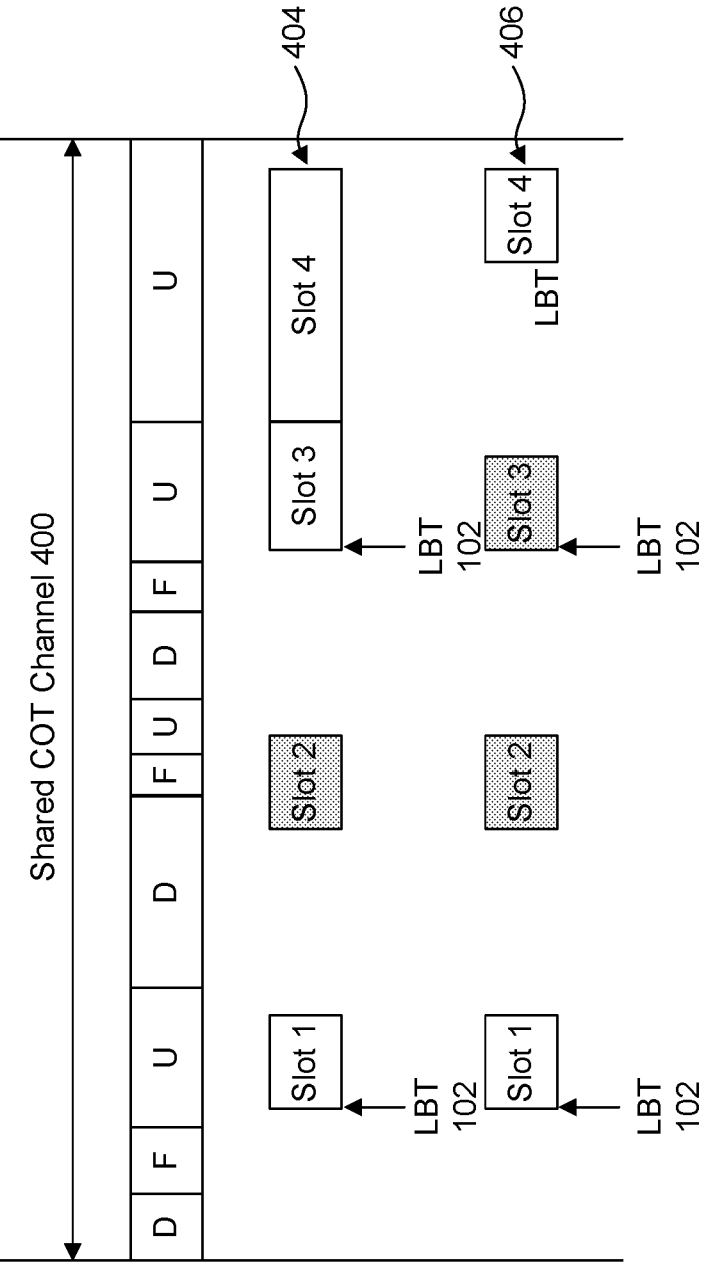

FIG. 4 graphically illustrates another exemplary time resource of CG PUSCH in accordance with various embodiments. In some embodiments, for example, inside a gNB initiated shared COT with multiple DL to UL and UL to DL switching points, the UL symbols may not be continuous. In some embodiments, if CG PUSCH is allowed inside shared COT channel 400, as illustrated in FIG. 4, in the first slot of CG PUSCH in a shared UL burst, the start symbol in the first slot is determined by the start symbol indicated or configured. In case the next few slot are full UL slots, the UE can continue UL transmission of CG PUSCH in the consecutive UL slots. In the last slot of CG PUSCH in a shared UL burst, the UE has to stop PUSCH transmission at the end symbol indicated or configured. In some embodiments, if the UE fails to pass LBT in a slot, the UE has to try LBT again in the next slot as highlighted by 404 and 406 in FIG. 4. Preferably, as illustrated in FIG. 4, the UE could again try LBT following the start symbol indicated or configured.

In some embodiments, if the UE has scheduled a multi-slot PUSCH inside shared COT channel 400 with multiple DL to UL and UL to DL switching points, and if the UE is indicated as NO LBT, the UE could do NO LBT to start its transmission in each UL burst used by this multi-slot PUSCH. Alternatively, the UE only does NO LBT in the first UL burst of the multi-slot PUSCH, and UE will try 25 µs LBT in other UL bursts. Alternatively, the UE does NO LBT in the first burst of the multi-slot PUSCH, while for other UL bursts, if the start symbol of the multi-slot PUSCH is indicated as flexible symbol by DCI 2_0, UE could still do NO LBT, otherwise, if it is indicated as uplink symbol by DC 2_0, UE does 25 µs LBT. Alternatively, the UE does NO LBT in the first burst of the multi-slot PUSCH, while for other UL bursts, if the start symbol of the multi-slot PUSCH is indicated as a flexible symbol by DCI 2_0 or is the first UL symbol indicated by DCI 2_0, the UE could still do NO LBT, otherwise, if it is after the first UL symbol indicated by DCI 2_0, UE does 25 µs LBT. Alternatively, UE does NO LBT in the exactly first burst of the multi-slot PUSCH, for other UL burst, if the start symbol of the multi-slot PUSCH can follow a downlink symbol or flexible symbol as indicated by DCI 2_0, UE could still do NO LBT, otherwise, the UE does 25 µs LBT. If the UE fails passing LBT in the first slot of a UL burst of the multi-slot PUSCH, the UE does 25 µs in the following slots in the UL burst.

In some embodiments, channel state information (CSI) can be prioritized to be piggybacked on a last slot of a multi-slot PUSCH if the PUSCH in the slot is actually available for transmission. For example, PUSCH in a slot may be canceled as indicated by shaded slot 2 in 404 and shaded slot 2 and slot 3 in 406 due to, for example, confliction of symbol direction between the PUSCH in the slot and a flexible symbol indicated by DCI 2_0. Due to LBT, the probability of availability of a last slot of multi-slot PUSCH is higher than an earlier slot. If the last slot is not available for transmission, its previous slot is checked for the transmission of CSI piggybacked on PUSCH. If the multi-slot PUSCH is separated into multiple shared UL burst, CSI can be piggybacked on a last slot of a shared UL burst with maximum number of slots. In some embodiments, if NO LBT can be used to schedule a multi-slot PUSCH, CSI can be piggybacked on the exactly first slot of the multi-slot PUSCH.

Figures 5A, 5B:
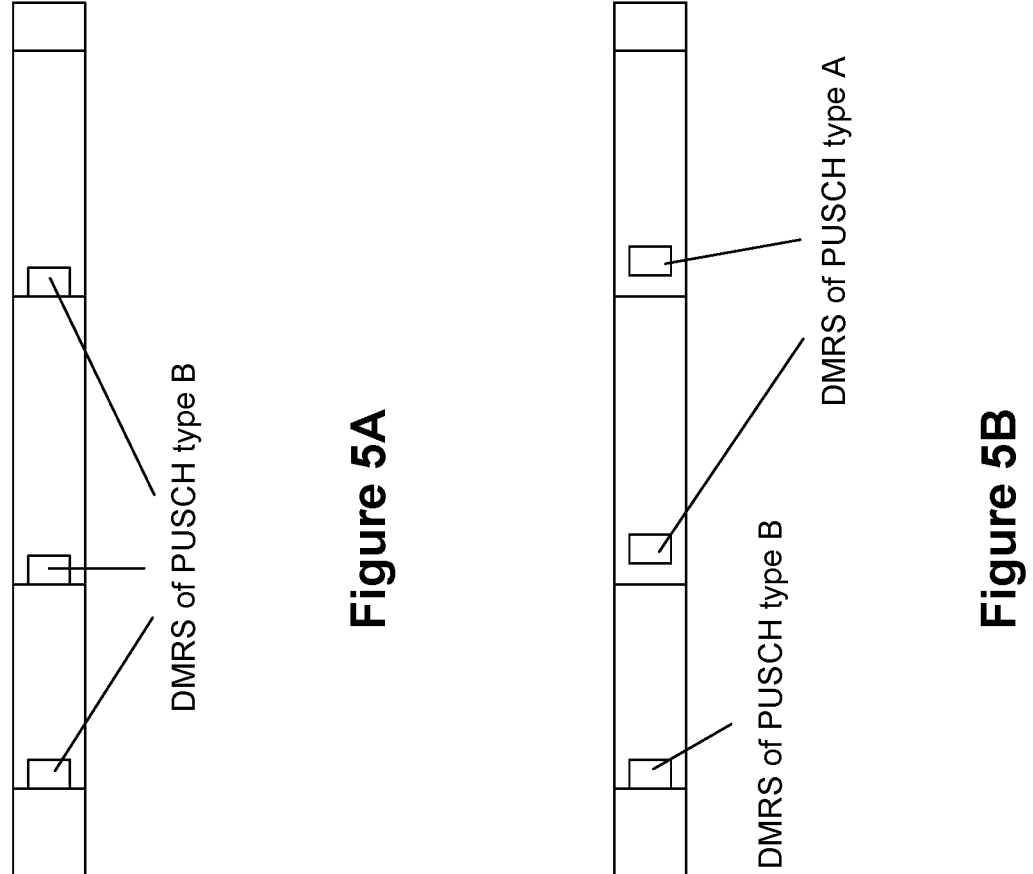

FIG. 5A and FIG. 5B graphically illustrates exemplary demodulation reference signal (DMRS) patterns in accordance with various embodiments. In some embodiments, a demodulation reference signal (DMRS) pattern in a slot of multi-slot PUSCH can follow the PUSCH type indicated by a DCI format. That is, as illustrated in FIG. 5A, the DMRS starts from the first symbol in a slot. Specifically, a full slot can be used by the PUSCH and is treated as PUSCH type B. In some embodiments, as illustrated in FIG. 5B, a DMRS pattern in a first slot can follow the PUSCH type indicated by the DCI format, while the DMRS in the remaining slot can follow PUSCH type A. In some embodiments, PUSCH type A mapping can be used for CG transmission. In some embodiments, a CG UE has multiple starting symbols, which are a subset of the symbols that precede the DMRS (for example, symbol #0, #1) when PUSCH Type A can be used. In some embodiments, a CG UE attempts LBT at the slot boundary (symbol #0).

Rate Matching and Reception for CG PUSCH

In NR-U, a TB can be repeated multiple times. In some embodiments, the CG UL control information (UCI) can be piggybacked in the first slot repetition of a TB. In some embodiments, the CG UCI can be piggybacked in each slot. In some embodiments, the multiple slot repetitions of a TB may map to more than one UL bursts, CG UCI can be piggybacked in beginning slot repetition of a TB on each UL burst. Multiple reasons may cause the slots repetitions in different UL burst. In these embodiments, a value '1' in the high layer configured bitmap may be not continuous, so that slot assigned to CG PUSCH is not continuous. In a shared COT with multiple DL/UL switching points, this can include multiple separated shared UL bursts.

In some embodiments, the data transmission is rate matched around the CG UCI. In some embodiments, UCI is contained in each slot, and per each slot the RV is specified. In some embodiments, if UCI is contained in the first slot of a burst of repeated slots, the UCI contains indication of the RV used for the first slot, while for the other slot the legacy sequence is followed starting from the RV indicated in the UCI: for example, if UCI indicated RV=0, then next RV will be 2 3 1 0 2 3 1. In some embodiments, a different sequence can be used. In some embodiments, the number of repetitions within a COT is upper bounded by the length of MCOT or in case of shared COT by the remaining shared COT. In some embodiments, if UCI is contained in the first slot of a burst of repeated slots, rate matching (RM) is done according to the total number of available resource elements (REs) for CG PUSCH in the set of repeated slots. In details, the UCI contains indication of a redundancy version (RV) which points to a start position in the circular buffer for RM, and the number of bits read out is determined by the total number of REs.

In some embodiments, a CG UE can perform LBT in multiple positions within a slot. A CG UE can attempt LBT as an example in symbol 0, 7 as follows: if LBT succeeds at symbol 0, then the rest of the slot can be used to transmit a TB. However, if it fails, a UE can attempt LBT at symbol 7, and if it succeeds the transmission can be either punctured, or rate matched in the remaining 7 symbols of the slot. In some embodiments, UCI is carried in the second part of a slot, for example in symbol 10, 11, and 12.

In some embodiments, a CG UE can be configured to attempt LBT on different occasions through the activation/deactivation DCI or through higher layer signaling. In some embodiments, a CG UE might be configured to start on a specific starting position, which is not necessarily at the slot boundary.

In some embodiments, a UE can transmit the UCI in the first slot of N contiguous slots within the maximum channel occupancy time (MCOT), and rate match the TB over the N contiguous slots. In some embodiments, the rate matched transmission can be repeated M times. In some embodiments, N and M are both RRC configured.

In some embodiments, if time domain repetitions are allowed for CG, and UCI can be carried in the first repetitions, then CG UCI carries information related to the number of time domain repetitions performed.

In some embodiments, for the multiple slot repetitions of a TB, the UE does rate matching of the TB assuming the total number of REs of N slots. The N slots can be contiguous in time or can be separated by other slots not configured for CG, for example, by the high layer configured bitmap. Further, each of the N slot can be a full UL slot or only part of the slot can be used as UL. The rate matching operation is repeated M times so that the total number of slot repetition for the TB is MN. N and M are both RRC configured.

Start Positions of UL Transmissions

In LTE LAA, a GB PUSCH can start from one of four possible start positions as indicated by DCI, for example, start of OS 0, start 25 μs after start of OS 0, start 25 μs+TA after start of OS 0 and start of OS 1. In NR-U, potential start positions can be dependent on the numerology of PUSCH. NR supports both PUSCH type A and PUSCH type B. A DMRS for PUSCH type B may be located in the first symbol of PUSCH resource, which is to reduce gNB processing time. While PUSCH type A starts from symbol 0 and DMRS is in symbol 2 or 3. The position of a DMRS in a PUSCH can be considered in the choice of start positions.

Some embodiments assume that the start symbol of PUSCH SLIV is in symbol k. In NR Rel-15, k equals to 0 for PUSCH type A, k can be any value within [0, 13] for PUSCH type B. These embodiments can be applied to GB PUSCH only, or can be applied to both GB PUSCH and CG PUSCH. These embodiments can be generalized to apply to PUCCH, SRS and other UL channels/signals too. In these embodiments, denote the start symbol of PUCCH, SRS or other UL channels/signals as OS k. In some embodiments, UL transmission can be PUSCH, PUCCH, SRS or other UL channels/signals.

In some embodiments, the multiple candidates for start positions of a UL transmission can be generally expressed as 'reference symbol boundary+X μs'. Offset X can be a time duration if the sub-carrier spacing (SCS) equals 60 kHz. For example, Offset X can be 0 μm, 25 μm, 25 μm+TA, 16 μm, 16 μm+TA, TA, length of 1 symbol, length of 2 symbols, etc. Offset X also can be any other predefined value or a high layer configured value. The above reference symbol boundary can be indicated by gNB or interpreted based on gNB's scheduling information and it can be the start of OS k if start position of the UL transmission scheduled by gNB is at or after the start of symbol k. The beginning X μs of the UL transmission can be punctured. Alternatively, the above reference symbol boundary can be the start of OS k–1 or OS k–2 if start position of the UL transmission scheduled by gNB is no later than the start of symbol k. Padding signal, for example, CP extension of OS k can be transmitted before OS k. The above reference symbol boundary can be differently selected from OS k–1 or OS k–2 for different offset X.

In some embodiments, for example, unlicensed cell operation, the LBT types used by the UE to start a UL transmission can include Category 1 (CAT-1), Category 2 (CAT-2), and Category 4 (CAT-4). CAT-1 is for the case that UL transmission follows DL signal with a gap of less than or equal to T1 µs, which is also known as 'NO LBT.' In an exemplary embodiment, T1 can be 16 µs. CAT-2 is one-shot LBT with a duration of T2 µs. In an exemplary embodiment, T2 can be 25 µs or 16 µs if one shot CCA is required within a duration of 16 µs. In one embodiment, within a gNB's shared COT CAT-2, LBT can be used by a UE even if the gap is less than 16 µs if the UL transmission is longer than H µs. As an example, H can be 584 µs, which mimicks the Wi-Fi behaviour. In one embodiment, the use of CAT-2 LBT when a gap is less than 16 µs is signalled within the downlink control information (DCI), or it can be radio resource control (RRC) configurable and be optionally enabled by the gNB as in 11.ax. In one embodiment, if the gNB configures the UE such that CAT-2 is used, CAT-2 is used regardless of the information carried by the DCI. As to CAT-4, the UE has to randomly generate a backoff counter, decrement the counter by 1 for each idle CCA slot, and can start transmission after the backoff counter is 0.

X=0 µs, for example, start position OS k can be used if a gap is generated before OS k. It is up to gNB to use LBT CAT-2 or CAT-4, as well as CAT-1. CAT-2 with 16 µs duration can be used type under certain conditions. For example, if the duration of UL transmission is less than a certain value (e.g. 584 µs or roughly 8 OSs at 15 KHz, 1 slot at 30 KHz, or 2 slots at 60 KHz), CAT-1 can be used; otherwise, CAT-2 with 16 µs duration can be used.

X=1 symbol, for example, start position OS k+1 can be used if a gap is generated before OS k+1. It is up to gNB to use LBT CAT-2 or CAT-4. CAT-1 could also be a possible LBT type under certain conditions.

X=2 symbols, for example, start position OS k+2 can be used if a gap is generated before OS k+2. It is up to gNB to use LBT CAT-2 or CAT-4. CAT-1 could also be a possible LBT type under certain conditions.

X=16 µs can be used at least in case UL transmission of a UE follows UL transmission of another UE. CAT-2 and/or CAT-4 can be used.

X=25 µs can be used at least in case UL transmission of a UE can follow UL transmission of another UE. CAT-2 and/or CAT-4 can be used.

X=TA can be used in case UL transmission of a UE starts in a symbol potentially used by other UE to start the transmission of msg1 for 4-step RACH or msgA for 2-step random access channel (RACH). The potential LBT type can be CAT-1, CAT-2 or CAT-4. CAT-2 with 16 µs duration may also be a possible LBT type under certain condition. For example, if the duration of UL transmission is less than a certain value (e.g., 584 µs or roughly 8 OSs at 15 KHz, 1 slot at 30 KHz, or 2 slots at 60 KHz) threshold, CAT-1 can be used; otherwise, CAT-2 with 16 µs duration can be used.

X=16 µs+TA can be used in case UL transmission of a UE can follow DL transmissions and LBT CAT-1 is indicated to start the UL transmission. CAT-2 may can be used under certain conditions. For example, if the duration of UL transmission is less than a certain value (e.g. 584 µs or roughly 8 OSs at 15 KHz, 1 slot at 30 KHz, or 2 slots at 60 KHz) threshold, CAT-1 can be used; otherwise, CAT-2 can be used.

X=25 µs+TA can be used in case UL transmission of a UE can follow DL transmissions and LBT CAT-2 is indicated to start the UL transmission. Alternatively, 25+TA can be used with LBT CAT-2 when UL transmission of a UE potentially can follow message 1 (msg1) of the other UE for a 4-step RACH or message A (msgA) of the other UE for a 2-step RACH.

A special X can be used if the UL transmission should follow DL reception timing at UE. This also targets the case that UL transmission of a UE starts in a symbol potentially used by other UE to start the transmission of msg1 for a 4-step RACH or msgA for a 2-step RACH. By this way, puncturing the beginning part of the UL transmission is avoided. The potential LBT type can be CAT-1, CAT-2, or CAT-4.

Starting positions for a for desirable LBT mechanism may be applied depending on situations if all of the above candidates for start positions can be supported. However, if all candidates can be supported, too much overhead may be needed for indication of them. Therefore, the tradeoff between performance and signaling overhead may be considered. The following principles can be included for the overhead reduction:

Due to the flexible configuration of SLIV of a PUSCH or start symbol & duration of PUCCH, a gNB has the flexibility to conFIG. multiple start symbols and dynamically indicate a proper start symbol in the real scheduling. Therefore, it may not cause much issue if only one start position is supported from OS k, OS k+1 and OS k+2.

For simultaneous UL transmission with RACH messages, X=TA is high prioritized. Instead, the special X can be used. Transmission of RACH messages is normally more important than other UL transmission. Without puncturing beginning X us of a UL transmission, the UL transmission may block the CCA operation, which is required to start RACH messages. X=25 µs+TA can be low prioritized since it is to optimize UL transmission after a RACH message which may not impact RACH messages.

The application of 16 µs+TA to PUSCH may subject to regulations. The LBT type can be CAT-1, or CAT-2 if required. If CAT-2 with LBT duration of 25 µs is used when the gNB shares its initiated COT to the UE for the PUSCH, 25 µs+TA becomes important for PUSCH.

From the embodiments described above, to handle a UL transmission starting from the same symbol as a RACH msg1 or msgA of other UE, either offset X=TA or a special X can be used. Only one of the two kinds of offset X can be supported. In the some embodiments, offset X=TA can be used. If only the above special offset X is supported, some embodiments can replace X=TA by the special offset X. Alternatively, both two values of offset X can be supported.

From the embodiments described above, offset X=25 µs or X=16 µs can be used to start UL transmission by CAT-2 LBT. In some embodiments, only one of the two values of offset X needs to be supported. In the following descriptions, offset X=25 µs is used. If only the above X=16 µs is supported, X=25 µs in the following descriptions can be replaced by X=16 µs. Whether X=25 µs or X=16 µs is applicable may be determined by regulation. Alternatively, both two values of offset X are supported.

In some embodiments, offset X is designed independent from LBT type. Assuming 2-bit information of start positions, the 4 start positions supported can be associated with X=0 µs, X=25 µs, X=16 µs+TA, X=TA as illustrated in option 1 in Table 1. It can be used if regulation allows the gNB to share its initiated COT to the UE for a UL transmission by category 1 (CAT-1). Alternatively, the four start positions supported can be associated with X=0 µs, X=25 µs, X=25 µs+TA, X=TA as illustrated in option 2 in Table 1. It can be used if regulation mandates CAT-2 in case the gNB shares its initiated COT to the UE for a UL transmission.

In some embodiments, assuming LBT type is separately indicated, the start positions can be interpreted based on LBT type. Depending on the LBT type, for example, if CAT-1 is indicated, the start positions can be derived accordingly. If LBT type is not CAT-1, the four start positions supported can be associated with X=0 μs, X=25 μs, X=TA, X=25+TA. If LBT type is CAT-1, the start positions supported are at least associated with X=0 μs, X=16 μs+TA as illustrated in option 3 in Table 1.

TABLE 1

| | | | Offset X | |
| --- | --- | --- | --- | --- |
| | | | Option 3 | |
| Offset X | Option 1 | Option 2 | Not CAT-1 | CAT-1 |
| Opts | X | x | x | x |
| 25 μs | X | x | x | |
| 16 μs + TA | X | | | x |
| TA | X | x | x | |
| 25 μs + TA | | x | x | |

In some embodiments, LBT type can be independently indicated from offset X. 2 bits can be used to indicate CAT-1, CAT-2 with duration of 25 μs, CAT-2 with duration of 16 μs, and CAT-4. Alternatively, 2 bits can be used to indicate CAT-1, CAT-2 with duration of 25 μs, and CAT-4. If CAT-1 is indicated, the UE applies LBT CAT-1. Alternatively, if CAT-1 is indicated, the UE determines the use of CAT-1 or CAT-2 with 16 μs duration using other information, e.g., the duration of UL transmission. If the duration of UL transmission is less than a threshold, CAT-1 is used; otherwise, CAT-2 with duration of 16 μs is used.

In some embodiments, there is no need to indicate CAT-1 LBT, since CAT-2 is always used.

From the embodiments described above, the total number of candidate offsets X can be 8 or 9 (for SCS 60 kHz), while the number of LBT type is 3. Therefore, 5 bits may be required if separate indication are used, 3 bits for offsets and 2 bits for LBT types. However, since all possible combinations are not necessarily required to be supported, joint coding of start positions and LBT types can be used to indicate only meaningful combinations to reduce the signaling overhead. Preferably, the candidate combinations could be a subset of the following combinations:

For X=0 μs, potential LBT type can be CAT-2 or CAT-4, as well as CAT-1;

For X=1 symbol, potential LBT type can be CAT-2 or CAT-4;

For X=2 symbols, only for SCS 60 kHz, potential LBT type can be CAT-2 or CAT-4;

For X=16 μs, potential LBT type can be CAT-2 or CAT-4;

For X=25 μs, potential LBT type can be CAT-2 or CAT-4;

For X=TA, potential LBT type can be CAT-2 or CAT-4;

For X=16 μs+TA, potential LBT type can be CAT-1 or CAT-2;

For X=25 μs+TA, potential LBT type can be CAT-2;

For special X meaning following DL reception timing, potential LBT type can be CAT-2 or CAT-4, as well as CAT-1.

In some embodiments, a 4-bit field in DCI can used to indicate all of or a subset of the above combinations of offset X and LBT type. For example, as shown in Option 1 in Table 2, 15 combinations could be indicated. If a start position OS k+1 or OS k+2 is not used because the gNB can achieve similar functions using start position OS k and a flexible start symbol configuration of a UL transmission, 13 combinations can be indicated, as shown in Option 2 of Table X3. If CAT-2 with 16 μs duration is not applicable, as shown in Option 3 or 4 of Table X3, the number of combinations is 12 or 10.

TABLE 2

| | | Combinations of start position & LBT type | | | | |
| --- | --- | --- | --- | --- | --- | --- |
| | Offset X | LBT type | Option 1 | Option 2 | Option 3 | Option 4 |
| 1 | 0 | CAT-1 | x | x | x | x |
| 2 | 0 | CAT-2 with 16 μs duration | x | x | | |
| 3 | 0 | CAT-2 with 25 μs duration | x | x | x | x |
| 4 | 0 | CAT-4 | x | x | x | x |
| 5 | 1 or 2 symbols | CAT-2 with 25 μs duration | x | | x | |
| 6 | 1 or 2 symbols | CAT-4 | x | | x | |
| 7 | 25 | CAT-2 with 25 μs duration | x | x | x | x |
| 8 | 25 | CAT-4 | x | x | x | x |
| 9 | 16 + TA | CAT-1 | x | x | x | x |
| 10 | 16 + TA | CAT-2 with 16 μs duration | x | x | | |
| 11 | TA | CAT-1 | x | x | x | x |
| 12 | TA | CAT-2 with 16 μs duration | x | x | | |
| 13 | TA | CAT-2 with 25 μs duration | x | x | x | x |
| 14 | TA | CAT-4 | x | x | x | x |
| 15 | 25 + TA | CAT-2 with 25 μs duration | x | x | x | x |

Assuming the application of CAT-1 or CAT-2 with a 16 μs duration can be derived by other information, the indication of CAT-1 or CAT-2 with the 16 μs duration can share a same entry. If the entry is indicated, the applicable LBT type can be derived by the duration of the UL transmission. If the duration of the UL transmission is less than a threshold, CAT-1 can be used; otherwise, CAT-2 with duration of 16 μs can be used. For example, as shown in Table 2, entry 1, 8, and 9 are the common entries for CAT-1 and CAT-2 with 16 μs duration. As shown Option 1 in Table 3, 12 combinations can be indicated. Assuming the start position OS k+1 or OS k+2 is not used, as shown in Option 2 in Table 3, 10 combinations can be indicated.

TABLE 3

| | | Combinations of start position & LBT type | | |
| --- | --- | --- | --- | --- |
| | Offset X | LBT type | Option 1 | Option 2 |
| 1 | 0 | CAT-1 or CAT-2 with 16 μs duration | x | x |
| 2 | 0 | CAT-2 with 25 μs duration | x | x |
| 3 | 0 | CAT-4 | x | x |
| 4 | 1 or 2 symbols | CAT-2 with 25 μs duration | x | |
| 5 | 1 or 2 symbols | CAT-4 | x | |
| 6 | 25 | CAT-2 with 25 μs duration | x | x |
| 7 | 25 | CAT-4 | x | x |
| 8 | 16 + TA | CAT-1 or CAT-2 with 16 μs duration | x | x |
| 9 | TA | CAT-1 or CAT-2 with 16 μs duration | x | x |
| 10 | TA | CAT-2 with 25 μs duration | x | x |
| 11 | TA | CAT-4 | x | x |
| 12 | 25 + TA | CAT-2 with 25 μs duration | x | x |

In some embodiments, a 3-bit field in DCI can be used to indicate at most 8 of above combinations of offset X and LBT type. Assuming start position OS k+1 or OS k+2 is not used since the gNB can achieve similar functions using start position OS k and flexible start symbol configuration of a UL transmission. 4 options are included in Table 2. Option 1 can be used if regulation allows gNB to share its initiated COT to UE by CAT-1. While Option 2 can be used if regulation mandates CAT-2 in case the gNB shares its initiated COT to the UE. To optimize UL transmission right after RACH msg1 or msgA of the other UE and to allow the gNB to share its initiated COT to the UE by CAT-1, both 16 µm+TA and 25 µm+TA need to be available. Option 3 forbids the use of CAT-1 of start offset OS k. Option 4 forbids the use of CAT-4 of start offset 25 µs. For entry 1 and 6 in Table 4, instead of only indicating CAT-1, the LBT type could be CAT-1 or CAT-2 with 16 µs duration depending on some other information. For example, the applicable LBT type could be derived by the duration of UL transmission. If the duration of UL transmission is less than a threshold, CAT-1 is used; otherwise, CAT-2 is used.

TABLE 4

| Combinations of start position & LBT type | | | | | |
|---|---|---|---|---|---|
| Offset X | LBT type | Option 1 | Option 2 | Option 3 | Option 4 |
| 1 | 0 µm | CAT-1 | x | x | | x |
| 2 | 0 µm | CAT-2 | x | x | x | x |
| 3 | 0 µm | CAT-4 | x | x | x | x |
| 4 | 25 µm | CAT-2 | x | x | x | x |
| 5 | 25 µm | CAT-4 | x | x | x | |
| 6 | 16 µm + TA | CAT-1 | x | | x | x |
| 7 | TA | CAT-2 | x | x | x | x |
| 8 | TA | CAT-4 | x | x | x | x |
| 9 | 25 µm + TA | CAT-2 | | x | x | x |

In some embodiments, a 3-bit field in DCI can be used to indicate at most 8 of above combinations of offset X and LBT type. Assuming start position OS k+1 (for SCS 15 kHz or 30 kHz) or OS k+2 (for SCS 60 kHz) is supported, 3 other combinations should be removed. Four options are included in Table 3. Option 1 can be used if regulation allows the gNB to share its initiated COT to the UE by CAT-1, but it may not optimize simultaneous RACH messages and other UL transmission. Option 2 can be used if regulation mandates CAT-2 in case the gNB shares its initiated COT to the UE, but it may not optimize simultaneous RACH messages and other UL transmission. Option 3 can be used if regulation allows the gNB to share its initiated COT to the UE by CAT-1, and UL transmission of the UE starts in a symbol potentially used for RACH messages of another UE is considered. Option 4 can be used if regulation mandates CAT-2 in case the gNB shares its initiated COT to the UE, and UL transmission of the UE starts in a symbol potentially used for RACH messages of another UE is considered. Option 3 & 4 restrict the LBT type of offset 0 µs and 25 µs. For entry 1 and 8 in Table 5, instead of indicating CAT-1, the LBT type can be CAT-1 or CAT-2 with 16 µs duration depending on some other information. For example, the applicable LBT type can be derived by the duration of UL transmission. If the duration of UL transmission is less than a threshold, CAT-1 can used; otherwise, CAT-2 can used.

TABLE 5

| Combinations of start position & LBT type | | | | | |
|---|---|---|---|---|---|
| Offset X | LBT type | Option 1 | Option 2 | Option 3 | Option 4 |
| 1 | 0 µs | CAT-1 | x | x | | |
| 2 | 0 µs | CAT-2 with 25 µs duration | x | x | x | x |
| 3 | 0 | CAT-4 | x | x | x | x |
| 4 | 1 or 2 symbols | CAT-2 with 25 µs duration | x | x | x | x |
| 5 | 1 or 2 symbols | CAT-4 | x | x | x | x |
| 6 | 25 µs | CAT-2 with 25 µs duration | x | x | x | x |
| 7 | 25 µs | CAT-4 | x | x | | |
| 8 | 16 µs + TA | CAT-1 | x | | x | |
| 9 | TA | CAT-2 with 25 µs duration | | | x | x |
| 10 | TA | CAT-4 | | | x | x |
| 11 | 25 µs + TA | CAT-2 with 25 µs duration | | x | | x |

In some embodiments, to reduce the signaling overhead, offset X=TA or the above special X could share a same indicator with another value of offset X. According to high layer signaling on a RACH resource configuration, a UE could know the potential time resources for RACH messages. Therefore, in a configured random access channed (RACH) resource, the UE could temporarily follow X=TA or the above special X if the UL transmission starts in a symbol potentially used by another UE to start the transmission of RACH msg1 or msgA. Otherwise, the UE could follow the above another value of offset X set forth in the Table(s) above.

In some embodiments, among all possible combination of offset X and LBT types, higher layer signaling configures available candidates for a UE and a gNB can indicate one of the configured candidates using a reduced number of bits. The configuration can be different between UEs or the same for all UEs. For example, if a gNB configures 8 candidates for a UE, the gNB indicates one candidate using 3-bit signaling.

Figure 6:
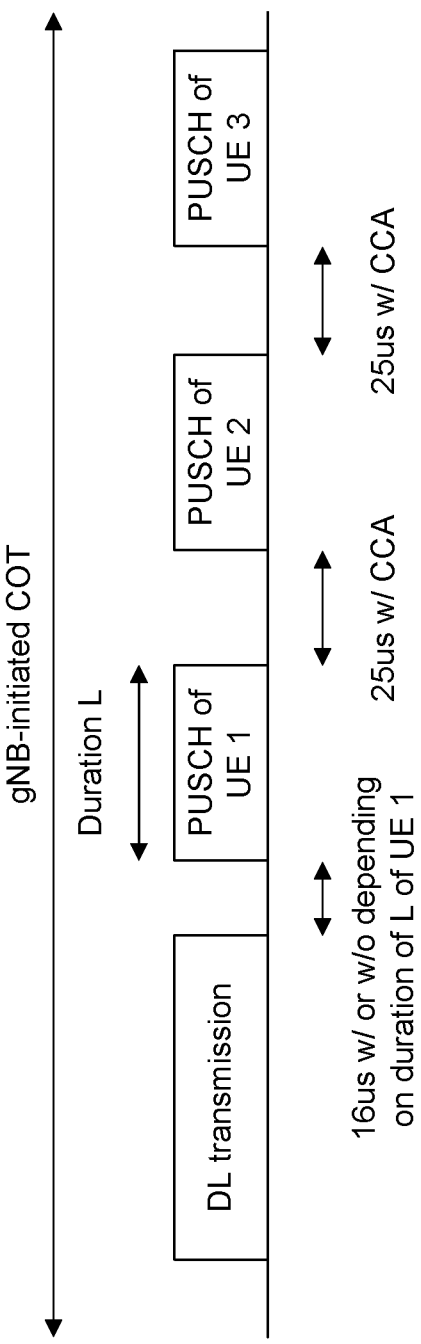

FIG. 6 graphically illustrates an exemplary applicable LBT type for PUSCH in accordance with various embodiments. In some embodiments, the gNB can schedule physical uplink shared channels (PUSCHs) of multiple UEs with time division multiplexed (TDM) resources. Depending on the duration L of a PUSCH of the first UE that immediately follows DL transmission, e.g., UE 1 in FIG. 6, if L is less than a threshold, CAT-1 is used; otherwise, CAT-2 with 16 µs duration is used. For all other UEs, e.g., UE 2 and UE 3 in FIG. 6, CAT-2 with 25 µs duration is used.

From the embodiments described above, the start positions depend on reference symbol boundary. It can be "start of symbol k+offset X" or "start of symbol k-a+offset X, a=1 or 2 or 4". The start position could depend on PUSCH type A or B. The start positions could depend on SCS. A same solution could apply to all kind of UL transmissions, or the solution can be designed for each kind of UL transmission separately.

Scheme A: Start Position at or after the Start of Symbol k

In some embodiments, a start position of PUSCH is determined as an offset X on symbol k, for example, "start of symbol k+offset X." In this way, the start position is at the start of symbol k or after that. For PUSCH type A, k equals to 0, it is beneficial to limit potential values of X to be earlier than the first DMRS symbol. For PUSCH type B, the DMRS has to be shifted right after a start position. The shift of the DMRS can be UE specific so that the DMRS is the first whole UL symbol after start position. Alternatively, the shifted DMRS can be determined by the largest X to align DMRS timing in a cell.

For example, possible values of X are provided in Table 6. If 25 CAT-2 μs LBT is indicated, a UE could follow X=25 μs or X=25 μs+TA; while if NO LBT is indicated, is indicated, UE can follow X=16 μs or X=16 μs+TA. Further, if 16 μs CAT-2 LBT is appliable and UE can follow X=16 μs or X=16 μs+TA. Alternatively, information on LBT type and information on start position can be jointly coded in a DCI. For SCS 15 kHz and PUSCH type A, it achieves the same behavior as LTE LAA. For SCS 15 kHz and PUSCH type B, the DMRS symbol can be shifted right by at least one symbol. For SCS 30 kHz, it still could generate four start positions in a single symbol with a shorter reservation signal. For value X=25 μs+TA, the TA is the UE's timing advance. The round-trip delay can be about 10 μs if limiting the start position in one symbol, which is sufficiently large for NR-U operation. For value X=16 μs+TA, the supported round-trip delay is even larger. Again, the DMRS symbol could shifted right by at least one symbol for PUSCH type B. For SCS 60 kHz, at least two symbols are required to generate a gap for 25 μs LBT. If X equals to 0, PUSCH can start from symbol k; if X equal to 16 μs, PUSCH start from symbol k+1; if X equals to 16 μs+TA, PUSCH may start from symbol k+1 or k+2 depending on TA; while for other start positions, PUSCH may start from symbol k+2. For PUSCH type B, the DMRS symbol can be shifted right by one or two symbols depending on X, or always shifted right by two symbols.

TABLE 6

| | | Offset X determining start positions | | |
| --- | --- | --- | --- | --- |
| 2-bit field | 00 | 01 | 10 | 11 |
| X | 0 | 25 μs (16 μs) | 25 μs + TA (16 μs + TA) | + 1 symbol (15 kHz, 30 kHz) + 2 symbols (60 kHz) |

Alternatively, possible values of X are provided in Table 6. The interval between largest X and smallest X is fixed, for example, equal to 1 symbol with 15 kHz SCS. For SCS 15 kHz and PUSCH type B, the DMRS symbol can be shifted right by at least one symbol. For SCS 30 kHz, the largest X is 2 symbols. For PUSCH type B, the DMRS symbol can be shifted right by one or two symbols depending on X, or always shifted right by two symbols. For SCS 60 kHz, the largest X is four symbols. For PUSCH type A, the DMRS symbol can be shifted right by zero, one or two symbols depending on X, or always shifted right by 1 or 2 symbols. The shift of one symbol is due to the original DMRS position in symbol 3 for SCS 60 kHz. The shift of two symbols is due to the original DMRS position in symbol 2 for SCS 60 kHz. For PUSCH type B, the DMRS symbol can be shifted right by two or four symbols depending on X, or always shifted right by four symbols.

TABLE 7

| | | Offset X determining start positions | | |
| --- | --- | --- | --- | --- |
| 2-bit field | 00 | 01 | 10 | 11 |
| X | 0 | 25 μs (16 μs) | 25 μs + TA (16 μs + TA) | + 1 symbol (15 kHz) + 2 symbols (30 kHz) + 4 symbols (60 kHz) |

Alternatively, possible values of X are provided in Table 7. For SCS 15 kHz and 30 kHz, the interval between largest X and smallest X is fixed to one symbol with 15 kHz SCS. The interval between the largest X and the smallest X is two symbols with 60 kHz SCS. It avoids impact to the DMRS symbol position of PUSCH type A. For SCS 15 kHz and PUSCH type B, the DMRS symbol can be shifted right by at least one symbol. For SCS 30 kHz, the largest X is two symbols. For SCS 30 kHz and PUSCH type B, the DMRS symbol can be shifted right by one or two symbols depending on X, or always shifted right by 2 symbols

TABLE 8

| | | Offset X determining start positions | | |
| --- | --- | --- | --- | --- |
| 2-bit field | 00 | 01 | 10 | 11 |
| X | 0 | 25 μs (16 μs) | 25 μs + TA (16 μs +TA) | + 1 symbol (15 kHz) + 2 symbols (30 kHz) + 2 symbols (60 kHz) |

Alternatively, possible values of X can be provided in Table 1 through Table 5. It avoids impact to the DMRS symbol of PUSCH type A. For SCS 15 kHz or 30 kHz and for PUSCH type B, the DMRS symbol can be shifted right by at least one symbol. For SCS 60 kHz, at least two symbols are required to generate a gap for 25 μs LBT. If X equals to 0, PUSCH can start from symbol k; if X equals to TA or X=16 μs+TA, PUSCH may start from symbol k+1 or k+2 depending on value of TA; while for other start positions, PUSCH may start from symbol k+2. For PUSCH type B, the DMRS symbol can be shifted right by one or two symbols depending on X, or always shifted right by two symbols.

Scheme B: Start Position No Later than the Start of Symbol k

In some embodiments, a start position of PUSCH is determined as an offset X from symbol k−1, k−2, or k−4, for example, "start of symbol k-a+offset X, where a=1 or 2 or 4." In this way, the start position of PUSCH is no later than the start symbol of symbol k. The first whole symbol available for PUSCH can be symbol k. For PUSCH type B, the start positions are no later than the start symbol of PUSCH so that the DMRS symbol position is not changed.

For example, possible values of X are provided in Table 7. It is up to gNB scheduling to guarantee the period doing CCA before the start symbol of PUSCH. For PUSCH type B, X=0 is not used so that PUSCH can start from its first symbol k, not k−1 or k−2. For SCS 15 kHz and 30 kHz, a equals 1 can be used. For SCS 60 kHz, a equals 2 can be used if 25 μs LBT is indicated. Furthermore, a could equal 1 if NO LBT is indicated. For NO LBT, if the TA is relatively large, a equals 2.

Alternatively, possible values of X are provided in Table 9 for SCS 15 kHz and are provided in Table 6 for SCS 30 kHz and 60 kHz. By this way, each possible start position is respectively aligned for different SCSs. It is up to gNB scheduling to guarantee the period doing CCA before the start symbol of PUSCH. For PUSCH type B, X=0 is not used so that PUSCH can start from its first symbol k, not k−1 or k−2. For SCS 15 kHz and 30 kHz, a equals 1 can be used. For SCS 60 kHz, a equals 2 can be used if 25 μs LBT is indicated. a could equal to 1 if NO LBT is indicated. If TA is relatively large, still a equal 2 is needed for NO LBT.

TABLE 9

| Offset X determining start positions | | | | |
|---|---|---|---|---|
| 2-bit field | 00 | 01 | 10 | 11 |
| X | 0 | Y +25 μs* (Y + 16 μs*) | Y + 25 μs + TA* (Y + 16 μs + TA*) | +1 symbol |

*Y equals to length of 1 symbol with SCS 30 kHz

Alternatively, possible values of X are provided in Table 7. For SCS 15 kHz, a equal to 1; for SCS 30 kHz, a equals to 2; for SCS 60 kHz, a equals to 4. However, there can be a whole UL symbol before symbol k. such UL symbol could just transmit filling signal or the actual start symbol of PUSCH is shifted to the earliest whole UL symbol. Alternatively, the start positions resulting in whole UL symbol before symbol k is not applicable.

Alternatively, possible values of X can be provided in Table 1 through Table 5. It is up to gNB scheduling to guarantee the period doing CCA before the start symbol k of PUSCH. For SCS 15 kHz and 30 kHz, a reference symbol boundary is the start of symbol k−1, for example, a equals 1. For SCS 60 kHz, a reference symbol boundary is the start of symbol k−1, for example, a equals 1 for TA up to Y1 μs for offset TA, or for TA up to Y2 μs for offset 16 μs+TA; otherwise, a reference symbol boundary is the start of symbol k−2, for example, a equals to 2. For example, Y1 could equal a length of one symbol, Y2 could equal to 'length of one symbol—16.'

Scheme C: Mixed Application of Scheme A and B

In some embodiments, for PUSCH type A, use the above embodiment determining a start position as "start of symbol k+offset X", for example, scheme A; while for PUSCH type B, use the above embodiment determining start position as "start of symbol k−a+offset X, a=1 or 2 or 4", for example, scheme B.

In some embodiments, possible values of X are provided in Table 7. For PUSCH type A, a equals 0 for SCS 15 kHz; a equals 0 for SCS 30 kHz; a equals 2 for SCS 60 kHz. For SCS 60 kHz, PUSCH will start from symbol k+2 with the largest value X, which is the earliest symbol for the DMRS. Hence, no special handling on the DMRS is needed. For SCS 60 kHz and X=0, the start symbol is k−2, filling signal can be transmitted or X=0 is not applicable. For PUSCH type B, when a equals 1 for SCS 15 kHz, the DMRS symbol position is not changed; when a equals 1 for SCS 30 kHz, PUSCH will start from symbol k+1 with the largest value X, so the DMRS symbol should be shifted right by one symbol; when a equals 2 for SCS 60 kHz, PUSCH will start from symbol k+2 with largest value X, so the DMRS symbol can be shifted right by 2 symbols. For PUSCH type B, X=0 is not used so that PUSCH can start from its first symbol k at earliest.

Special X Meaning Following DL Reception Timing

Some embodiments may apply different TA values, $N_{TA}$, for different UL slots for PUSCH transmissions depending on whether there is a PRACH resource configured in the same slot or not. More specifically, $N_{TA}=0$ (for example, with a same start time of a corresponding DL slot) can be used for the UL slot with a PRACH resource and an accumulated TA value $N_{TA}$ may be applied for another UL slot without a PRACH resource. This mitigates the problem of PRACH transmissions blocking by the concurrent PUSCH(s) in a same slot considering the fact that the earlier transmission of PUSCH with $N_{TA}$>0 would block the PRACH transmission due to LBT operation.

Figure 7:
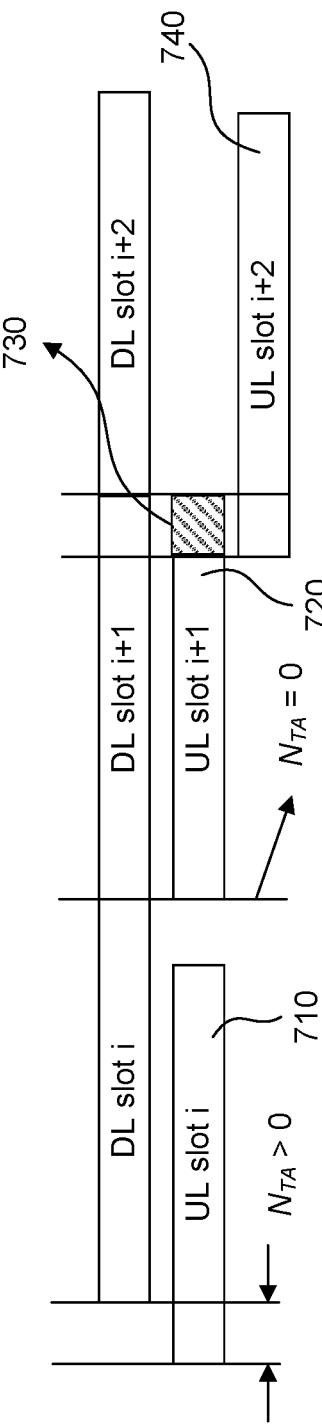

FIG. 7 graphically illustrates an exemplary slot-type-dependent $N_{TA}$ determination for PUSCH transmission in accordance with various embodiments. In UL slot 710 and 740 in FIG. 7, the accumulated TA value $N_{TA}$>0 can be used as there is no PRACH resource in this slot. While, $N_{TA}=0$ should be used for PUSCH transmission in the slot 720 to avoid blocking potential PRACH transmissions. In some examples, to avoid the interference to the PUSCH transmission in the subsequent slot 740, the last X symbols in the slot 730 may be punctured for UL shared channel (UL-SCH) symbol mapping. The exact value of X may be determined based on the accumulated TA value $N_{TA}$>0 or be fixed in a specification.

Figure 8:
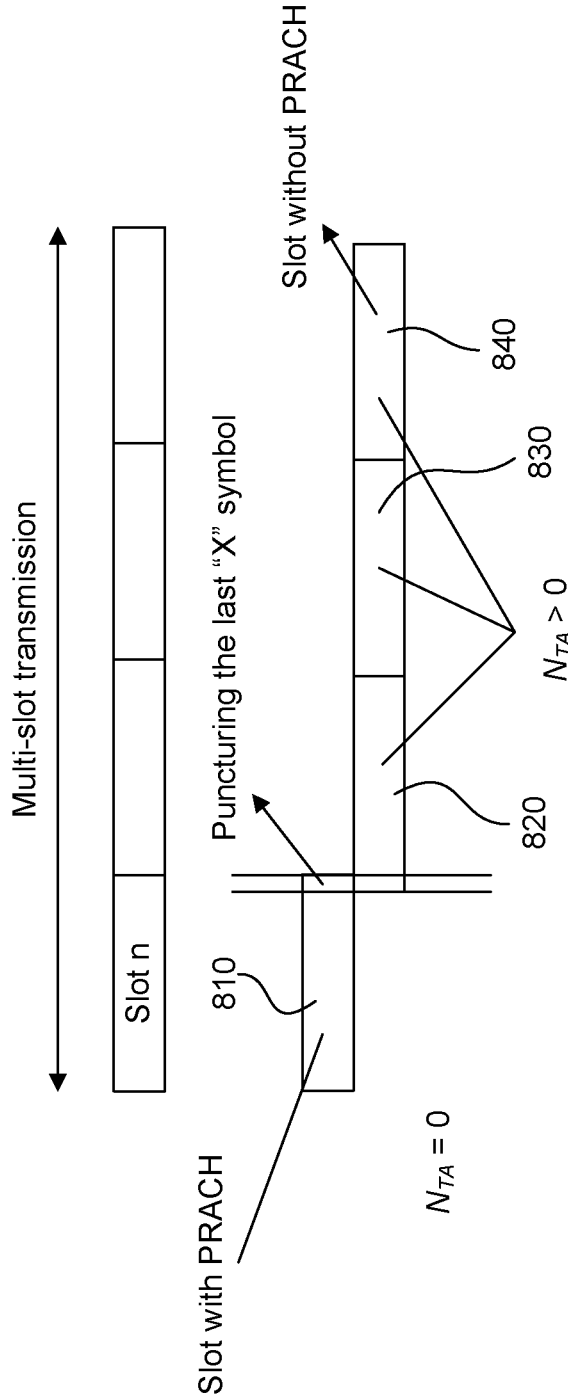

FIG. 8 graphically illustrates an exemplary slot-type-dependent $N_{TA}$ determination for PUSCH transmission in accordance with various embodiments. In the exemplary embodiment illustrated in FIG. 8, $N_{TA}=0$ may be applied to slot(s) 810 with PRACH resources but the normal accumulated $N_{TA}$>0 should be used in other UL slots 820~840 without PRACH resources so as to maintain the orthogonality of PUSCHs from different UEs in the subsequent slots at the network (NW) side.

In some embodiments, using $N_{TA}=0$ for PUSCH transmission in the UL slot with a PRACH resource may destroy the orthogonality property of PUSCH reception from different UEs at the gNB receiver and result in UL throughput loss. To keep the orthogonality of PUSCH across UEs and still avoid a PRACH transmission blocking issue, a UE may start UL-SCH symbol transmission from the first symbol after the start of the corresponding DL slot at the UE assuming $N_{TA}$>0 can be used.

Figure 9:
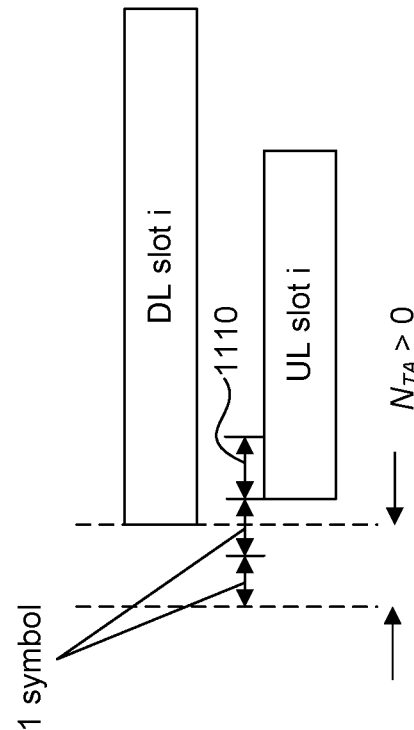

FIG. 9 graphically illustrates an exemplary PUSCH transmission timing determination in accordance with various embodiments. With this approach, the UL transmission starting from the symbol 910 in FIG. 9 is still time aligned with other UL transmissions received by the gNB. It should be noted that the encoded UL-SCH symbols can start mapping from the symbol 910 to avoid any puncturing on or of systematic bits.

Handling Start Positions with Offset X=TA or X=16 μs+TA

As described, the start positions of a UL transmission can be generally expressed as 'reference symbol boundary+X μs.' The reference symbol boundary can be indicated by a gNB or interpreted based on the gNB's scheduling information and the above reference symbol boundary can be the start of OS k if a start position of the UL transmission scheduled by the gNB is at or after the start of symbol k. The beginning X μs of the UL transmission can be punctured. Alternatively, the above referenced symbol boundary can be the start of OS k−1 or OS k−2 if a start position of the UL transmission scheduled by the gNB is no later than the start of symbol k. Padding signal, for example, a cyclic prefix (CP) extension of OS k can be transmitted before OS k. The start positions could depend on PUSCH type A or B. The start positions could depend on SCS.

In UL transmission, a TA can be applied so that UL transmissions from different UEs can be aligned at the gNB side. The TA could comprise two parts, for example, TA= (TA0+d). TA0 is common to all UEs. For example, a gNB could make a gap for UL-to-DL switching time by setting a relatively larger TA. TA0 could equal to the UL-to-DL switching time. Value d is a UE specific value, for example, d is dependent on the UE's location in the cell coverage. Value d can be related to round-trip delay between the gNB and the UE. Due to a potential misunderstanding on an exact TA value between the gNB and the UE, an offset X related to a TA, for example, X=TA or X=16 µs+TA, may result in confusion on rate matching and RE mapping of UL transmission under certain conditions.

Taking SCS 60 kHz as example, for a small TA, the offset X=16 µs+TA is still less than one symbol, hence the beginning part of one symbol is punctured. For a large TA, the duration of 16 µs+TA corresponds to more than one symbol but less than two symbols, both the first symbol and the beginning part of the second symbol are punctured. However, due to a potential misunderstanding on an exact TA value between the gNB and the UE, for a TA around 1.8 µs, the gNB and the UE may have different understandings about whether one or two symbols are punctured, which impacts the rate matching and mapping of a UL transmission. It may also impact the DMRS position of the UL transmission, especially for PUSCH type B. Similarly, there could exist confusion between the gNB and the UE for a TA associated with one symbol for offset X=TA. If TA is 'one symbol with SCS 30 kHz-16 µs', offset 16 µs+TA may result in confusion for SCS 30 kHz too.

Denote the largest allowed gap between DL signal and UL signal as Gmax in the operation of LBT CAT-1, for example, Gmax is 16 µs by regulation. Denote the minimum allowed gap between DL signal and UL signal as Gmin in the operation of LBT CAT-1. Gmin can be as small as 0 µs if the UE may not need to receive the last part of the DL signal. Alternatively, Gmin needs to be larger than a threshold, for example, the threshold can be related to DL-to-UL switching time. It is to be appreciated that the value of Gmin is nt restricted.

Case A: According to a Reference Symbol Boundary and Offset X Indicated by a gNB, a UE is Responsible for Making a Gap Between a DL Signal and a UL Signal within the Range of [Gmin, Gmax]

In some embodiments, a reference symbol boundary is denoted as the start of OS k. A start position is generated at or after the start of symbol k. A UE could assume OS k−1 is a full DL symbol. The first full UL symbol is denoted as OS k+b, where the length of one symbol is L. Value b may be predefined, high layer configured, or derived by other parameters. The UE transmits a CP extension if necessary to make the gap between the DL signal and the UL signal no larger than Gmax. If floor(X/L)==b−1, the UE could transmit a signal with length mod(L-X, L) before OS k+b, so that the gap between the DL signal and the UL signal is Gmax. Otherwise, if floor(X/L)==b && mod(X, L)<Gmax−Gmin, the UE could perform UL transmission starting from OS k+b, which results in a reduced gap between the DL signal and the UL signal of Gmax−mod(X, L).

Figure 10:
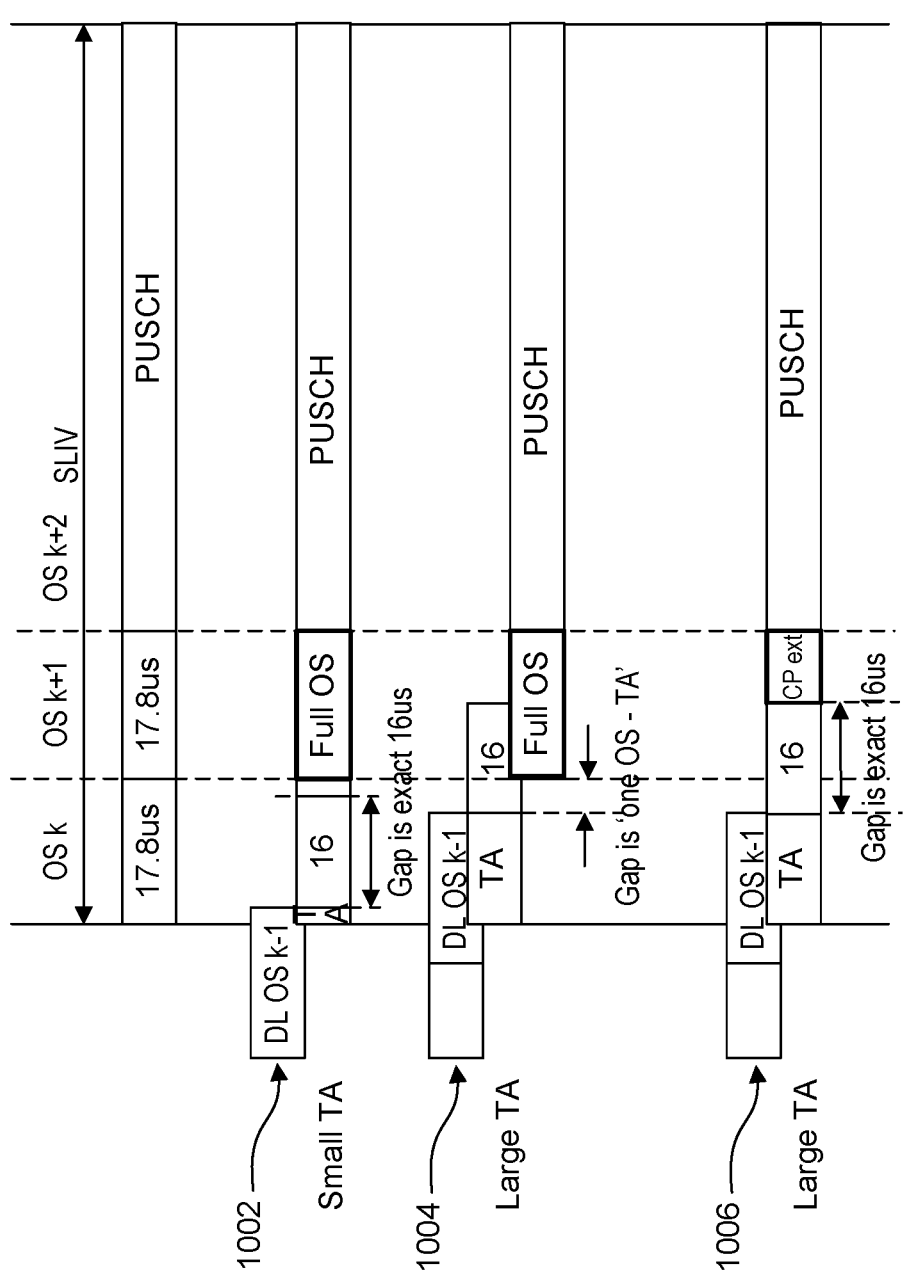

FIG. 10 graphically illustrates exemplary offsets having start positions no earlier than OS k in accordance with various embodiments. As illustrated at 902 and 904, assuming b equals 1, the first full symbol for PUSCH is OS k+1. OS k−1 is a full DL symbol. As illustrated at 1002, for a small TA, the offset X=16 µs+TA is less than one symbol, and the remaining part in OS k with length 'one OS−X' can be a CP extension of OS k+1. As illustrated at 1004, for a large TA, the offset X=16 µs+TA is longer than one symbol, and the UE transmits a full OS k+1, which reduces the gap to 'one OS−TA'.

In some embodiments, the reference symbol boundary is denoted as the start of OS k, a gNB could set a proper value of TA0, so that there is no confusion on the first full UL symbol in the whole potential range of TA=TA0+d. Assuming d is in [0, D], for example, for a small cell up to radius 300 meters, D is about 2 µs for round-trip delay. Assuming TA0 is set of 13 µs for UL-DL switching time, the range of TA is in [13, 15]. The offset X=16 µs+TA is in [29, 31] µs, which overlaps with OS k+1. As illustrated at 906, a UE could generate a gap of 16 µs between a DL signal and a UL signal, and transmit the first full OS in OS k+2. When the offset X=TA is overlapped with OS k, the UE could transmit the first full OS in OS k+1.

In some embodiments, denote the first full UL symbol as OS k, where the length of one symbol is L. A start position may be generated no later than the start of symbol k. Let a reference symbol boundary be denoted as the start of OS k-b, a UE could assume OS k−b−1 is a DL symbol. Value b is predefined, high layer configured, or can be derived by other parameters. The UE transmits a CP extension if necessary to make the gap between the DL signal and the UL signal no larger than Gmax. If floor(X/L)==b−1, the UE could transmit a signal with length mod(L−X, L) before OS k, so that gap between the DL signal and the UL signal is Gmax. Otherwise, if floor(X/L)==b && mod(X, L)<Gmax−Gmin, the UE could transmit an UL transmission starting from OS k, which results in a reduced gap between the DL signal and the UL signal of Gmax−mod(X, L).

Figure 11:
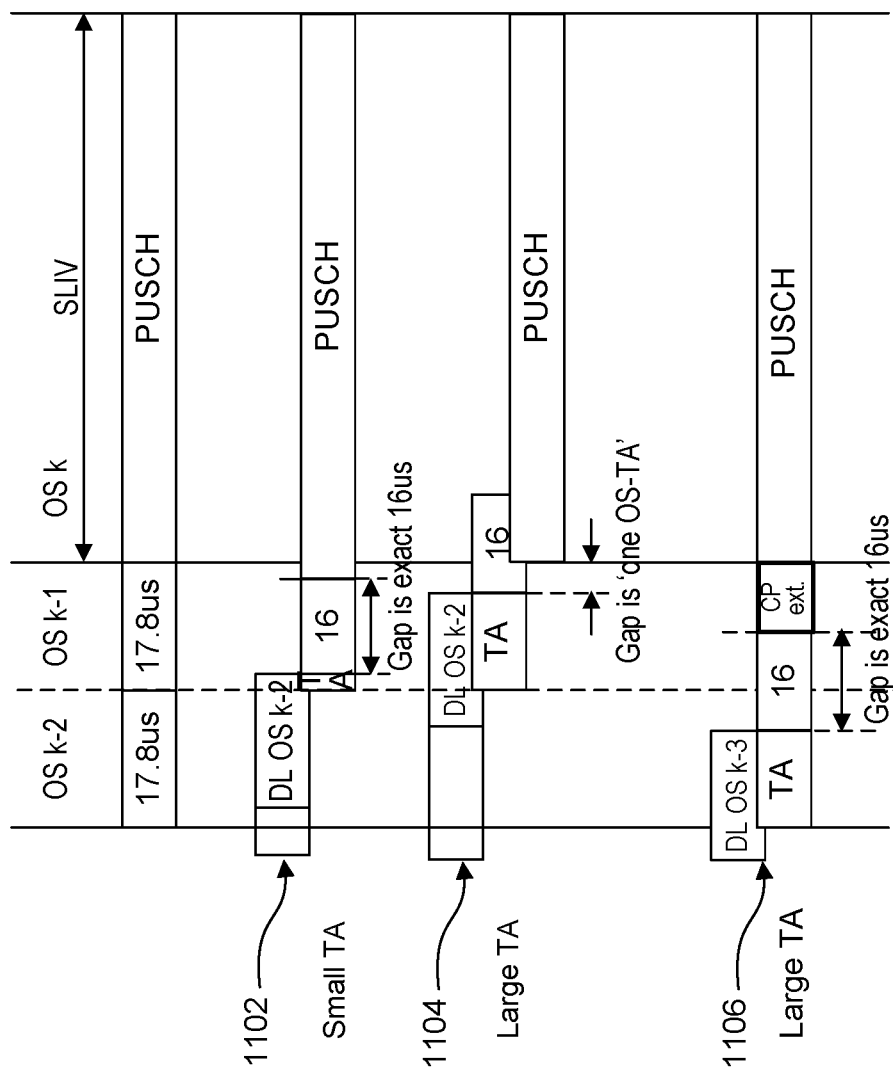

FIG. 11 graphically illustrates exemplary offsets having start positions no later than OS k in accordance with various embodiments. As illustrated at 1102 and 1104, assuming b equals 1, a reference symbol boundary may be the start of OS k−1. OS k−2 is a full DL symbol. As illustrated at 1102, for a small TA, the offset X=16 µs+TA is still less than one symbol. Thus, the remaining part in OS k−1 with a length of 'one OS−X' can be a CP extension of OS k. As illustrated at 1104, for a large TA, the offset X=16+TA is longer than one symbol. Thus, the UE can transmit a full OS k, which reduces the gap to 'one OS−TA'.

In some embodiments, a first full UL symbol is OS k, a gNB could set a proper value of TA0, so that there is no confusion on reference symbol boundary in the whole potential range of TA=TA0+d. Assuming d is in [0, D] µs, for example, for a small cell up to radius 300 meters, D is about 2 µs for round-trip delay. Assuming TA0 is set of 13 µs for UL-DL switching time, the range of TA is in [13, 15] µs. The offset X=16+TA is in [29, 31] µs. A fixed reference symbol boundary is derived as OS k−2. OS k−3 is a full DL symbol. Therefore, offset X=16 µs+TA overlaps with OS k−1. As illustrated at 1106, a UE could generate a gap of 16 µs between a DL signal and a UL signal, and transmit the first full OS in OS k. For the offset X=TA, a fixed reference symbol boundary is derived as OS k−1. The offset X=TA may overlap with OS k−1. A UE could transmit the first full OS in OS k.

Case B: GNB is Responsible to Make a Gap Between DL Signal and UL Signal within the Range of [Gmin, Gmax] and UE Always Start UL Transmission with Full OS k Denote the length of one symbol as L. A gNB could transmit a last full DL OS k−b−1. Value b is predefined, high layer configured, or can be derived by other parameters. Value b can be up to gNB implementation. The gNB could transmit a padding signal, for example, cyclic postfix extension of OS k−b−1 if necessary to make the gap between the DL signal and the UL signal no larger than Gmax. Make Z equal to (Gmax+TA), where Z is the length that a DL transmission should be reduced to make a gap of Gmax between the DL signal and the UL signal. If floor(Z/L)==b−1, the gNB could transmit a signal with length mod(L-Z, L)

after OS k–b–1, so that gap between the DL signal and the UL signal is Gmax. Otherwise, if floor(Z/L)==b && mod(Z, L)<Gmax–Gmin, the gNB could still stop the DL transmission after OS k–b–1, which results in a reduced gap between the DL signal and the UL signal of Gmax–mod(Z, L).

Figure 12:
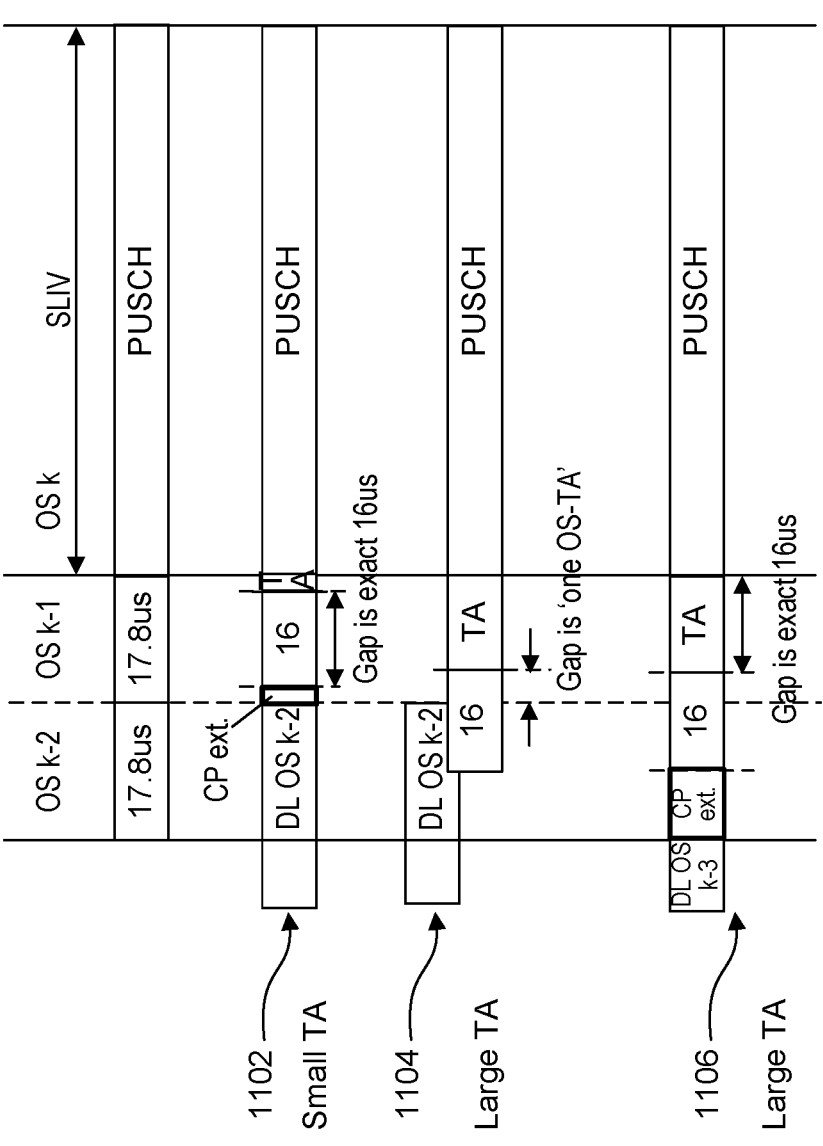

FIG. 12 graphically illustrates exemplary offsets having start positions fixed to OS k in accordance with various embodiments As illustrated at 1202 and 1204, assuming b equals 1, the gNB could transmit a last full DL OS k–2. As illustrated at 1202, for a small TA, Z=16 μs+TA is still less than one symbol. Thus, the gNB transmits a padding signal of cyclic postfix extension after OS k–2 with a length of 'one OS–Z.' As illustrated at 1204, for a large TA, the offset Z=16 μs+TA is longer than one symbol. Thus, the gNB transmits a full DL OS k–2, which reduces the gap to a length of 'one OS–TA.'

In some embodiments, let a first full UL symbol be OS k, a gNB could set a proper value of TA0, so that there is no confusion on last full DL symbol in the whole potential range of TA=TA0+d. Assuming d is in [0, D] μs, for example, for a small cell up to radius 300 meters, D is about 2 μs for round-trip delay. Assuming TA0 is set of 13 μs for UL-DL switching time, the range of TA is in [13, 15] μs. In some embodiments, Z=16 μs+TA is in the range of [29, 31] μs. A fixed last full DL symbol is derived as OS k–3. As illustrated at 1206, the gNB transmits a padding signal of cyclic postfix extension after OS k–3, generates a gap of 16 μs between a DL signal and a UL signal so that the UE performs a UL transmission from a full UL OS k.

Start Positions of CG PUSCH

As described above, the start positions of a UL transmission could generally be expressed as 'reference symbol boundary+X μs.' The reference symbol boundary can be indicated by a gNB or interpreted based on gNB's scheduling information and the reference symbol boundary can be the start of OS k if a start position of the UL transmission scheduled by the gNB is at or after the start of symbol k. The beginning X μs of the UL transmission can be punctured. Alternatively, the reference symbol boundary can be the start of OS k–1 or OS k–2 if the start position of the UL transmission scheduled by the gNB is no later than the start of symbol k. A padding signal, for example, a CP extension of OS k, can be transmitted before OS k. In some embodiments, the start position could depend on PUSCH type A or B. In some embodiments, the start positions can depend on SCS. In this section, potential values of offset X are provided for CG PUSCH.

In some embodiments, the potential start positions can be generated within 1 or 2 symbols. If CG PUSCH occupies full bandwidth and is outside a gNB-initiated COT, potential start positions can be generated within 1 symbol for SCS 15 kHz and 30 kHz, and within two symbols for SCS 60 kHz. For SCS 15 kHz, offset X can be 16 μs, 25 μs, 34 μs, 43 μs, 52 μs, 61u μs, 1 symbol; For SCS 30 kHz, offset X can be 16 μs, 25 μs, 1 symbol; For SCS 60 kHz, offset X can be 16 μs, 25 μs, 2 symbols. Alternatively, for SCS 60 kHz, offset X can be fixed to two symbols. If CG PUSCH occupies full bandwidth and is inside a gNB-initiated COT, only those start positions with X larger than 25 μs can be supported. For SCS 15 kHz, offset X can be 34 μs, 43 μs, 52 μs, 61 μs, 1 symbol; For SCS 30 kHz, offset X can be 1 symbol; For SCS 60 kHz, offset X can be 2 symbols. In some embodiments, for PUSCH type B, offset X for SCS 30 kHz and 60 kHz could make start from the first symbol of PUSCH. Alternatively, only those start positions with X larger than 16 μs can be supported since GB PUSCH can be scheduled with NO LBT. If CG PUSCH occupies less than all interlaces of the frequency resources, the exact value X can be high layer configured.

In some embodiments, the potential start positions can be generated within a one-symbol duration of SCS 15 kHz. If CG PUSCH occupies full bandwidth and is outside a gNB-initiated COT, a potential start position offset X within 1 symbol for SCS 15 kHz can be 16 μs, 25 μs, 34 μs, 43 μs, 52 μs, 61 μs, 1 symbol, etc. The same X values can be applied to SCS 30 kHz and 60 kHz as well. If CG PUSCH occupies full bandwidth and is inside a gNB-initiated COT, only those start positions with X larger than 25 μs can be supported, for example, offset X can be 34 μs, 43 μs, 52 μs, 61 μs, 1 symbol, etc. Alternatively, only those start positions with X larger than 16 μs can be supported since GB PUSCH can be scheduled with NO LBT, for example, offset X can be 25 μs, 34 μs, 43 μs, 52 μs, 61 μs, 1 symbol, etc. If CG PUSCH occupies less than all interlaces of frequency resources, the exact value X can be high layer configured.

In some embodiments, for a 15 kHz SCS and for CG PUSCH occupying full bandwidth or partial bandwidth and performing transmission outside a gNB's COT, the following starting positions are allowed: 16 μs, 25 μs, 34 μs, 43 μs, 52 μs, 61 μs, 1 symbol, etc. For a 30 kHz SCS and for CG PUSCH occupying full bandwidth or partial bandwidth and performing transmission outside a gNB's COT, the following starting positions are allowed: 16 μs, 25 μs, 1 symbol, etc. For a 60 kHz SCS and for CG PUSCH occupying full bandwidth or partial bandwidth and performing transmission inside a gNB's COT, the first N symbols can be used as a starting position starting from the second symbol, where N is predefined or configured by RRC signaling.

In some embodiments, for a 15 kHz SCS and for CG PUSCH occupying full bandwidth or partial bandwidth and performing transmission inside a gNB's COT, the following starting positions are allowed: 34 μs, 43 μs, 52 μs, 61 μs, 1 symbol, etc. For a 30 kHz SCS and for CG PUSCH occupying full bandwidth or partial bandwidth and performing transmission inside a gNB's COT, the following starting positions are allowed: first symbol+16 μs, first symbol+25 μs, second symbol. For a 60 kHz SCS and for CG PUSCH occupying full bandwidth or partial bandwidth and performing transmission inside a gNB's COT, the first N symbols can be used as a starting position starting from the second symbol, where N is predefined or configured by RRC signaling.

In some embodiments, for a 15 kHz SCS and CG PUSCH occupying full bandwidth or partial bandwidth, the following starting positions can be allowed:

outside the gNB's MCOT:{16 μs, 25 μs, 34 μs, 43 μs, 52 μs, 61 μs, OS #1}; and inside the gNB's MCOT: {34 μs, 43 μs, 52 μs, 61 μs, OS #1}.

For SCS 30 kHz, the same offset(s) for SCS 15 kHz are reused, and the offset(s) extend over two OFDM symbols:

outside the gNB's MCOT:{16 μs, 25 μs, 34 μs, 43 μs, 52 μs, 61 μs, OS #2}; and inside the gNb's MCOT: {34 μs, 43 μs, 52 μs, 61 μs, OS #2}.

For SCS 60 kHz, the same offset(s) for SCS 15 kHz are reused up to two OFDM symbols:

outside the gNB's MCOT:{16 μs, 25 μs, 34 μs, OS #2}. Alternatively, since 34 μs is almost the same duration as 2 symbols, the offsets can be {16 μs, 25 μs, OS #2}.

inside the gNB's MCOT: {34 μs, OS #2}. Alternatively, the offsets can be {OS #2}.

For SCS 30 kHz and 60 kHz, the UCI for CG carriers indication on whether the first two symbols are used throughout two bits, which indicate: (i) whether the CG data transmission starts from symbol #0; (ii) whether the CG data transmission starts from symbol #1, or (iii) whether the CG data transmission starts from symbol #2. For example, "00"->shared channel uplink (SCH-UL) starts from symbol 0; "01"->SCH-UL starts from symbol 1; "10"->SCH-UL starts from symbol 2; "11"->reserved.

In some embodiments, one table of SLIV can be configured for potential time domain resources. For a GB PUSCH, a UE can follow the start symbol indicated by each row of the table as the start symbol of GB PUSCH. While for CG PUSCH, an additional offset b can be added to the start symbol indicated by a row of the table, for example, the start symbol is indicated as k by a row, then the start symbol of CG PUSCH is exactly symbol k+b. In this way, even if the same set of start positions offset X can be used, it still gives GB PUSCH priority over CG PUSCH. That is, CG PUSCH is prioritized lower than GB PUSCH. In some embodiments, a separated table of SLIV can be used to conFIG. CG PUSCH from GB PUSCH. In this way, it is possible to manage the SLIV in the table for CG PUSCH.

In some embodiments, within a gNB-initiated shared COT, NO LBT can be indicated in DCI for GB PUSCH; however, 25 μs LBT can be used for CG PUSCH if CG PUSCH inside a COT is allowed. In this embodiment, priority is given to GB PUSCH. In some embodiments, once GB PUSCH is not transmitted or the signal of GB PUSCH is not strong enough to make CCA of CG PUSCH succeed, CG PUSCH can still be transmitted. In some embodiments, once the signal of GB PUSCH is not strong enough to make CCA of CG PUSCH fail, CG PUSCH can still be transmitted.

Exemplary Systems

Figure 13:
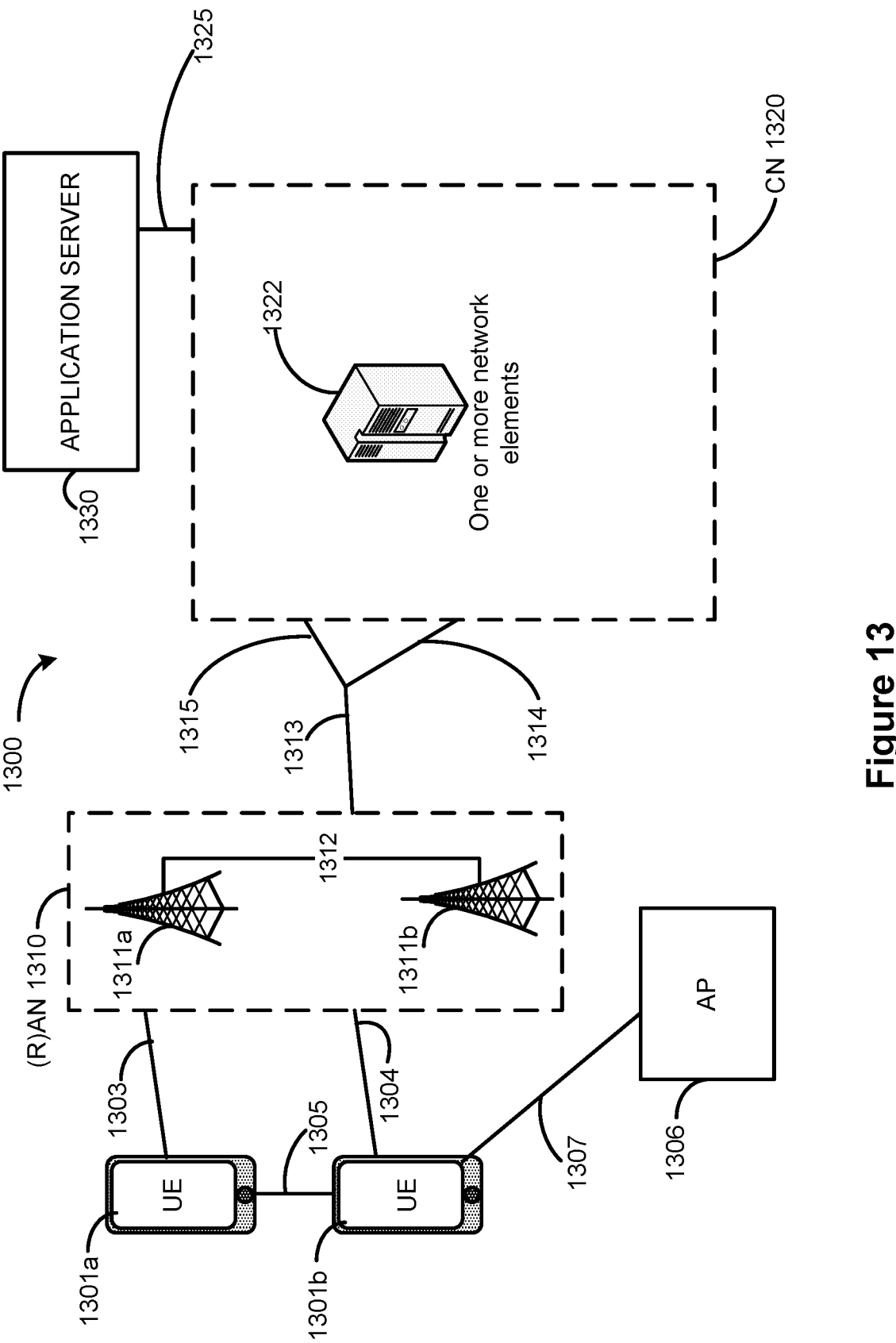
FIG. 13 illustrates exemplary architecture of a system of a network in accordance with various embodiments.

FIG. 13 illustrates exemplary architecture of a system of a network in accordance with various embodiments. The following description is provided for an example system 1300 that operates in conjunction with the Long Term Evolution (LTE) system standards and Fifth Generation (5G) or NR system standards as provided by Third Generation Partnership Project (3GPP) technical specifications. However, the example embodiments are not limited in this regard and the described embodiments may apply to other networks that benefit from the principles described herein, such as future 3GPP systems (for example, Sixth Generation (6G)) systems, IEEE 802.16 protocols (for example, WLAN, WiMAX, etc.), or the like.

As illustrated in FIG. 13, the system 1300 includes User Equipment (UE) 1301a and UE 1301b (collectively referred to as "UEs 1301" or "UE 1301"). In this example, UEs 1301 are illustrated as smartphones (for example, handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1301 may be Internet of Things (IoT) UEs, which may comprise a network access layer designed for low-power IoT applications utilizing short-lived UE connections. An IoT UE can utilize technologies such as Machine-to-Machine (M2M) or Machine-Type Communications (MTC) for exchanging data with an MTC server or device via a Public Land Mobile Network (PLMN), Proximity-Based Service (ProSe), or Device-to-Device (D2D) communication, sensor networks, or IoT networks. The M2M or MTC exchange of data may be a machine-initiated exchange of data. An IoT network describes interconnecting IoT UEs, which can include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 1301 can be configured to connect, for example, communicatively couple, with a Radio Access Network (RAN) 1310. In some embodiments, the RAN 1310 may be a Next Generation (NG) RAN or a 5G RAN, an evolved Universal Terrestrial Radio Access Network (E-UTRAN), or a legacy RAN, such as a UTRAN or GSM EDGE Radio Access Network (GERAN). As used herein, the term "NG RAN," or the like, may refer to a RAN 1310 that operates in an NR or 5G system 1300, and the term "E-UTRAN," or the like, may refer to a RAN 1310 that operates in an LTE or 4G system 1300. The UEs 1301 utilize connections (or channels) 1303 and 1304, respectively, each of which comprises a physical communications interface or layer (described in further detail below).

In this example, the connections 1303 and 1304 are illustrated as an air interface to enable communicative coupling, and can be consistent with cellular communications protocols, such as a Global System for Mobile Communications (GSM) protocol, a Code-Division Multiple Access (CDMA) network protocol, a Push-to-Talk (PTT) protocol, a Push-to-Talk over Cellular (POC) protocol, a Universal Mobile Telecommunications System (UMTS) protocol, a 3GPP LTE protocol, a 5G protocol, a NR protocol, and/or any of the other communications protocols described herein. In some embodiments, the UEs 1301 may directly exchange communication data via a Proximity-Based Service (ProSe) interface 1305. The ProSe interface 1305 may alternatively be referred to as a sidelink (SL) interface 1305 and may comprise one or more logical channels, including but not limited to a Physical Sidelink Control Channel (PSCCH), a Physical Sidelink Shared Channel (PSSCH), a Physical Sidelink Downlink Channel (PSDCH), and a Physical Sidelink Broadcast Channel (PSBCH).

The UE 1301b is shown to be configured to access an Access Point (AP) 1306 (also referred to as "WLAN node 1306," "WLAN 1306," "WLAN Termination 1306," "WT 1306" or the like) via connection 1307. The connection 1307 can comprise a local wireless connection, such as a connection consistent with any IEEE 802.11 protocol, wherein the AP 1306 would comprise a wireless fidelity (Wi-Fi®) router. In this example, the AP 1306 is shown to be connected to the Internet without connecting to the core network of the wireless system (described in further detail below). In various embodiments, the UE 1301b, RAN 1310, and AP 1306 can be configured to utilize LWA operation and/or LWIP operation. The LWA operation may involve the UE 1301b in RRC_CONNECTED being configured by a RAN node 1311a-b to utilize radio resources of LTE and WLAN. LWIP operation may involve the UE 1301b using WLAN radio resources (for example, connection 1307) via IPsec protocol tunneling to authenticate and encrypt packets (for example, IP packets) sent over the connection 1307. IPsec tunneling can include encapsulating the entirety of original IP packets and adding a new packet header, thereby protecting the original header of the IP packets.

The RAN 1310 can include one or more AN nodes or RAN nodes 1311a and 1311b (collectively referred to as "RAN nodes 1311" or "RAN node 1311") that enable the connections 1303 and 1304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (for example, terrestrial access points) or satellite stations providing coverage within a geographic area (for example, a cell). As used herein, the term "NG RAN node" or the like may refer to a RAN node 1311 that operates in an NR or 5G system 1300 (for example, a gNB), and the term "E-UTRAN node" or the like may refer to a RAN node 1311 that operates in an LTE or 4G system 1300 (for example, an eNB). In accordance with various embodiments, the RAN nodes 1311 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1311 can be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1311; a MAC/PHY split wherein RRC, PDCP, RLC, and MAC layers are operated by the CRAN/vBBUP and the PHY layer is operated by individual RAN nodes 1311; or a "lower PHY" split wherein RRC, PDCP, RLC, MAC layers and upper portions of the PHY layer are operated by the CRAN/vBBUP and lower portions of the PHY layer are operated by individual RAN nodes 1311. This virtualized framework allows the freed-up processor cores of the RAN nodes 1311 to perform other virtualized applications. In some embodiments, an individual RAN node 1311 may represent individual gNB-DUs that are connected to a gNB-CU via individual F1 interfaces (not illustrated in FIG. 13). In these implementations, the gNB-DUs can include one or more remote radio heads or RFEMs (see, for example, FIG. 16), and the gNB-CU may be operated by a server that is located in the RAN 1310 (not shown) or by a server pool in a similar manner as the CRAN/vBBUP. Additionally or alternatively, one or more of the RAN nodes 1311 may be next generation eNBs (ng-eNBs), which are RAN nodes that provide E-UTRA user plane and control plane protocol terminations toward the UEs 1301, and are connected to a 5GC (for example, CN 520 of FIG. 15) via an NG interface (described infra).

In V2X scenarios, one or more of the RAN nodes 1311 may be or act as RSUs. The term "Road Side Unit" or "RSU" may refer to any transportation infrastructure entity used for V2X communications. An RSU can be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1301 (vUEs 1301). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and can include a network interface controller to provide a wired connection (for example, Ethernet) to a traffic signal controller and/or a backhaul network.

Any of the RAN nodes 1311 can terminate the air interface protocol and can be the first point of contact for the UEs 1301. In some embodiments, any of the RAN nodes 1311 can fulfill various logical functions for the RAN 1310 including, but not limited to, radio network controller (RNC) functions such as radio bearer management, uplink and downlink dynamic radio resource management and data packet scheduling, and mobility management.

In some embodiments, the UEs 1301 can be configured to communicate using OFDM communication signals with each other or with any of the RAN nodes 1311 over a multicarrier communication channel in accordance with various communication techniques, such as, but not limited to, an OFDMA communication technique (for example, for downlink communications) or a SC-FDMA communication technique (for example, for uplink and ProSe or sidelink communications), although the scope of the embodiments is not limited in this respect. The OFDM signals can comprise multiple orthogonal subcarriers.

In some embodiments, a downlink resource grid can be used for downlink transmissions from any of the RAN nodes 1311 to the UEs 1301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In accordance with various embodiments, the UEs 1301 and the RAN nodes 1311 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 1400 MHz to approximately 3.8 GHz, whereas the unlicensed spectrum can include the 5 GHz band.

To operate in the unlicensed spectrum, the UEs 1301 and the RAN nodes 1311 may operate using LAA, eLAA, and/or feLAA mechanisms. In these implementations, the UEs 1301 and the RAN nodes 1311 may perform one or more known medium-sensing operations and/or carrier-sensing operations to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1301, RAN nodes 1311, etc.) senses a medium (for example, a channel or carrier frequency) and transmits when the medium is sensed to be idle (or when a specific channel in the medium is sensed to be unoccupied). The medium sensing operation can include CCA, which utilizes at least ED to determine the presence or absence of other signals on a channel to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (for example, a mobile station (MS) such as UE 1301, AP 1306, or the like) intends to transmit, the WLAN node may first perform CCA before transmission. Additionally, a backoff mechanism can be used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some embodiments, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands can experience different pathloss. A primary service cell or PCell provides a PCC for both UL and DL, and handles RRC and NAS related activities. The other serving cells are referred to as SCells, and each SCell provides an individual SCC for both UL and DL. The SCCs may be added and removed as required, while changing the PCC may require the UE 1301 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE can be configured with more than one LAA SCell, the UE may receive UL grants on the configured LAA SCells indicating different PUSCH starting positions within a same subframe.

The PDSCH carries user data and higher-layer signaling to the UEs 1301. The PDCCH carries information about the transport format and resource allocations related to the PDSCH channel, among other things. It may also inform the UEs 1301 about the transport format, resource allocation, and HARQ information related to the uplink shared channel. Typically, downlink scheduling (assigning control and shared channel resource blocks to the UE 1301$b$ within a cell) may be performed at any of the RAN nodes 1311 based on channel quality information fed back from any of the UEs 1301. The downlink resource assignment information may be sent on the PDCCH used for (for example, assigned to) each of the UEs 1301.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1311 can be configured to communicate with one another via interface 212. In some embodiments where the system 1300 is an LTE system (for example, when CN 1320 is an EPC 1420 as in FIG. 14), the interface 212 may be an X2 interface 212. The X2 interface may be defined between two or more RAN nodes 1311 (for example, two or more eNBs and the like) that connect to EPC 1320, and/or between two eNBs connecting to EPC 1320. In some embodiments, the X2 interface can include an X2 user plane interface (X2-U) and an X2 control plane interface (X2-C). The X2-U provides flow control mechanisms for user data packets transferred over the X2 interface, and may be used to communicate information about the delivery of user data between eNBs. For example, the X2-U provides specific sequence number information for user data transferred from a MeNB to an SeNB; information about successful in sequence delivery of PDCP PDUs to a UE 1301 from an SeNB for user data; information of PDCP PDUs that were not delivered to a UE 1301; information about a current minimum desired buffer size at the SeNB for transmitting to the UE user data; and the like. The X2-C provides intra-LTE access mobility functionality, including context transfers from source to target eNBs, user plane transport control, etc.; load management functionality; as well as inter-cell interference coordination functionality.

In some embodiments where the system 1300 is a 5G or NR system (for example, when CN 1320 is an 5GC 520 as in FIG. 15), the interface 212 may be an Xn interface 212. The Xn interface is defined between two or more RAN nodes 1311 (for example, two or more Next Generation NodeBs (gNBs) and the like) that connect to 5GC 1320, between a RAN node 1311 (for example, a gNB) connecting to 5GC 1320 and an evolved NodeB (eNB), and/or between two eNBs connecting to 5GC 1320. In some embodiments, the Xn interface can include an Xn user plane (Xn-U) interface and an Xn control plane (Xn-C) interface. The Xn-U provides non-guaranteed delivery of user plane Protocol Data Units (PDUs) and support/provide data forwarding and flow control functionality. The Xn-C provides management and error handling functionality, functionality to manage the Xn-C interface; mobility support for UE 1301 in a connected mode (for example, CM-CONNECTED) including functionality to manage the UE mobility for connected mode between one or more RAN nodes 1311. The mobility support can include context transfer from an old (source) serving RAN node 1311 to new (target) serving RAN node 1311; and control of user plane tunnels between old (source) serving RAN node 1311 to new (target) serving RAN node 1311. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP may be on top of an IP layer, and provides the guaranteed delivery of application layer messages. In the transport IP layer, point-to-point transmission can be used to deliver the signaling PDUs. In other implementations, the Xn-U protocol stack and/or the Xn-C protocol stack may be same or similar to the user plane and/or control plane protocol stack(s) shown and described herein.

The RAN 1310 is shown to be communicatively coupled to a core network—in this embodiment, core network (CN) 1320. The CN 1320 may comprise multiple network elements 1322, which are configured to offer various data and telecommunications services to customers/subscribers (for example, users of UEs 1301) who are connected to the CN 1320 via the RAN 1310. The components of the CN 1320 can be implemented in one physical node or separate physical nodes including components to read and execute instructions from a machine-readable or computer-readable medium (for example, a non-transitory machine-readable storage medium). In some embodiments, Network Functions Virtualization (NFV) may be utilized to virtualize any or all of the above-described network node functions via executable instructions stored in one or more computer-readable storage mediums (described in further detail below). A logical instantiation of the CN 1320 may be referred to as a network slice, and a logical instantiation of a portion of the CN 1320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1330 may be an element offering applications that use IP bearer resources with the core network (for example, Universal Mobile Telecommunications System (UMTS) Packet Services (PS) domain, LTE PS data services, etc.). The application server 1330 can also be configured to support one or more communication services (for example, VoIP sessions, PTT sessions, group communication sessions, social networking services, etc.) for the UEs 1301 via the CN 1320.

In some embodiments, the CN 1320 may be a 5GC (referred to as "5GC 1320" or the like), and the RAN 1310 may be connected with the CN 1320 via an NG interface 1313. In some embodiments, the NG interface 1313 may be split into two parts, an NG user plane (NG-U) interface 1314, which carries traffic data between the RAN nodes 1311 and a UPF, and the S1 control plane (NG-C) interface 1315, which is a signaling interface between the RAN nodes 1311 and AMFs. Embodiments where the CN 1320 is a 5GC 1320 are described in more detail with regard to FIG. 15.

In some embodiments, the CN 1320 may be a 5G CN (referred to as "5GC 1320" or the like), while in other embodiments, the CN 1320 may be an EPC). Where CN 1320 is an EPC (referred to as "EPC 1320" or the like), the RAN 1310 may be connected with the CN 1320 via an S1 interface 1313. In some embodiments, the S1 interface 1313 may be split into two parts, an S1 user plane (S1-U) interface 1314, which carries traffic data between the RAN nodes 1311 and the S-GW, and the S1-MME interface 1315, which is a signaling interface between the RAN nodes 1311 and MMEs. An example architecture wherein the CN 1320 is an EPC 1320 is illustrated in FIG. 14.

Exemplary Architectures

Figure 14:
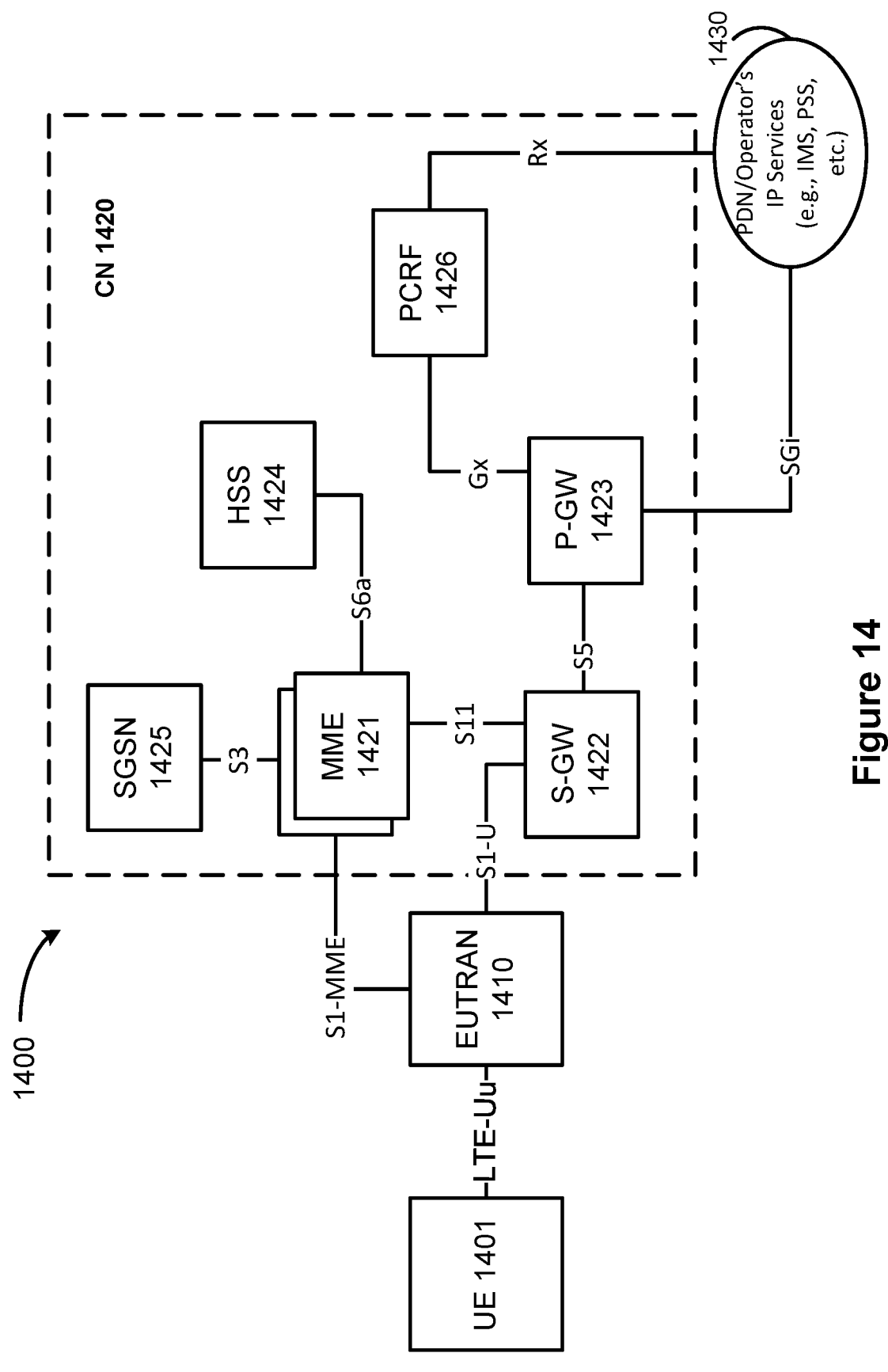
FIG. 14 illustrates an example architecture of a system including a first CN in accordance with various embodiments.

FIG. 14 illustrates an example architecture of a system 1400 including a first CN 1420 in accordance with various embodiments. In this example, system 1400 may implement the LTE standard wherein the CN 1420 is an EPC 1420 that corresponds with CN 1320 of FIG. 13. Additionally, the UE 1301 may be the same or similar as the UEs 1301 of FIG. 13, and the E-UTRAN 1310 may be a RAN that is the same or similar to the RAN 1310 of FIG. 13, and which can include RAN nodes 1311 described previously. The CN 1420 may comprise Mobility Management Entities (MMEs) 1421, a Serving Gateway (S-GW) 1422, a PDN Gateway (P-GW) 1423, a Home Subscriber Server (HSS) 1424, and a Serving GPRS Support Node (SGSN) 1425.

The MMEs 1421 may be similar in function to the control plane of legacy SGSN, and may implement Mobility Management (MM) functions to keep track of the current location of a UE 1301. The MMEs 1421 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1301, provide user identity confidentiality, and/or perform other like services to users/subscribers. Each UE 1301 and the MME 1421 can include an MM or EMM sublayer, and an MM context may be established in the UE 1301 and the MME 1421 when an attach procedure is successfully completed. The MM context may be a data structure or database object that stores MM-related information of the UE 1301. The MMEs 1421 may be coupled with the HSS 1424 via an Sha reference point, coupled with the SGSN 1425 via an S3 reference point, and coupled with the S-GW 1422 via an S11 reference point.

The SGSN 1425 may be a node that serves the UE 1301 by tracking the location of an individual UE 1301 and performing security functions. In addition, the SGSN 1425 may perform Inter-EPC node signaling for mobility between 2G/3G and E-UTRAN 3GPP access networks; PDN and S-GW selection as specified by the MMEs 1421; handling of UE 1301 time zone functions as specified by the MMEs 1421; and MME selection for handovers to E-UTRAN 3GPP access network. The S3 reference point between the MMEs 1421 and the SGSN 1425 may enable user and bearer information exchange for inter-3GPP access network mobility in idle and/or active states.

The HSS 1424 may comprise a database for network users, including subscription-related information to support the network entities' handling of communication sessions. The EPC 1420 may comprise one or several HSSs 1424, depending on the number of mobile subscribers, on the capacity of the equipment, on the organization of the network, etc. For example, the HSS 1424 can provide support for routing/roaming, authentication, authorization, naming/addressing resolution, location dependencies, etc. An Sha reference point between the HSS 1424 and the MMEs 1421 may enable transfer of subscription and authentication data for authenticating/authorizing user access to the EPC 1420 between HSS 1424 and the MMEs 1421.

The S-GW 1422 may terminate the S1 for the user plane (S1-U) interface toward the RAN 1310, and routes data packets between the RAN 1310 and the EPC 1420. In addition, the S-GW 1422 may be a local mobility anchor point for inter-RAN node handovers and also provides an anchor for inter-3GPP mobility. Other responsibilities can include lawful intercept, charging, and some policy enforcement. The S11 reference point between the S-GW 1422 and the MMEs 1421 provides a control plane between the MMEs 1421 and the S-GW 1422. The S-GW 1422 may be coupled with the P-GW 1423 via an S5 reference point.

The P-GW 1423 may terminate an SGi interface toward a PDN 1430. The P-GW 1423 may route data packets between the EPC 1420 and external networks such as a network including the application server 1330 (alternatively referred to as an "AF") via an IP interface 1325 (see for example, FIG. 13). In some embodiments, the P-GW 1423 may be communicatively coupled to an application server (application server 1330 of FIG. 13 or PDN 1430 in FIG. 14) via an IP communications interface 1325 (see, for example, FIG. 13). The S5 reference point between the P-GW 1423 and the S-GW 1422 provides user plane tunneling and tunnel management between the P-GW 1423 and the S-GW 1422. The S5 reference point may also be used for S-GW 1422 relocation due to UE 1301 mobility and if the S-GW 1422 needs to connect to a non-collocated P-GW 1423 for the required PDN connectivity. The P-GW 1423 may further include a node for policy enforcement and charging data collection (for example, PCEF (not shown)). Additionally, the SGi reference point between the P-GW 1423 and the packet data network (PDN) 1430 may be an operator external public, a private PDN, or an intra operator packet data network, for example, for provision of IMS services. The P-GW 1423 may be coupled with a PCRF 1426 via a Gx reference point.

PCRF 1426 is the policy and charging control element of the EPC 1420. In a non-roaming scenario, there may be a single PCRF 1426 in the Home Public Land Mobile Network (HPLMN) associated with a UE 1301's Internet Protocol Connectivity Access Network (IP-CAN) session. In a roaming scenario with local breakout of traffic, there may be two PCRFs associated with a UE 1301's IP-CAN session, a Home PCRF (H-PCRF) within an HPLMN and a Visited PCRF (V-PCRF) within a Visited Public Land Mobile Network (VPLMN). The PCRF 1426 may be communicatively coupled to the application server 1430 via the P-GW 1423. The application server 1430 may signal the PCRF 1426 to indicate a new service flow and select the appropriate QoS and charging parameters. The PCRF 1426 may provision this rule into a PCEF (not shown) with the appropriate TFT and QCI, which commences the QoS and charging as specified by the application server 1430. The Gx reference point between the PCRF 1426 and the P-GW 1423 may allow for the transfer of QoS policy and charging rules from the PCRF 1426 to PCEF in the P-GW 1423. An Rx reference point may reside between the PDN 1430 (or "AF 1430") and the PCRF 1426.

Figure 15:
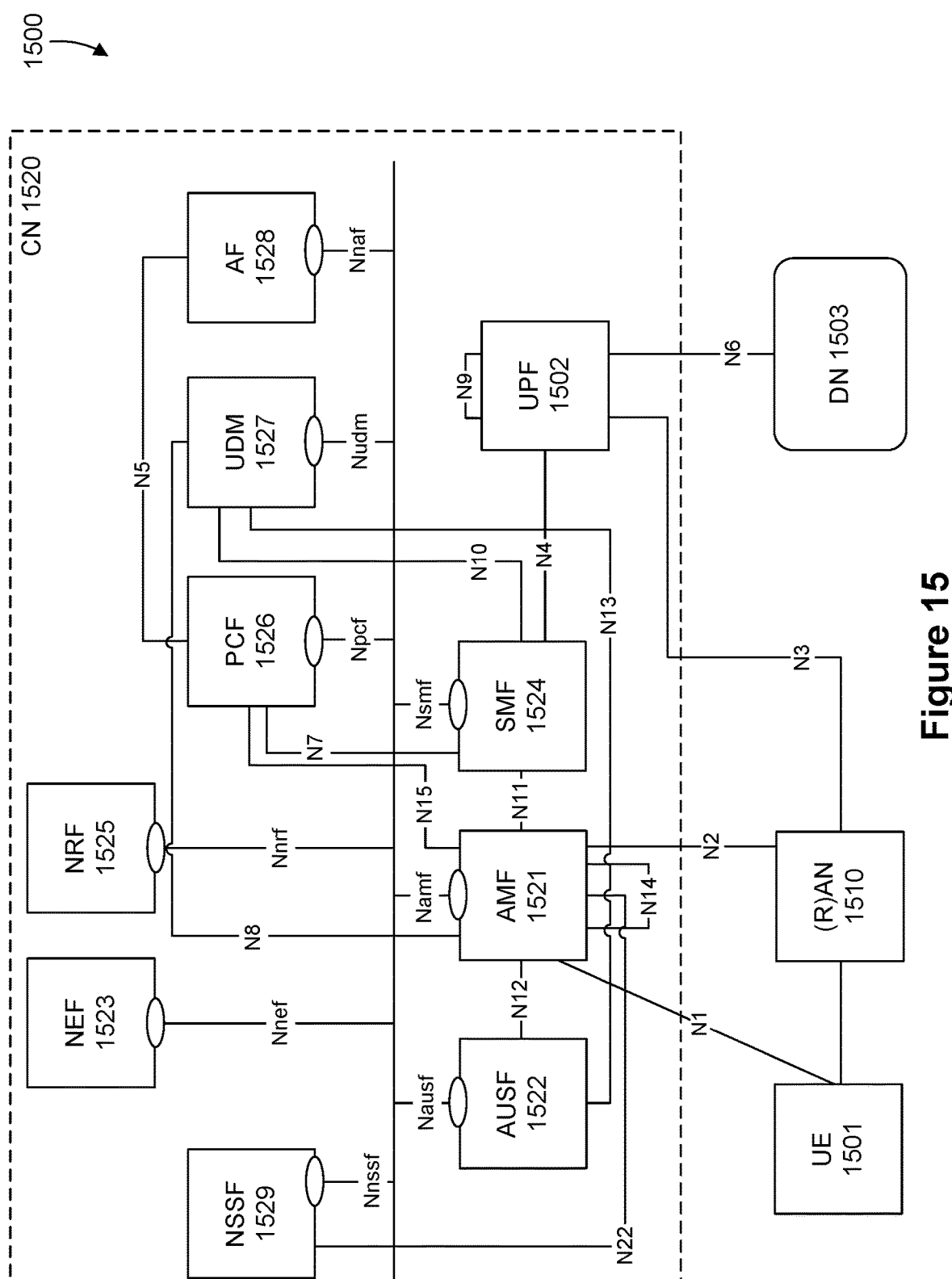
FIG. 15 illustrates an architecture of a system including a second CN in accordance with various embodiments.

FIG. 15 illustrates an architecture of a system 1500 including a second CN520 in accordance with various embodiments. The system 1500 is shown to include a UE 1501, which may be the same or similar to the UEs 1301 and UE 1301 described previously; a (R)AN 1510, which may be the same or similar to the RAN 1310 and RAN 1410 described previously, and which can include RAN nodes 1311 described previously; and a data network (DN) 1503, which may be, for example, operator services, Internet access or 3rd party services; and a 5GC 520. The 5GC 520 can include an Authentication Server Function (AUSF)522; an Access and Mobility Management Function (AMF) 1521; a Session Management Function (SMF) 1524; a Network Exposure Function (NEF) 1523; a PCF 1526; a NF Repository Function (NRF) 1525; a UDM 1527; an Application Function (AF) 1528; a User Plane Function (UPF) 1502; and a Network Slice Selection Function (NSSF) 1529.

The UPF 1502 may act as an anchor point for intra-RAT and inter-RAT mobility, an external PDU session point of interconnect to DN 1503, and a branching point to support multi-homed PDU session. The UPF 1502 may also perform packet routing and forwarding, perform packet inspection, enforce the user plane part of policy rules, lawfully intercept packets (UP collection), perform traffic usage reporting, perform QoS handling for a user plane (for example, packet filtering, gating, UL/DL rate enforcement), perform Uplink Traffic verification (for example, SDF to QoS flow mapping), transport level packet marking in the uplink and downlink, and perform downlink packet buffering and downlink data notification triggering. UPF 1502 can include an uplink classifier to support routing traffic flows to a data network. The DN 1503 may represent various network operator services, Internet access, or third party services. DN 1503 can include, or be similar to, application server 1330 described previously. The UPF 1502 interacts with the SMF 1524 via an N4 reference point between the SMF 1524 and the UPF 1502.

The AUSF 1522 stores data for authentication of UE 1501 and handle authentication-related functionality. The AUSF 1522 may facilitate a common authentication framework for various access types. The AUSF522 communicate with the AMF 1521 via an N12 reference point between the AMF 1521 and the AUSF 1522; and communicate with the UDM527 via an N13 reference point between the UDM 1527 and the AUSF 1522. Additionally, the AUSF 1522 can exhibit an Nausf service-based interface.

The AMF 1521 may be responsible for registration management (for example, for registering UE 1501, etc.), connection management, reachability management, mobility management, and lawful interception of AMF-related events, and access authentication and authorization. The AMF 1521 may be a termination point for the N11 reference point between the AMF 1521 and the SMF 1524. The AMF 1521 provides transport for Session Management (SM) messages between the UE 1501 and the SMF 1524, and act as a transparent pro15 for routing SM messages. AMF 1521 may also provide transport for Short Message Service (SMS) messages between UE 1501 and an SMS Function (SMSF) (not illustrated in FIG. 15). AMF 1521 may act as a Security Anchor Function (SEAF), which can include interaction with the AUSF 1522 and the UE 1501, receipt of an intermediate key that was established as a result of the UE 1501 authentication process. Where Universal Subscriber Identity Module (USIM) based authentication can be used, the AMF 1521 may retrieve the security material from the AUSF 1522. AMF 1521 may also include a Security Context Management (SCM) function, which receives a key from the SEA that it uses to derive access-network specific keys. Furthermore, AMF 1521 may be a termination point of a RAN CP interface, which can include or be an N2 reference point between the (R)AN 1510 and the AMF 1521; and the AMF 1521 may be a termination point of NAS (N1) signalling, and perform NAS ciphering and integrity protection.

AMF 1521 may also support NAS signalling with a UE 1501 over an N3 IWF interface. The N3IWF may be used to provide access to untrusted entities. N3IWF may be a termination point for the N2 interface between the (R)AN 1510 and the AMF 1521 for the control plane, and may be a termination point for the N3 reference point between the (R)AN 1510 and the UPF 1502 for the user plane. As such, the AMF 1521 handles N2 signalling from the SMF 1524 and the AMF 1521 for Protocol Data Unit (PDU) sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1501 and AMF 1521 via an N1 reference point between the UE 1501 and the AMF 1521, and relay uplink and downlink user-plane packets between the UE501 and UPF 1502. The N3IWF also provides mechanisms for IPsec tunnel establishment with the UE 1501. The AMF 1521 can exhibit an Namf service-based interface, and may be a termination point for an N14 reference point between two AMFs 1521 and an N17 reference point between the AMF 1521 and a 5G-EIR (not illustrated in FIG. 15).

The UE 1501 may need to register with the AMF 1521 to receive network services. Registration Management (RM) can be used to register or deregister the UE 1501 with the network (for example, AMF 1521), and establish a UE context in the network (for example, AMF 1521). The UE 1501 may operate in an RM-REGISTERED state or an RM-DEREGISTERED state. In the RM-DEREGISTERED state, the UE 1501 is not registered with the network, and the UE context in AMF 1521 holds no valid location or routing information for the UE 1501 so the UE 1501 is not reachable by the AMF 1521. In the RM-REGISTERED state, the UE 1501 is registered with the network, and the UE context in AMF 1521 may hold a valid location or routing information for the UE 1501 so the UE 1501 is reachable by the AMF 1521. In the RM-REGISTERED state, the UE 1501 may perform mobility Registration Update procedures, perform periodic Registration Update procedures triggered by expiration of the periodic update timer (for example, to notify the network that the UE 1501 is still active), and perform a Registration Update procedure to update UE capability information or to re-negotiate protocol parameters with the network, among others.

The AMF 1521 stores one or more RM contexts for the UE 1501, where each RM context is associated with a specific access to the network. The RM context may be a data structure, database object, etc. that indicates or stores, inter alia, a registration state per access type and the periodic update timer. The AMF 1521 may also store a 5GC Mobility Management (MM) context that may be the same or similar to the (E)MM context described previously. In various embodiments, the AMF 1521 stores a CE mode B Restriction parameter of the UE 1501 in an associated MM context or RM context. The AMF 1521 may also derive the value, when needed, from the UE's usage setting parameter already stored in the UE context (and/or MM/RM context).

Connection Management (CM) establishes and releases a signaling connection between the UE 1501 and the AMF 1521 over the N1 interface. The signaling connection can be used to enable NAS signaling exchange between the UE 1501 and the CN 520, and comprises both the signaling connection between the UE and the AN (for example, Radio Resource Control (RRC) connection or UE-N3IWF connection for non-3GPP access) and the N2 connection for the UE 1501 between the AN (for example, RAN 1510) and the AMF 1521. The UE 1501 may operate in one of two CM states, CM-IDLE mode or CM-CONNECTED mode. When the UE 1501 is operating in the CM-IDLE state/mode, the UE 1501 may have no Non-Access Stratum (NAS) signaling connection established with the AMF 1521 over the N1 interface, and there may be (R)AN 1510 signaling connection (for example, N2 and/or N3 connections) for the UE 1501. When the UE 1501 is operating in the CM-CONNECTED state/mode, the UE 1501 may have an established NAS signaling connection with the AMF 1521 over the N1 interface, and there may be a (R)AN 1510 signaling connection (for example, N2 and/or N3 connections) for the UE 1501. Establishment of an N2 connection between the (R)AN 1510 and the AMF 1521 may cause the UE 1501 to transition from CM-IDLE mode to CM-CONNECTED mode, and the UE 1501 may transition from the CM-CONNECTED mode to the CM-IDLE mode when N2 signaling between the (R)AN 1510 and the AMF 1521 is released.

The SMF 1524 is responsible for Session Management (SM) (for example, session establishment, modify and release, including tunnel maintain between UPF and AN node); UE IP address allocation and management (including optional authorization); selection and control of User Plane (UP) function; configuring traffic steering at UPF to route traffic to proper destination; termination of interfaces toward policy control functions; controlling part of policy enforcement and QoS; lawful intercept (for SM events and interface to LI system); termination of SM parts of NAS messages;

downlink data notification; initiating AN specific SM information, sent via Access and Mobility Management Function (AMF) over N2 to AN; and determining Session and Service Continuity (SSC) mode of a session. SM may refer to management of a Protocol Data Unit (PDU) session, and a PDU session or "session" may refer to a PDU connectivity service that provides or enables the exchange of PDUs between a UE 1501 and a data network (DN) 1503 identified by a Data Network Name (DNN). PDU sessions may be established upon UE 1501 request, modified upon UE 1501 and 5GC 520 request, and released upon UE 1501 and 5GC 520 request using NAS SM signaling exchanged over the N1 reference point between the UE 1501 and the SMF 1524. Upon request from an application server, the 5GC 520 may trigger a specific application in the UE 1501. In response to receipt of the trigger message, the UE 1501 may pass the trigger message (or relevant parts/information of the trigger message) to one or more identified applications in the UE 1501. The identified application(s) in the UE 1501 may establish a PDU session to a specific DNN. The SMF 1524 may check whether the UE 1501 requests are compliant with user subscription information associated with the UE 1501. In this regard, the SMF 1524 may retrieve and/or request to receive update notifications on SMF 1524 level subscription data from the UDM 1527.

The SMF 1524 can include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1524 may be included in the system 1500, which may be between another SMF 1524 in a visited network and the SMF 1524 in the home network in roaming scenarios. Additionally, the SMF 1524 can exhibit the Nsmf service-based interface.

The NEF 1523 provides means for securely exposing the services and capabilities provided by 3GPP network functions for third party, internal exposure/re-exposure, Application Functions (for example, AF 1528), edge computing or fog computing systems, etc. In such embodiments, the NEF 1523 may authenticate, authorize, and/or throttle the AFs. NEF 1523 may also translate information exchanged with the AF 1528 and information exchanged with internal network functions. For example, the NEF 1523 may translate between an AF-Service-Identifier and an internal 5GC information. NEF 1523 may also receive information from other network functions (NFs) based on exposed capabilities of other network functions. This information may be stored at the NEF 1523 as structured data, or at a data storage NF using standardized interfaces. The stored information can then be re-exposed by the NEF 1523 to other NFs and AFs, and/or used for other purposes such as analytics. Additionally, the NEF 1523 can exhibit an Nnef service-based interface.

The NRF 1525 supports service discovery functions, receive Network Function (NF) discovery requests from NF instances, and provide the information of the discovered NF instances to the NF instances. NRF 1525 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1525 can exhibit the Nnrf service-based interface.

The PCF 1526 provides policy rules to control plane function(s) to enforce them, and may also support unified policy framework to govern network behaviour. The PCF 1526 may also implement an Front End (FE) to access subscription information relevant for policy decisions in a UDR of the UDM 1527. The PCF 1526 communicate with the AMF 1521 via an N15 reference point between the PCF 1526 and the AMF 1521, which can include a PCF 1526 in a visited network and the AMF 1521 in case of roaming scenarios. The PCF 1526 communicate with the AF 1528 via an N5 reference point between the PCF 1526 and the AF 1528; and with the SMF 1524 via an N7 reference point between the PCF 1526 and the SMF 1524. The system 1500 and/or CN 520 may also include an N24 reference point between the PCF 1526 (in the home network) and a PCF 1526 in a visited network. Additionally, the PCF 1526 can exhibit an Npcf service-based interface.

The UDM 1527 handles subscription-related information to support the network entities' handling of communication sessions, and stores subscription data of UE 1501. For example, subscription data may be communicated between the UDM 1527 and the AMF 1521 via an N8 reference point between the UDM 1527 and the AMF. The UDM 1527 can include two parts, an application Front End (FE) and a UDR (the FE and UDR are not illustrated in FIG. 15). The UDR stores subscription data and policy data for the UDM 1527 and the PCF 1526, and/or structured data for exposure and application data (including PFDs for application detection, application request information for multiple UEs 1501) for the NEF 1523. The Nudr service-based interface may be exhibited by the UDR 221 to allow the UDM 1527, PCF 1526, and NEF 1523 to access a particular set of the stored data, as well as to read, update (for example, add, modify), delete, and subscribe to notification of relevant data changes in the UDR. The UDM can include a UDM-FE, which is in charge of processing credentials, location management, subscription management and so on. Several different front ends can serve the same user in different transactions. The UDM-FE accesses subscription information stored in the UDR and performs authentication credential processing, user identification handling, access authorization, registration/mobility management, and subscription management. The UDR interacts with the SMF 1524 via an N10 reference point between the UDM 1527 and the SMF 1524. UDM 1527 may also support SMS management, wherein an SMS-FE implements the similar application logic as described previously. Additionally, the UDM 1527 can exhibit the Nudm service-based interface.

The AF 1528 provides application influence on traffic routing, provide access to the NCE, and interact with the policy framework for policy control. The NCE is a mechanism that allows the 5GC 520 and AF 1528 to provide information to each other via NEF 1523, which may be used for edge computing implementations. In such implementations, the network operator and third party services can be hosted close to the UE 1501 access point of attachment to achieve an efficient service delivery through the reduced end-to-end latency and load on the transport network. For edge computing implementations, the 5GC can select a UPF 1502 close to the UE 1501 and execute traffic steering from the UPF 1502 to DN 1503 via the N6 interface. This may be based on the UE subscription data, UE location, and information provided by the AF 1528. In this way, the AF 1528 influences UPF (re)selection and traffic routing. Based on operator deployment, when AF 1528 is considered to be a trusted entity, the network operator permits AF 1528 to interact directly with relevant NFs. Additionally, the AF 1528 can exhibit an Naf service-based interface.

The NSSF 1529 selects a set of network slice instances serving the UE 1501. The NSSF 1529 also determines allowed Network Slice Selection Assistance Information (NSSAI) and the mapping to the subscribed Single-NSSAIs (S-NSSAIs), if needed. The NSSF 1529 also determines the Access and Mobility Management Function (AMF) set to be used to serve the UE 1501, or a list of candidate AMF(s) 1521 based on a suitable configuration and possibly by querying the NRF 1525. The selection of a set of network slice instances for the UE 1501 may be triggered by the AMF 1521 with which the UE 1501 is registered by interacting with the NSSF 1529, which may lead to a change of AMF 1521. The NSSF 1529 interacts with the AMF 1521 via an N22 reference point between AMF 1521 and NSSF 1529; and communicate with another NSSF 1529 in a visited network via an N31 reference point (not illustrated in FIG. 15). Additionally, the NSSF 1529 can exhibit an Nnssf service-based interface.

As described previously, the CN 520 can include an SMS Function (SMSF), which may be responsible for Short Message Service (SMS) subscription checking and verification, and relaying SM messages to/from the UE 1501 to/from other entities, such as an SMS-GMSC/IWMSC/ SMS-router. The SMS also interacts with AMF 1521 and UDM 1527 for a notification procedure that the UE 1501 is available for SMS transfer (for example, set a UE not reachable flag, and notifying UDM 1527 when UE 1501 is available for SMS).

The CN 520 may also include other elements that are not illustrated in FIG. 15, such as a Data Storage system/ architecture, a 5G-Equipment Identity Register (EIR), a Security Edge Protection Pro15 (SEPP), and the like. The Data Storage system can include a Structured Data Storage Function (SDSF), an Unstructured Data Storage Network Function (UDSF), and/or the like. Any Network Function (NF) stores and retrieve unstructured data into/from the UDSF (for example, UE contexts), via N18 reference point between any NF and the UDSF (not illustrated in FIG. 15). Individual NFs may share a UDSF for storing their respective unstructured data or individual NFs may each have their own UDSF located at or near the individual NFs. Additionally, the UDSF can exhibit an Nudsf service-based interface (not illustrated in FIG. 15). The 5G-EIR may be an NF that checks the status of PEI for determining whether particular equipment/entities are blacklisted from the network; and the SEPP may be a non-transparent pro15 that performs topology hiding, message filtering, and policing on inter-Public Land Mobile Network (PLMN) control plane interfaces.

Additionally, there may be many more reference points and/or service-based interfaces between the NF services in the NFs; however, these interfaces and reference points have been omitted from FIG. 15 for clarity. In one example, the CN 520 can include an Nx interface, which is an inter-CN interface between the MME (for example, MME 1 121) and the AMF 1521 to enable interworking between CN 520 and CN 1 120. Other example interfaces/reference points can include an N5g-EIR service-based interface exhibited by a 5G-EIR, an N27 reference point between the NF Repository Function (NRF) in the visited network and the NRF in the home network; and an N31 reference point between the Network Slice Selection Function (NSSF) in the visited network and the NSSF in the home network.

Exemplary Infrastructure Equipment

Figure 16:
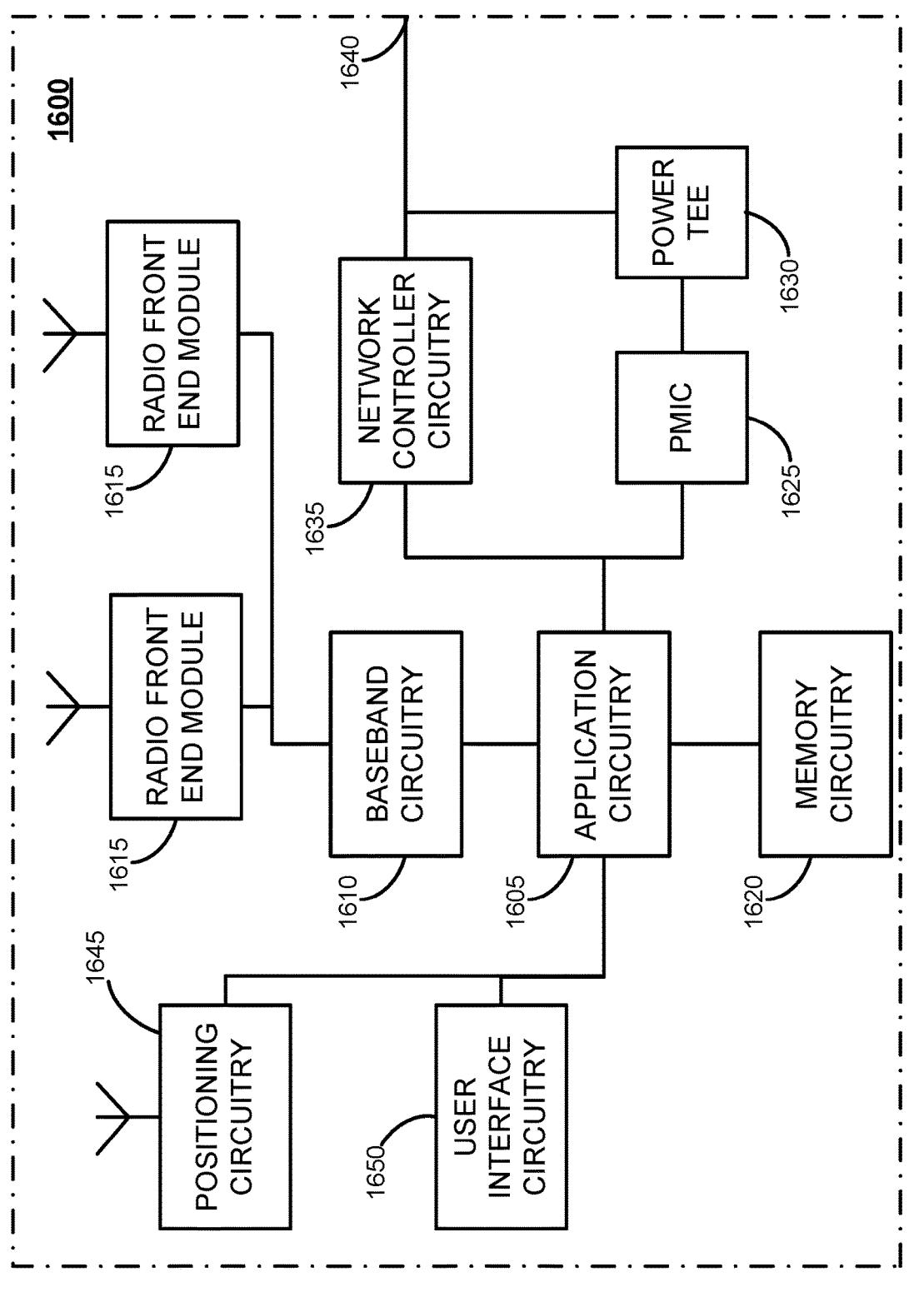
FIG. 16 illustrates an example of infrastructure equipment in accordance with various embodiments.

FIG. 16 illustrates an example of infrastructure equipment 1600 in accordance with various embodiments. The infrastructure equipment 1600 (or "system 1600") can be implemented as a base station, radio head, RAN node such as the RAN nodes 1311 and/or AP 1306 shown and described previously, application server(s) 1330, and/or any other element/device described herein. In other examples, the system 1600 can be implemented in or by a UE.

The system 1600 includes application circuitry 1620, baseband circuitry 1610, one or more radio front end modules (RFEMs) 1615, memory circuitry 1620, power management integrated circuitry (PMIC) 1625, power tee circuitry 1630, network controller circuitry 1635, network interface connector 1640, satellite positioning circuitry 1645, and user interface 1650. In some embodiments, the device 1600 can include additional elements such as, for example, memory/storage, display, camera, sensor, or input/ output (I/O) interface. In other embodiments, the components described below may be included in more than one device. For example, said circuitries may be separately included in more than one device for Cloud Radio Access Network (CRAN), vBBU, or other like implementations.

Application circuitry 1620 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1620 may be coupled with or can include memory/ storage elements and can be configured to execute instructions stored in the memory/storage to enable various applications or operating systems to run on the system 1600. In some embodiments, the memory/storage elements may be on-chip memory circuitry, which can include any suitable volatile and/or non-volatile memory, such as DRAM, SRAM, EPROM, EEPROM, Flash memory, solid-state memory, and/or any other type of memory device technology, such as those described herein.

The processor(s) of application circuitry 1620 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1620 may comprise, or may be, a special-purpose processor/controller to operate according to the various embodiments herein. As examples, the processor(s) of application circuitry 1620 can include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1600 may not utilize application circuitry 1620, and instead can include a special-purpose processor/controller to process IP data received from an EPC or 5GC, for example.

In some embodiments, the application circuitry 1620 can include one or more hardware accelerators, which may be microprocessors, programmable processing devices, or the like. The one or more hardware accelerators can include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1620 may comprise logic blocks or logic fabric, and other interconnected resources that may be programmed to perform various functions, such as the procedures, methods, functions, etc. of the various embodiments described herein. In such embodiments, the circuitry of application circuitry 1620 can include memory cells (for example, erasable programmable read-only memory (EPROM), electrically erasable programmable read-only memory (EEPROM), flash memory, static memory (for example, static random access memory (SRAM), anti-fuses, etc.)) used to store logic blocks, logic fabric, data, etc. in look-up-tables (LUTs) and the like.

The baseband circuitry 1610 can be implemented, for example, as a solder-down substrate including one or more integrated circuits, a single packaged integrated circuit soldered to a main circuit board or a multi-chip module containing two or more integrated circuits. The various hardware electronic elements of baseband circuitry 1610 are to be described below with regard to FIG. 18.

User interface circuitry 1650 can include one or more user interfaces designed to enable user interaction with the system 1600 or peripheral component interfaces designed to enable peripheral component interaction with the system 1600. User interfaces can include, but are not limited to, one or more physical or virtual buttons (for example, a reset button), one or more indicators (for example, light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The radio front end modules (RFEMs) 1615 may comprise a millimeter wave (mmWave) RFEM and one or more sub-mmWave radio frequency integrated circuits (RFICs). In some embodiments, the one or more sub-mmWave RFICs may be physically separated from the mmWave RFEM. The RFICs can include connections to one or more antennas or antenna arrays (see for example, antenna array 1811 of FIG. 18 infra), and the RFEM may be connected to multiple antennas. In alternative implementations, both mmWave and sub-mmWave radio functions can be implemented in the same physical RFEM 1615, which incorporates both mmWave antennas and sub-mmWave.

The memory circuitry 1620 can include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1620 can be implemented as one or more of solder down packaged integrated circuits, socketed memory modules and plug-in memory cards.

The PMIC 1625 can include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1630 provides for electrical power drawn from a network cable to provide both power supply and data connectivity to the infrastructure equipment 1600 using a single cable.

The network controller circuitry 1635 provides connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1600 via network interface connector 1640 using a physical connection, which may be electrical (commonly referred to as a "copper interconnect"), optical, or wireless. The network controller circuitry 1635 can include one or more dedicated processors and/or FPGAs to communicate using one or more of the aforementioned protocols. In some embodiments, the network controller circuitry 1635 can include multiple controllers to provide connectivity to other networks using the same or different protocols.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (for example, Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (for example, including hardware devices such as switches, filters, amplifiers, antenna elements, and the like to facilitate OTA communications) to communicate with components of a positioning network, such as navigation satellite constellation nodes. In some embodiments, the positioning circuitry 1645 can include a Micro-Technology for Positioning, Navigation, and Timing (Micro-PNT) IC that uses a master timing clock to perform position tracking/estimation without GNSS assistance. The positioning circuitry 1645 may also be part of, or interact with, the baseband circuitry 1610 and/or RFEMs 1615 to communicate with the nodes and components of the positioning network. The positioning circuitry 1645 may also provide position data and/or time data to the application circuitry 1620, which may use the data to synchronize operations with various infrastructure (for example, RAN nodes 1311, etc.), or the like.

The components illustrated in FIG. 16 communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a System on Chip (SoC) based system. Other bus/IX systems may be included, such as an I²C interface, an SPI interface, point to point interfaces, and a power bus, among others.

Figure 17:
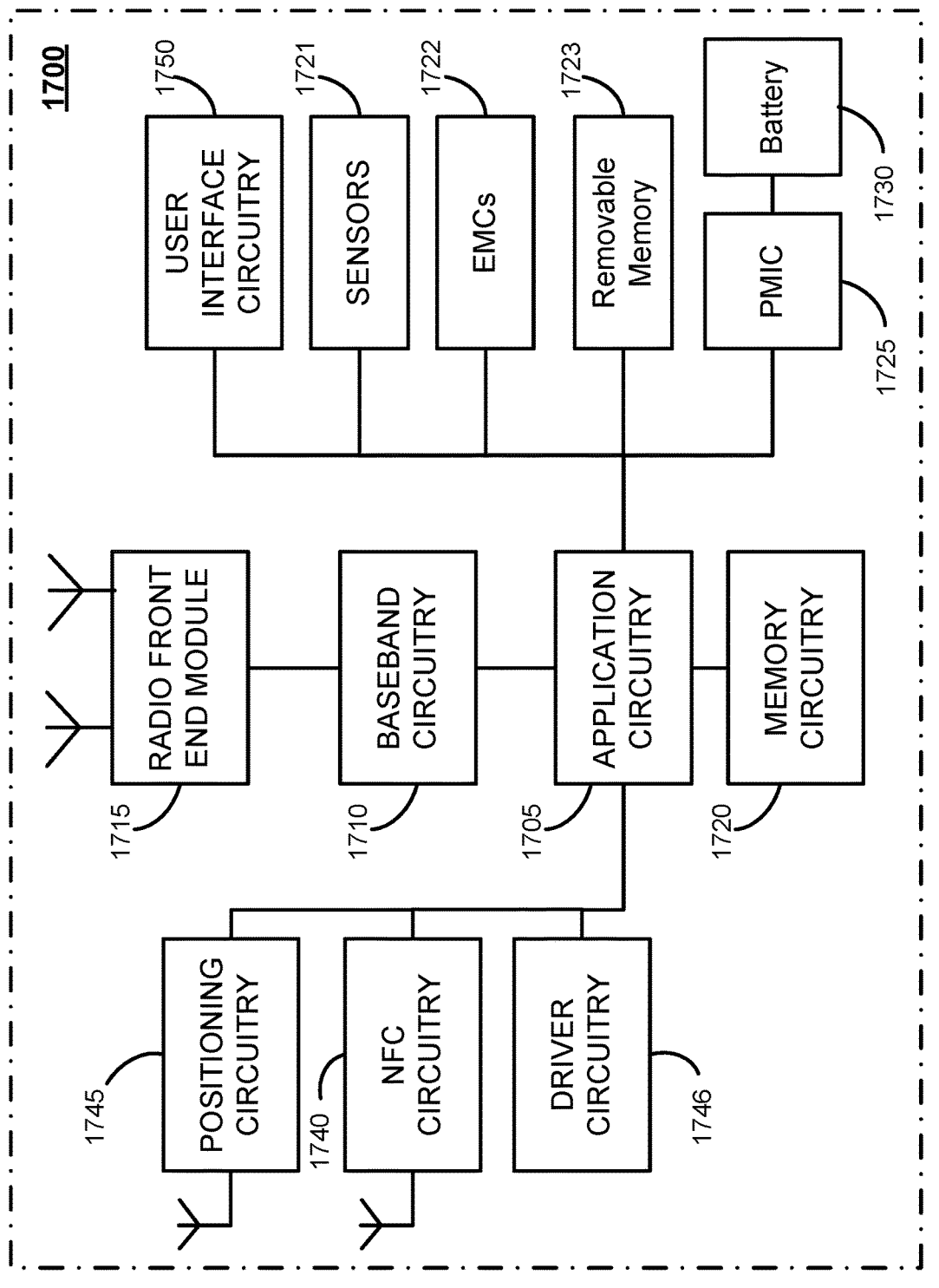
FIG. 17 illustrates an example of a platform (or "device") in accordance with various embodiments.

FIG. 17 illustrates an example of a platform 1700 (or "device 1700") in accordance with various embodiments. In some embodiments, the computer platform 1700 may be suitable for use as UEs 1301, 1401, application servers 1330, and/or any other element/device described herein. The platform 1700 can include any combinations of the components shown in the example. The components of platform 1700 can be implemented as integrated circuits (ICs), portions thereof, discrete electronic devices, or other modules, logic, hardware, software, firmware, or a combination thereof adapted in the computer platform 1700, or as components otherwise incorporated within a chassis of a larger system. The block diagram of FIG. 17 is intended to show a high level view of components of the computer platform 1700. However, some of the components shown may be omitted, additional components may be present, and different arrangement of the components shown may occur in other implementations.

Application circuitry 1705 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1705 may be coupled with or can include memory/storage elements and can be configured to execute instructions stored in the memory/storage to enable various applications or operating systems to run on the system 1700. In some embodiments, the memory/storage elements may be on-chip memory circuitry, which can include any suitable volatile and/or non-volatile memory, such as DRAM, SRAM, EPROM, EEPROM, Flash memory, solid-state memory, and/or any other type of memory device technology, such as those described herein.

The processor(s) of application circuitry 1705 can include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1705 may comprise, or may be, a special-purpose processor/controller to operate according to the various embodiments herein.

As examples, the processor(s) of application circuitry 1705 can include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 1705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some embodiments, the application circuitry 1705 may be a part of a system on a chip (SoC) in which the application circuitry 1705 and other components are formed into a single integrated circuit, or a single package, such as the Edison™ or Galileo™ SoC boards from Intel® Corporation.

Additionally or alternatively, application circuitry 1705 can include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1705 may comprise logic blocks or logic fabric, and other interconnected resources that may be programmed to perform various functions, such as the procedures, methods, functions, etc. of the various embodiments described herein. In such embodiments, the circuitry of application circuitry 1705 can include memory cells (for example, erasable programmable read-only memory (EPROM), electrically erasable programmable read-only memory (EEPROM), flash memory, static memory (for example, static random access memory (SRAM), anti-fuses, etc.)) used to store logic blocks, logic fabric, data, etc. in look-up tables (LUTs) and the like.

The baseband circuitry 1705 can be implemented, for example, as a solder-down substrate including one or more integrated circuits, a single packaged integrated circuit soldered to a main circuit board or a multi-chip module containing two or more integrated circuits. The various hardware electronic elements of baseband circuitry 1705 are described infra with regard to FIG. 18.

The RFEMs 1715 may comprise a millimeter wave (mmWave) RFEM and one or more sub-mmWave radio frequency integrated circuits (RFICs). In some embodiments, the one or more sub-mmWave RFICs may be physically separated from the mmWave RFEM. The RFICs can include connections to one or more antennas or antenna arrays (see for example, antenna array 1811 of FIG. 18 infra), and the RFEM may be connected to multiple antennas. In alternative implementations, both mmWave and sub-mmWave radio functions can be implemented in the same physical RFEM 1715, which incorporates both mmWave antennas and sub-mmWave.

The memory circuitry 1720 can include any number and type of memory devices used to provide for a given amount of system memory. As examples, the memory circuitry 1720 can include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1720 may be developed in accordance with a Joint Electron Devices Engineering Council (JEDEC) low power double data rate (LPDDR)-based design, such as LPDDR2, LPDDR3, LPDDR4, or the like. Memory circuitry 1720 can be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1720 may be on-die memory or registers associated with the application circuitry 1705. To provide for persistent storage of information such as data, applications, operating systems and so forth, memory circuitry 1720 can include one or more mass storage devices, which can include, inter alia, a solid state disk drive (SSDD), hard disk drive (HDD), a micro HDD, resistance change memories, phase change memories, holographic memories, or chemical memories, among others. For example, the computer platform 1700 may incorporate the three-dimensional (3D) cross-point (XPOINT) memories from Intel® and Micron®.

Removable memory circuitry 1723 can include devices, circuitry, enclosures/housings, ports or receptacles, etc. used to couple portable data storage devices with the platform 1700. These portable data storage devices may be used for mass storage purposes, and can include, for example, flash memory cards (for example, Secure Digital (SD) cards, microSD cards, xD picture cards, and the like), and USB flash drives, optical discs, external HDDs, and the like.

The platform 1700 can also include interface circuitry (not shown) that can be used to connect external devices with the platform 1700. The external devices connected to the platform 1700 via the interface circuitry include sensor circuitry 1721 and electro-mechanical components (EMCs) 1722, as well as removable memory devices coupled to removable memory circuitry 1723.

The sensor circuitry 1721 includes devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (for example, thermistors); pressure sensors; barometric pressure sensors; gravimeters; altimeters; image capture devices (for example, cameras or lensless apertures); light detection and ranging (LiDAR) sensors; proximity sensors (for example, infrared radiation detector and the like), depth sensors, ambient light sensors, ultrasonic transceivers; microphones or other like audio capture devices; etc.

EMCs 1722 include devices, modules, or subsystems whose purpose is to enable platform 1700 to change its state, position, and/or orientation, or move or control a mechanism or (sub)system. Additionally, EMCs 1722 can be configured to generate and send messages/signalling to other components of the platform 1700 to indicate a current state of the EMCs 1722. Examples of the EMCs 1722 include one or more power switches, relays including electromechanical relays (EMRs) and/or solid state relays (SSRs), actuators (for example, valve actuators, etc.), an audible sound generator, a visual warning device, motors (for example, DC motors, stepper motors, etc.), wheels, thrusters, propellers, claws, clamps, hooks, and/or other like electro-mechanical components. In some embodiments, platform 1700 can be configured to operate one or more EMCs 1722 based on one or more captured events and/or instructions or control signals received from a service provider and/or various clients.

In some embodiments, the interface circuitry connects the platform 1700 with positioning circuitry 1745. The positioning circuitry 1745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (for example, NAVIC), Japan's QZSS, France's DORIS, etc.), or the like. The positioning circuitry 1745 comprises various hardware elements (for example, including hardware devices such as switches, filters, amplifiers, antenna elements, and the like to facilitate OTA communications) to communicate with components of a positioning network, such as navigation satellite constellation nodes. In some embodiments, the positioning circuitry 1745 can include a Micro-PNT IC that uses a master timing clock to perform position tracking/estimation without GNSS assistance. The positioning circuitry 1745 may also be part of, or interact with, the baseband circuitry 1705 and/or RFEMs 1715 to communicate with the nodes and components of the positioning network. The positioning circuitry 1745 may also provide position data and/or time data to the application circuitry 1705, which may use the data to synchronize operations with various infrastructure (for example, radio base stations), for turn-by-turn navigation applications, or the like In some embodiments, the interface circuitry connects the platform 1700 with Near-Field Communication (NFC) circuitry 1740. NFC circuitry 1740 can be configured to provide contactless, short-range communications based on radio frequency identification (RFID) standards, wherein magnetic field induction can be used to enable communication between NFC circuitry 1740 and NFC-enabled devices external to the platform 1700 (for example, an "NFC touchpoint"). NFC circuitry 1740 comprises an NFC controller coupled with an antenna element and a processor coupled with the NFC controller. The NFC controller may be a chip/IC providing NFC functionalities to the NFC circuitry 1740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (for example, a microchip embedded in a sticker or wristband) to transmit stored data to the NFC circuitry 1740, or initiate data transfer between the NFC circuitry 1740 and another active NFC device (for example, a smartphone or an NFC-enabled POS terminal) that is proximate to the platform 1700.

The driver circuitry 1746 can include software and hardware elements that operate to control particular devices that are embedded in the platform 1700, attached to the platform 1700, or otherwise communicatively coupled with the platform 1700. The driver circuitry 1746 can include individual drivers allowing other components of the platform 1700 to interact with or control various input/output (I/O) devices that may be present within, or connected to, the platform 1700. For example, driver circuitry 1746 can include a display driver to control and allow access to a display device, a touchscreen driver to control and allow access to a touchscreen interface of the platform 1700, sensor drivers to obtain sensor readings of sensor circuitry 1721 and control and allow access to sensor circuitry 1721, EMC drivers to obtain actuator positions of the EMCs 1722 and/or control and allow access to the EMCs 1722, a camera driver to control and allow access to an embedded image capture device, audio drivers to control and allow access to one or more audio devices.

The power management integrated circuitry (PMIC) 1725 (also referred to as "power management circuitry 1725") may manage power provided to various components of the platform 1700. In particular, with respect to the baseband circuitry 1705, the PMIC 1725 may control power-source selection, voltage scaling, battery charging, or DC-to-DC conversion. The PMIC 1725 may often be included when the platform 1700 is capable of being powered by a battery 1730, for example, when the device is included in a UE 1301, 1301.

In some embodiments, the PMIC 1725 may control, or otherwise be part of, various power saving mechanisms of the platform 1700. For example, if the platform 1700 is in an RRC_Connected state, where it is still connected to the RAN node as it expects to receive traffic shortly, then it may enter a state known as Discontinuous Reception Mode (DRX) after a period of inactivity. During this state, the platform 1700 may power down for brief intervals of time and thus save power. If there is no data traffic activity for an extended period of time, then the platform 1700 may transition off to an RRC_Idle state, where it disconnects from the network and does not perform operations such as channel quality feedback, handover, etc. The platform 1700 goes into a very low power state and it performs paging where again it periodically wakes up to listen to the network and then powers down again. The platform 1700 may not receive data in this state; to receive data, it should transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1730 may power the platform 1700, although in some examples the platform 1700 may be mounted deployed in a fixed location, and may have a power supply coupled to an electrical grid. The battery 1730 may be a lithium ion battery, a metal-air battery, such as a zinc-air battery, an aluminum-air battery, a lithium-air battery, and the like. In some embodiments, such as in V2X applications, the battery 1730 may be a typical lead-acid automotive battery.

In some embodiments, the battery 1730 can be a "smart battery," which includes or is coupled with a Battery Management System (BMS) or battery monitoring integrated circuitry. The BMS may be included in the platform 1700 to track the state of charge (SoCh) of the battery 1730. The BMS may be used to monitor other parameters of the battery 1730 to provide failure predictions, such as the state of health (SoH) and the state of function (SoF) of the battery 1730. The BMS communicate the information of the battery 1730 to the application circuitry 1705 or other components of the platform 1700. The BMS may also include an analog-to-digital (ADC) convertor that allows the application circuitry 1705 to directly monitor the voltage of the battery 1730 or the current flow from the battery 1730. The battery parameters may be used to determine actions that the platform 1700 may perform, such as transmission frequency, network operation, sensing frequency, and the like.

A power block, or other power supply coupled to an electrical grid can be coupled with the BMS to charge the battery 1730. In some examples, the power block 1730 may be replaced with a wireless power receiver to obtain the power wirelessly, for example, through a loop antenna in the computer platform 1700. In these examples, a wireless battery charging circuit may be included in the BMS. The specific charging circuits chosen may depend on the size of the battery 1730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1750 includes various input/output (I/O) devices present within, or connected to, the platform 1700, and includes one or more user interfaces designed to enable user interaction with the platform 1700 and/or peripheral component interfaces designed to enable peripheral component interaction with the platform 1700. The user interface circuitry 1750 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry can include any number and/or combinations of audio or visual display, including, inter alia, one or more simple visual outputs/indicators (for example, binary status indicators (for example, light emitting diodes (LEDs)) and multi-character visual outputs, or more complex outputs such as display devices or touchscreens (for example, Liquid Chrystal Displays (LCD), LED displays, quantum dot displays, projectors, etc.), with the output of characters, graphics, multimedia objects, and the like being generated or produced from the operation of the platform 1700. The output device circuitry may also include speakers or other audio emitting devices, printer(s), and/or the like. In some embodiments, the sensor circuitry 1721 may be used as the input device circuitry (for example, an image capture device, motion capture device, or the like) and one or more EMCs may be used as the output device circuitry (for example, an actuator to provide haptic feedback or the like). In another example, NFC circuitry comprising an NFC controller coupled with an antenna element and a processing device may be included to read electronic tags and/or connect with another NFC-enabled device. Peripheral component interfaces can include, but are not limited to, a non-volatile memory port, a USB port, an audio jack, a power supply interface, etc.

Although not shown, the components of platform 1700 communicate with one another using a suitable bus or interconnect (IX) technology, which can include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Exemplary Baseband Circuitry and Radio Front End Modules

Figure 18:
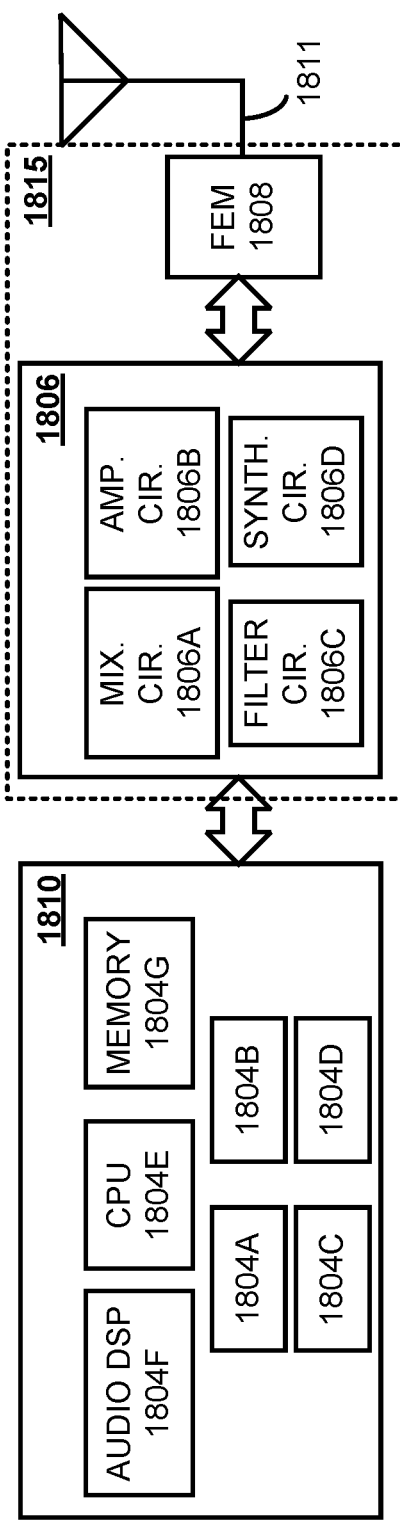
FIG. 18 illustrates example components of baseband circuitry and radio front end modules (RFEMs) in accordance with various embodiments.

FIG. 18 illustrates example components of baseband circuitry 1810 and radio front end modules (RFEMs) 1815 in accordance with various embodiments. The baseband circuitry 1810 corresponds to the baseband circuitry 1610 and 1705 of FIG. 16 and FIG. 17, respectively. The RFEM 1815 corresponds to the RFEM 1615 and 1715 of FIG. 16 and FIG. 17, respectively. As shown, the RFEMs 1815 can include Radio Frequency (RF) circuitry 1806, front-end module (FEM) circuitry 1808, antenna array 1811 coupled together at least as shown.

The baseband circuitry 1810 includes circuitry and/or control logic configured to carry out various radio/network protocol and radio control functions that enable communication with one or more radio networks via the RF circuitry 1806. The radio control functions can include, but are not limited to, signal modulation/demodulation, encoding/decoding, radio frequency shifting, etc. In some embodiments, modulation/demodulation circuitry of the baseband circuitry 1810 can include Fast-Fourier Transform (FFT), precoding, or constellation mapping/demapping functionality. In some embodiments, encoding/decoding circuitry of the baseband circuitry 1810 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments. The baseband circuitry 1810 can be configured to process baseband signals received from a receive signal path of the RF circuitry 1806 and to generate baseband signals for a transmit signal path of the RF circuitry 1806. The baseband circuitry 1810 can be configured to interface with application circuitry 1605/1705 (see, FIG. 16 and FIG. 17) for generation and processing of the baseband signals and for controlling operations of the RF circuitry 1806. The baseband circuitry 1810 handles various radio control functions.

The aforementioned circuitry and/or control logic of the baseband circuitry 1810 can include one or more single or multi-core processors. For example, the one or more processors can include a 3G baseband processor 1804A, a 4G/LTE baseband processor 1804B, a 5G/NR baseband processor 1804C, or some other baseband processor(s) 1804D for other existing generations, generations in development or to be developed in the future (for example, sixth generation (6G), etc.). In other embodiments, some or all of the functionality of baseband processors 1804A-D may be included in modules stored in the memory 1804G and executed via a Central Processing Unit (CPU) 1804E. In other embodiments, some or all of the functionality of baseband processors 1804A-D may be provided as hardware accelerators (for example, FPGAs, ASICs, etc.) loaded with the appropriate bit streams or logic blocks stored in respective memory cells. In various embodiments, the memory 1804G stores program code of a real-time OS (RTOS), which when executed by the CPU 1804E (or other baseband processor), is to cause the CPU 1804E (or other baseband processor) to manage resources of the baseband circuitry 1810, schedule tasks, etc. Examples of the RTOS can include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those described herein. In addition, the baseband circuitry 1810 includes one or more audio digital signal processor(s) (DSP) 1804F. The audio DSP(s) 1804F include elements for compression/decompression and echo cancellation and can include other suitable processing elements in other embodiments.

In some embodiments, each of the processors 1804A-804E include respective memory interfaces to send/receive data to/from the memory 1804G. The baseband circuitry 1810 may further include one or more interfaces to communicatively couple to other circuitries/devices, such as an interface to send/receive data to/from memory external to the baseband circuitry 1810; an application circuitry interface to send/receive data to/from the application circuitry 1605/1705 of FIG. 16 and FIG. 17); an RF circuitry interface to send/receive data to/from RF circuitry 1806 of FIG. 18; a wireless hardware connectivity interface to send/receive data to/from one or more wireless hardware elements (for example, Near Field Communication (NFC) components, Bluetooth®/Bluetooth® Low Energy components, Wi-Fi® components, and/or the like); and a power management interface to send/receive power or control signals to/from the PMIC1725.

In alternate embodiments (which may be combined with the above described embodiments), baseband circuitry 1810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems can include a bus system, point-to-point connections, network-on-chip (NOC) structures, and/or some other suitable bus or interconnect technology, such as those described herein. The audio subsystem can include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1810 can include protocol processing circuitry with one or more instances of control circuitry (not shown) to provide control functions for the digital baseband circuitry and/or radio frequency circuitry (for example, the radio front end modules 1815).

Although not illustrated in FIG. 18, in some embodiments, the baseband circuitry 1810 includes individual processing device(s) to operate one or more wireless communication protocols (for example, a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1810 and/or RF circuitry 1806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1810 and/or RF circuitry 1806 are part of a Wi-Fi communication system. In the second example, the protocol processing circuitry would operate Wi-Fi MAC and logical link control (LLC) functions. The protocol processing circuitry can include one or more memory structures (for example, 1804G) to store program code and data for operating the protocol functions, as well as one or more processing cores to execute the program code and perform various operations using the data. The baseband circuitry 1810 may also support radio communications for more than one wireless protocol.

The various hardware elements of the baseband circuitry 1810 described herein can be implemented, for example, as a solder-down substrate including one or more integrated circuits (ICs), a single packaged IC soldered to a main circuit board or a multi-chip module containing two or more ICs. In one example, the components of the baseband circuitry 1810 may be suitably combined in a single chip or chipset, or disposed on a same circuit board. In another example, some or all of the constituent components of the baseband circuitry 1810 and RF circuitry 1806 can be implemented together such as, for example, a system on a chip (SoC) or System-in-Package (SiP). In another example, some or all of the constituent components of the baseband circuitry 1810 can be implemented as a separate SoC that is communicatively coupled with and RF circuitry 1806 (or multiple instances of RF circuitry 1806). In yet another example, some or all of the constituent components of the baseband circuitry 1810 and the application circuitry 1605/1705 can be implemented together as individual SoCs mounted to a same circuit board (for example, a "multi-chip package").

In some embodiments, the baseband circuitry 1810 provides for communication compatible with one or more radio technologies. For example, in some embodiments, the baseband circuitry 1810 supports communication with an E-UTRAN or other WMAN, a WLAN, a WPAN. Embodiments in which the baseband circuitry 1810 can be configured to support radio communications of more than one wireless protocol may be referred to as multi-mode baseband circuitry.

RF circuitry 1806 may enable communication with wireless networks using modulated electromagnetic radiation through a non-solid medium. In various embodiments, the RF circuitry 1806 can include switches, filters, amplifiers, etc. to facilitate the communication with the wireless network. RF circuitry 1806 can include a receive signal path, which can include circuitry to down-convert RF signals received from the FEM circuitry 1808 and provide baseband signals to the baseband circuitry 1810. RF circuitry 1806 may also include a transmit signal path, which can include circuitry to up-convert baseband signals provided by the baseband circuitry 1810 and provide RF output signals to the FEM circuitry 1808 for transmission.

In some embodiments, the receive signal path of the RF circuitry 1806 can include mixer circuitry 1806A, amplifier circuitry 1806B and filter circuitry 1806C. In some embodiments, the transmit signal path of the RF circuitry 1806 can include filter circuitry 1806C and mixer circuitry 1806A. RF circuitry 1806 may also include synthesizer circuitry 1806D for synthesizing a frequency for use by the mixer circuitry 1806A of the receive signal path and the transmit signal path. In some embodiments, the mixer circuitry 1806A of the receive signal path can be configured to down-convert RF signals received from the FEM circuitry 1808 based on the synthesized frequency provided by synthesizer circuitry 1806D. The amplifier circuitry 1806B can be configured to amplify the down-converted signals and the filter circuitry 1806C may be a low-pass filter (LPF) or band-pass filter (BPF) configured to remove unwanted signals from the down-converted signals to generate output baseband signals. Output baseband signals may be provided to the baseband circuitry 1810 for further processing. In some embodiments, the output baseband signals may be zero-frequency baseband signals, although this is not a requirement. In some embodiments, mixer circuitry 1806A of the receive signal path may comprise passive mixers, although the scope of the embodiments is not limited in this respect.

In some embodiments, the mixer circuitry 1806A of the transmit signal path can be configured to up-convert input baseband signals based on the synthesized frequency provided by the synthesizer circuitry 1806D to generate RF output signals for the FEM circuitry 1808. The baseband signals may be provided by the baseband circuitry 1810 and may be filtered by filter circuitry 1806C.

In some embodiments, the mixer circuitry 1806A of the receive signal path and the mixer circuitry 1806A of the transmit signal path can include two or more mixers and may be arranged for quadrature downconversion and upconversion, respectively. In some embodiments, the mixer circuitry 1806A of the receive signal path and the mixer circuitry 1806A of the transmit signal path can include two or more mixers and may be arranged for image rejection (for example, Hartley image rejection). In some embodiments, the mixer circuitry 1806A of the receive signal path and the mixer circuitry 1806A of the transmit signal path may be arranged for direct downconversion and direct upconversion, respectively. In some embodiments, the mixer circuitry 1806A of the receive signal path and the mixer circuitry 1806A of the transmit signal path can be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1806 can include analog-to-digital converter (ADC) and digital-to-analog converter (DAC) circuitry and the baseband circuitry 1810 can include a digital baseband interface to communicate with the RF circuitry 1806.

In some dual-mode embodiments, a separate radio IC circuitry may be provided for processing signals for each spectrum, although the scope of the embodiments is not limited in this respect.

In some embodiments, the synthesizer circuitry 1806D may be a fractional-N synthesizer or a fractional N/N+1 synthesizer, although the scope of the embodiments is not limited in this respect as other types of frequency synthesizers may be suitable. For example, synthesizer circuitry 1806D may be a delta-sigma synthesizer, a frequency multiplier, or a synthesizer comprising a phase-locked loop with a frequency divider.

The synthesizer circuitry 1806D can be configured to synthesize an output frequency for use by the mixer circuitry 1806A of the RF circuitry 1806 based on a frequency input and a divider control input. In some embodiments, the synthesizer circuitry 1806D may be a fractional N/N+1 synthesizer.

In some embodiments, frequency input may be provided by a voltage controlled oscillator (VCO), although that is not a requirement. Divider control input may be provided by either the baseband circuitry 1810 or the application circuitry 1605/1705 depending on the desired output frequency. In some embodiments, a divider control input (for example, N) may be determined from a look-up table based on a channel indicated by the application circuitry 1605/1705.

Synthesizer circuitry 1806D of the RF circuitry 1806 can include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD can be configured to divide the input signal by either N or N+1 (for example, based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1806D can be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1806 can include an IQ/polar converter.

FEM circuitry 1808 can include a receive signal path, which can include circuitry configured to operate on RF signals received from antenna array 1811, amplify the received signals and provide the amplified versions of the received signals to the RF circuitry 1806 for further processing. FEM circuitry 1808 may also include a transmit signal path, which can include circuitry configured to amplify signals for transmission provided by the RF circuitry 1806 for transmission by one or more of antenna elements of antenna array 1811. In various embodiments, the amplification through the transmit or receive signal paths may be done solely in the RF circuitry 1806, solely in the FEM circuitry 1808, or in both the RF circuitry 1806 and the FEM circuitry 1808.

In some embodiments, the FEM circuitry 1808 can include a TX/RX switch to switch between transmit mode and receive mode operation. The FEM circuitry 1808 can include a receive signal path and a transmit signal path. The receive signal path of the FEM circuitry 1808 can include an LNA to amplify received RF signals and provide the amplified received RF signals as an output (for example, to the RF circuitry 1806). The transmit signal path of the FEM circuitry 1808 can include a power amplifier (PA) to amplify input RF signals (for example, provided by RF circuitry 1806), and one or more filters to generate RF signals for subsequent transmission by one or more antenna elements of the antenna array 1811.

The antenna array 1811 comprises one or more antenna elements, each of which can be configured convert electrical signals into radio waves to travel through the air and to convert received radio waves into electrical signals. For example, digital baseband signals provided by the baseband circuitry 1810 is converted into analog RF signals (for example, modulated waveform) that can be amplified and transmitted via the antenna elements of the antenna array 1811 including one or more antenna elements (not shown). The antenna elements may be omnidirectional, direction, or a combination thereof. The antenna elements may be formed in a multitude of arranges as are known and/or described herein. The antenna array 1811 may comprise microstrip antennas or printed antennas that are fabricated on the surface of one or more printed circuit boards. The antenna array 1811 may be formed in as a patch of metal foil (for example, a patch antenna) in a variety of shapes, and may be coupled with the RF circuitry 1806 and/or FEM circuitry 1808 using metal transmission lines or the like.

Exemplary Protocol Functions that can be Implemented in a Wireless Communication Device Processors of the application circuitry 1605/1705 and processors of the baseband circuitry 1810 may be used to execute elements of one or more instances of a protocol stack. For example, processors of the baseband circuitry 1810, alone or in combination, may be used execute Layer 3, Layer 2, or Layer 1 functionality, while processors of the application circuitry 1605/1705 may utilize data (for example, packet data) received from these layers and further execute Layer 4 functionality (for example, Transmission Communication Protocol (TCP) and User Datagram Protocol (UDP) layers). As referred to herein, Layer 3 may comprise a Radio Resource Control (RRC) layer, described in further detail below. As referred to herein, Layer 2 may comprise a Medium Access Control (MAC) layer, an Radio Link Control, (RLC) layer, and a Packet Data Convergence Protocol (PDCP) layer, described in further detail below. As referred to herein, Layer 1 may comprise a Physical (PHY) layer of a UE/RAN node, described in further detail below.

Figure 19:
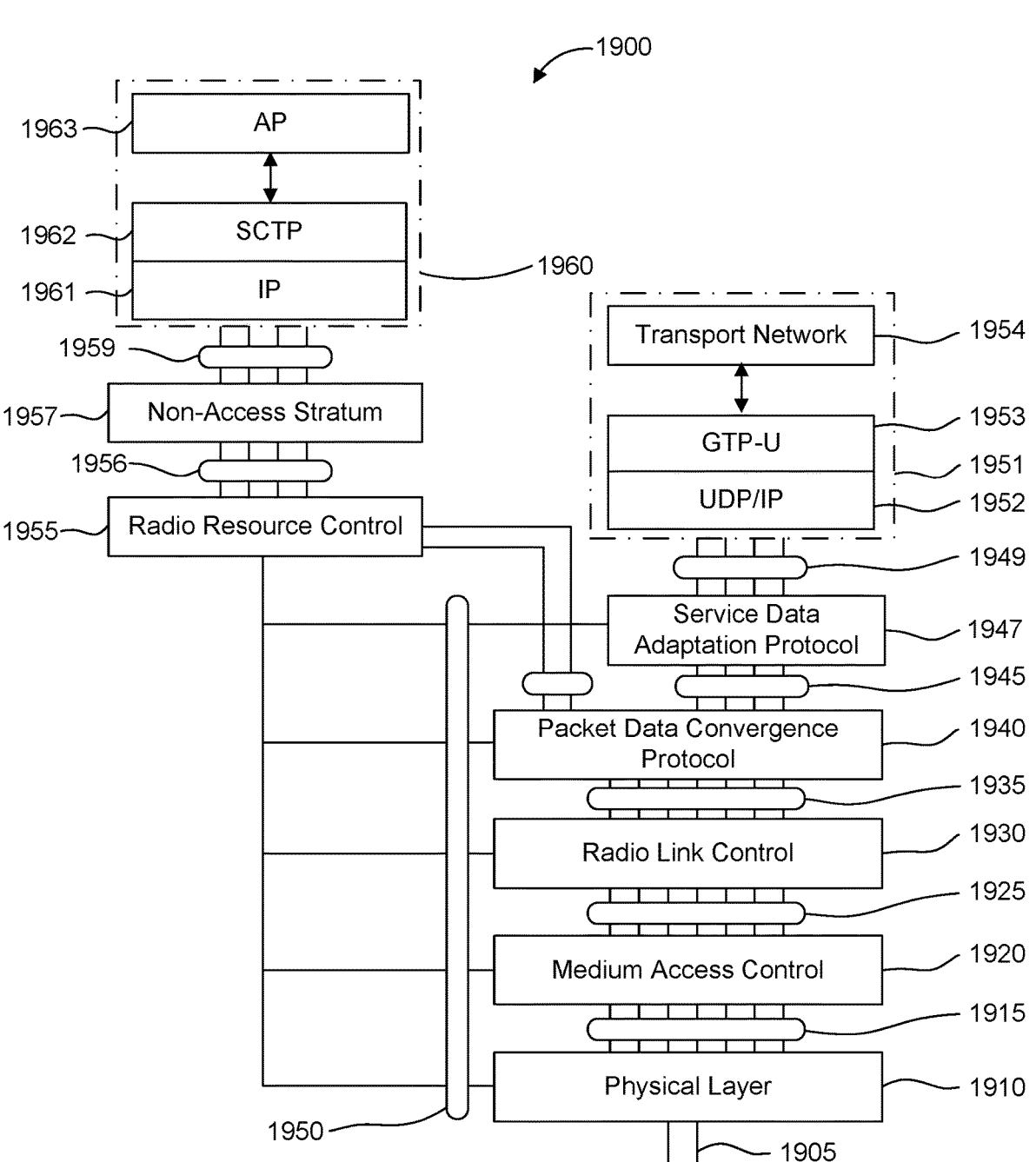
FIG. 19 illustrates various protocol functions that can be implemented in a wireless communication device in accordance with various embodiments.

FIG. 19 illustrates various protocol functions that can be implemented in a wireless communication device in accordance with various embodiments. In particular, FIG. 19 includes an arrangement 1900 showing interconnections between various protocol layers/entities. The following description of FIG. 19 is provided for various protocol layers/entities that operate in conjunction with the 5G/NR system standards and LTE system standards, but some or all of the aspects of FIG. 19 may be applicable to other wireless communication network systems as well.

The protocol layers of arrangement 1900 can include one or more of PHY 1910, MAC 1920, RLC 1930, PDCP 1940, SDAP 1947, RRC 1955, and NAS layer 1957, in addition to other higher layer functions not illustrated. The protocol layers can include one or more service access points (for example, items 1959, 1956, 1950, 1949, 1945, 1935, 1925, and 1915 in FIG. 19) that provides communication between two or more protocol layers.

The PHY 1910 transmits and receives physical layer signals 1910 that may be received from or transmitted to one or more other communication devices. The PHY 1910 may comprise one or more physical channels, such as those described herein. The PHY 1910 may further perform link adaptation or adaptive modulation and coding (AMC), power control, cell search (for example, for initial synchronization and handover purposes), and other measurements used by higher layers, such as the RRC 1955. The PHY 1910 may still further perform error detection on the transport channels, forward error correction (FEC) coding/decoding of the transport channels, modulation/demodulation of physical channels, interleaving, rate matching, mapping onto physical channels, and MIMO antenna processing. In some embodiments, an instance of PHY 1910 may process requests from and provide indications to an instance of MAC 1920 via one or more PHY-SAP 1915. According to some embodiments, requests and indications communicated via PHY-SAP 1915 may comprise one or more transport channels.

Instance(s) of MAC 1920 processes requests from, and provides indications to, an instance of RLC 1930 via one or more MAC-SAPs 1925. These requests and indications communicated via the MAC-SAP 1925 may comprise one or more logical channels. The MAC 1920 may perform mapping between the logical channels and transport channels, multiplexing of MAC SDUs from one or more logical channels onto TBs to be delivered to PHY 1910 via the transport channels, de-multiplexing MAC SDUs to one or more logical channels from TBs delivered from the PHY 1910 via transport channels, multiplexing MAC SDUs onto TBs, scheduling information reporting, error correction through HARQ, and logical channel prioritization.

Instance(s) of RLC 1930 processes requests from and provides indications to an instance of PDCP 1940 via one or more radio link control service access points (RLC-SAP) 1935. These requests and indications communicated via RLC-SAP 1935 may comprise one or more RLC channels. The RLC 1930 may operate in multiple of modes of operation, including: Transparent Mode™, Unacknowledged Mode (UM), and Acknowledged Mode (AM). The RLC 1930 may execute transfer of upper layer protocol data units (PDUs), error correction through automatic repeat request (ARQ) for AM data transfers, and concatenation, segmentation and reassembly of RLC SDUs for UM and AM data transfers. The RLC 1930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1940 processes requests from and provides indications to instance(s) of RRC 1955 and/or instance(s) of SDAP 1947 via one or more packet data convergence protocol service access points (PDCP-SAP) 1945. These requests and indications communicated via PDCP-SAP 1945 may comprise one or more radio bearers. The PDCP 1940 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (for example, ciphering, deciphering, integrity protection, integrity verification, etc.).

Instance(s) of SDAP 1947 processes requests from and provides indications to one or more higher layer protocol entities via one or more SDAP-SAP 1949. These requests and indications communicated via SDAP-SAP 1949 may comprise one or more QoS flows. The SDAP 1947 may map QoS flows to DRBs, and vice versa, and may also mark QFIs in DL and UL packets. A single SDAP entity 1947 can be configured for an individual PDU session. In the UL direction, the NG-RAN 1310 may control the mapping of QoS Flows to DRB(s) in two different ways, reflective mapping or explicit mapping. For reflective mapping, the SDAP 1947 of a UE 1301 may monitor the QFIs of the DL packets for each DRB, and may apply the same mapping for packets flowing in the UL direction. For a DRB, the SDAP 1947 of the UE 1301 may map the UL packets belonging to the QoS flows(s) corresponding to the QoS flow ID(s) and PDU session observed in the DL packets for that DRB. To enable reflective mapping, the NG-RAN510 may mark DL packets over the Uu interface with a QoS flow ID. The explicit mapping may involve the RRC 1955 configuring the SDAP 1947 with an explicit QoS flow to DRB mapping rule, which may be stored and followed by the SDAP 1947. In some embodiments, the SDAP 1947 may only be used in NR implementations and may not be used in LTE implementations.

The RRC 1955 configures, via one or more management service access points (M-SAP), aspects of one or more protocol layers, which can include one or more instances of PHY 1910, MAC 1920, RLC 1930, PDCP 1940 and SDAP 1947. In some embodiments, an instance of RRC 1955 may process requests from and provide indications to one or more NAS entities 1957 via one or more RRC-SAPs 1956. The main services and functions of the RRC 1955 can include broadcast of system information (for example, included in MIBs or SIBs related to the NAS), broadcast of system information related to the access stratum (AS), paging, establishment, maintenance and release of an RRC connection between the UE 1301 and RAN 1310 (for example, RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1957 forms the highest stratum of the control plane between the UE 1301 and the AMF521. The NAS 1957 supports the mobility of the UEs 1301 and the session management procedures to establish and maintain IP connectivity between the UE 1301 and a P-GW in LTE systems.

In accordance with various embodiments, one or more protocol entities of arrangement 1900 can be implemented in UEs 1301, RAN nodes 1311, AMF521 in NR implementations or MME 1421 in LTE implementations, UPF502 in NR implementations or S-GW 1422 and P-GW 1423 in LTE implementations, or the like to be used for control plane or user plane communications protocol stack between the aforementioned devices. In such embodiments, one or more protocol entities that can be implemented in one or more of UE 1301, gNB 1311, AMF521, etc. communicate with a respective peer protocol entity that can be implemented in or on another device using the services of respective lower layer protocol entities to perform such communication. In some embodiments, a gNB-CU of the gNB 1311 may host the RRC 1955, SDAP 1947, and PDCP 1940 of the gNB that controls the operation of one or more gNB-DUs, and the gNB-DUs of the gNB 1311 may each host the RLC 1930, MAC 1920, and PHY 1310 of the gNB 1311.

In a first example, a control plane protocol stack may comprise, in order from highest layer to lowest layer, NAS 1357, RRC 1355, PDCP 1940, RLC 1930, MAC 1320, and PHY 1310. In this example, upper layers 1960 may be built on top of the NAS 1357, which includes an IP layer 1961, an SCTP 1962, and an application layer signaling protocol (AP) 1963.

In NR implementations, the AP 1963 may be an NG application protocol layer (NGAP or NG-AP) 1963 for the NG interface 1313 defined between the NG-RAN node 1311 and the AMF521, or the AP 1963 may be an Xn application protocol layer (XnAP or Xn-AP) 1963 for the Xn interface 212 that is defined between two or more RAN nodes 1311.

The NG-AP 1963 supports the functions of the NG interface 1313 and may comprise Elementary Procedures (EPs). An NG-AP EP may be a unit of interaction between the NG-RAN node 1311 and the AMF521. The NG-AP 1963 services may comprise two groups: UE-associated services (for example, services related to a UE 1301) and non-UE-associated services (for example, services related to the whole NG interface instance between the NG-RAN node 1311 and AMF521). These services can include functions including, but not limited to: a paging function for the sending of paging requests to NG-RAN nodes 1311 involved in a particular paging area; a UE context management function for allowing the AMF521 to establish, modify, and/or release a UE context in the AMF521 and the NG-RAN node 1311; a mobility function for UEs 1301 in ECM-CONNECTED mode for intra-system HOs to support mobility within NG-RAN and inter-system HOs to support mobility from/to EPS systems; a NAS Signaling Transport function for transporting or rerouting NAS messages between UE 1301 and AMF521; a NAS node selection function for determining an association between the AMF521 and the UE 1301; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (for example, SON information, performance measurement (PM) data, etc.) between two RAN nodes 1311 via CN 1320; and/or other like functions.

The XnAP 1963 supports the functions of the Xn interface 212 and may comprise XnAP basic mobility procedures and XnAP global procedures. The XnAP basic mobility procedures may comprise procedures used to handle UE mobility within the NG RAN 1311 (or E-UTRAN 1310), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1301, such as Xn interface setup and reset procedures, NG-RAN update procedures, cell activation procedures, and the like.

In LTE implementations, the AP 1963 can be an S1 Application Protocol layer (S1-AP) 1963 for the S1 interface 1313 defined between an E-UTRAN node 1311 and an MME, or the AP 1963 may be an X2 application protocol layer (X2AP or X2-AP) 1963 for the X2 interface 212 that is defined between two or more E-UTRAN nodes 1311.

The S1 Application Protocol layer (S1-AP) 1963 supports the functions of the S1 interface, and similar to the NG-AP described previously, the S1-AP may comprise S1-AP EPs. An S1-AP EP may be a unit of interaction between the E-UTRAN node 1311 and an MME 1421 within an LTE CN 1320. The S1-AP 1963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1963 supports the functions of the X2 interface 212 and may comprise X2AP basic mobility procedures and X2AP global procedures. The X2AP basic mobility procedures may comprise procedures used to handle UE mobility within the E-UTRAN 1320, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1301, such as X2 interface setup and reset procedures, load indication procedures, error indication procedures, cell activation procedures, and the like.

The SCTP layer (alternatively referred to as the SCTP/IP layer) 1962 provides guaranteed delivery of application layer messages (for example, NGAP or XnAP messages in NR implementations, or S1-AP or X2AP messages in LTE implementations). The SCTP 1962 may ensure reliable delivery of signaling messages between the RAN node 1311 and the AMF521/MME 1421 based, in part, on the IP protocol, supported by the IP 1961. The Internet Protocol layer (IP) 1961 may be used to perform packet addressing and routing functionality. In some embodiments the IP layer 1961 may use point-to-point transmission to deliver and convey PDUs. In this regard, the RAN node 1311 may comprise L2 and L1 layer communication links (for example, wired or wireless) with the MME/AMF to exchange information.

In a second example, a user plane protocol stack may comprise, in order from highest layer to lowest layer, SDAP 1947, PDCP 1940, RLC 1930, MAC 1320, and PHY 1310. The user plane protocol stack may be used for communication between the UE 1301, the RAN node 1311, and UPF502 in NR implementations or an S-GW 1422 and P-GW 1423 in LTE implementations. In this example, upper layers 1951 may be built on top of the SDAP 1947, and can include a user datagram protocol (UDP) and IP security layer (UDP/IP) 1952, a General Packet Radio Service (GPRS) Tunneling Protocol for the user plane layer (GTP-U) 1953, and a User Plane PDU layer (UP PDU) 1963.

The transport network layer 1954 (also referred to as a "transport layer") can be built on IP transport, and the GTP-U 1953 may be used on top of the UDP/IP layer 1952 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1953 is be used for carrying user data within the GPRS core network and between the radio access network and the core network. The user data transported can be packets in any of IPv4, IPv6, or PPP formats, for example. The UDP/IP 1952 provides checksums for data integrity, port numbers for addressing different functions at the source and destination, and encryption and authentication on the selected data flows. The RAN node 1311 and the S-GW 1422 may utilize an S1-U interface to exchange user plane data via a protocol stack comprising an L1 layer (for example, PHY 1910), an L2 layer (for example, MAC 1920, RLC 1930, PDCP 1940, and/or SDAP 1947), the UDP/IP layer 1952, and the GTP-U 1953. The S-GW 1422 and the P-GW 1423 may utilize an S5/S8a interface to exchange user plane data via a protocol stack comprising an L1 layer, an L2 layer, the UDP/IP layer 1952, and the GTP-U 1953. As described previously, NAS protocols support the mobility of the UE 1301 and the session management procedures to establish and maintain IP connectivity between the UE 1301 and the P-GW 1423.

Moreover, although not illustrated in FIG. 19, an application layer may be present above the AP 1963 and/or the transport network layer 1954. The application layer may be a layer in which a user of the UE 1301, RAN node 1311, or other network element interacts with software applications being executed, for example, by application circuitry 1620 or application circuitry 1705, respectively. The application layer may also provide one or more interfaces for software applications to interact with communications systems of the UE 1301 or RAN node 1311, such as the baseband circuitry 1810. In some embodiments the IP layer and/or the application layer provides the same or similar functionality as layers 5-7, or portions thereof, of the Open Systems Interconnection (OSI) model (for example, OSI Layer 7—the application layer, OSI Layer 6—the presentation layer, and OSI Layer 5—the session layer).

Figure 20:
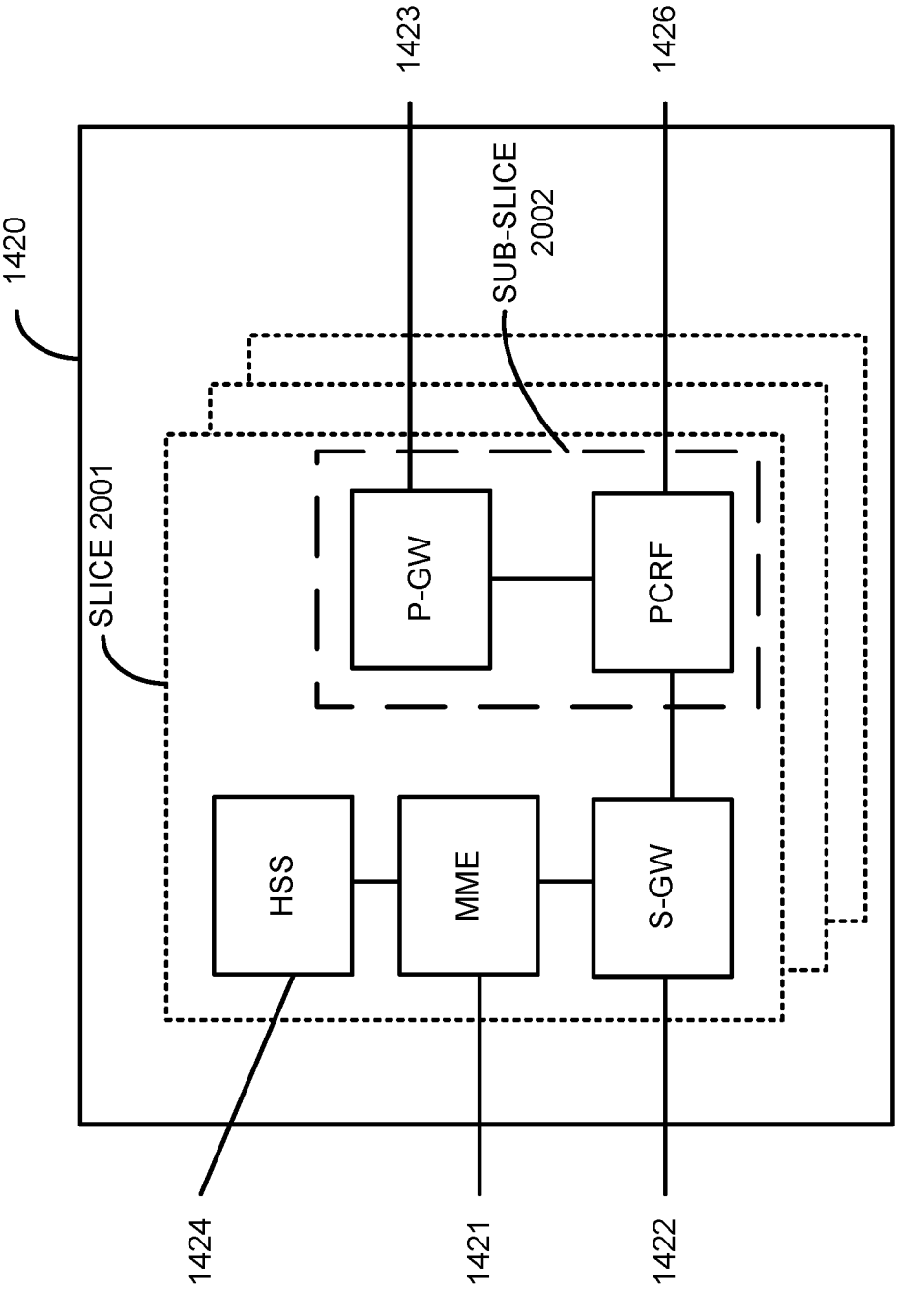
FIG. 20 illustrates components of a core network in accordance with various embodiments.

FIG. 20 illustrates components of a core network in accordance with various embodiments. The components of the CN 1420 can be implemented in one physical node or separate physical nodes including components to read and execute instructions from a machine-readable or computer-readable medium (for example, a non-transitory machine-readable storage medium). In some embodiments, the components of CN 520 can be implemented in a same or similar manner as described herein with regard to the components of CN 1420. In some embodiments, NFV is utilized to virtualize any or all of the above-described network node functions via executable instructions stored in one or more computer-readable storage mediums (described in further detail below). A logical instantiation of the CN 1420 may be referred to as a network slice 2001, and individual logical instantiations of the CN 1420 provides specific network capabilities and network characteristics. A logical instantiation of a portion of the CN 1420 may be referred to as a network sub-slice 2002 (for example, the network sub-slice 2002 is shown to include the P-GW 1423 and the PCRF 1426).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (for example, compute, storage, and networking resources) required to deploy the network slice.

With respect to 5G systems (see, for example, FIG. 15 above), a network slice always comprises a Radio Access Network (RAN) part and a core network (CN) part. The support of network slicing relies on the principle that traffic for different slices is handled by different Protocol Data Unit (PDU) sessions. The network can realize the different network slices by scheduling and also by providing different L1/L2 configurations. The UE 1501 provides assistance information for network slice selection in an appropriate Radio Resource Control (RRC) message, if it has been provided by NAS. While the network can support large number of slices, the UE need not support more than 8 slices simultaneously.

A network slice can include the CN 520 control plane and user plane Network Functions (NFs), Next Generation Radio Access Networks (NG-RANs) 1510 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 1501 (for example, enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 1521 instance serving an individual UE 1501 may belong to each of the network slice instances serving that UE.

Network Slicing in the NG-RAN 1510 involves RAN slice awareness. RAN slice awareness includes differentiated handling of traffic for different network slices, which have been pre-configured. Slice awareness in the NG-RAN 1510 is introduced at the PDU session level by indicating the S-NSSAI corresponding to a PDU session in all signaling that includes PDU session resource information. How the NG-RAN 1510 supports the slice enabling in terms of NG-RAN functions (for example, the set of network functions that comprise each slice) is implementation dependent. The NG-RAN 1510 selects the RAN part of the network slice using assistance information provided by the UE 1501 or the 5GC 520, which unambiguously identifies one or more of the pre-configured network slices in the PLMN. The NG-RAN 1510 also supports resource management and policy enforcement between slices as per SLAs. A single NG-RAN node supports multiple slices, and the NG-RAN 1510 may also apply an appropriate RRM policy for the SLA in place to each supported slice. The NG-RAN 1510 may also support QoS differentiation within a slice.

The NG-RAN 1510 may also use the UE assistance information for the selection of an AMF 1521 during an initial attach, if available. The NG-RAN 1510 uses the assistance information for routing the initial NAS to an AMF 1521. If the NG-RAN 1510 is unable to select an AMF 1521 using the assistance information, or the UE 1501 does not provide any such information, the NG-RAN 1510 sends the NAS signaling to a default AMF 1521, which may be among a pool of AMFs 1521. For subsequent accesses, the UE 1501 provides a temp ID, which is assigned to the UE 1501 by the 5GC 520, to enable the NG-RAN 1510 to route the NAS message to the appropriate AMF 1521 as long as the temp ID is valid. The NG-RAN 1510 is aware of, and can reach, the AMF 1521 that is associated with the temp ID. Otherwise, the method for initial attach applies.

The NG-RAN 1510 supports resource isolation between slices. NG-RAN 1510 resource isolation may be achieved by means of RRM policies and protection mechanisms that can avoid that shortage of shared resources if one slice breaks the service level agreement for another slice. In some embodiments, it is possible to fully dedicate NG-RAN 1510 resources to a certain slice. How NG-RAN 1510 supports resource isolation is implementation dependent.

Some slices may be available in part of the network. Awareness in the NG-RAN 1510 of the slices supported in the cells of its neighbors may be beneficial for inter-frequency mobility in connected mode. The slice availability may not change within the UE's registration area. The NG-RAN 1510 and the 5GC 520 are responsible to handle a service request for a slice that may or may not be available in a given area. Admission or rejection of access to a slice may depend on factors such as support for the slice, availability of resources, support of the requested service by NG-RAN 1510.

The UE 1501 may be associated with multiple network slices simultaneously. In case the UE 1501 is associated with multiple slices simultaneously, only one signaling connection is maintained, and for intra-frequency cell reselection, the UE 1501 tries to camp on the best cell. For inter-frequency cell reselection, dedicated priorities can be used to control the frequency on which the UE 1501 camps. The 5GC 520 is to validate that the UE 1501 has the rights to access a network slice. Prior to receiving an Initial Context Setup Request message, the NG-RAN 1510 may be allowed to apply some provisional/local policies, based on awareness of a particular slice that the UE 1501 is requesting to access. During the initial context setup, the NG-RAN 1510 is informed of the slice for which resources are being requested.

Network Functions Virtualization (NFV) architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 21:
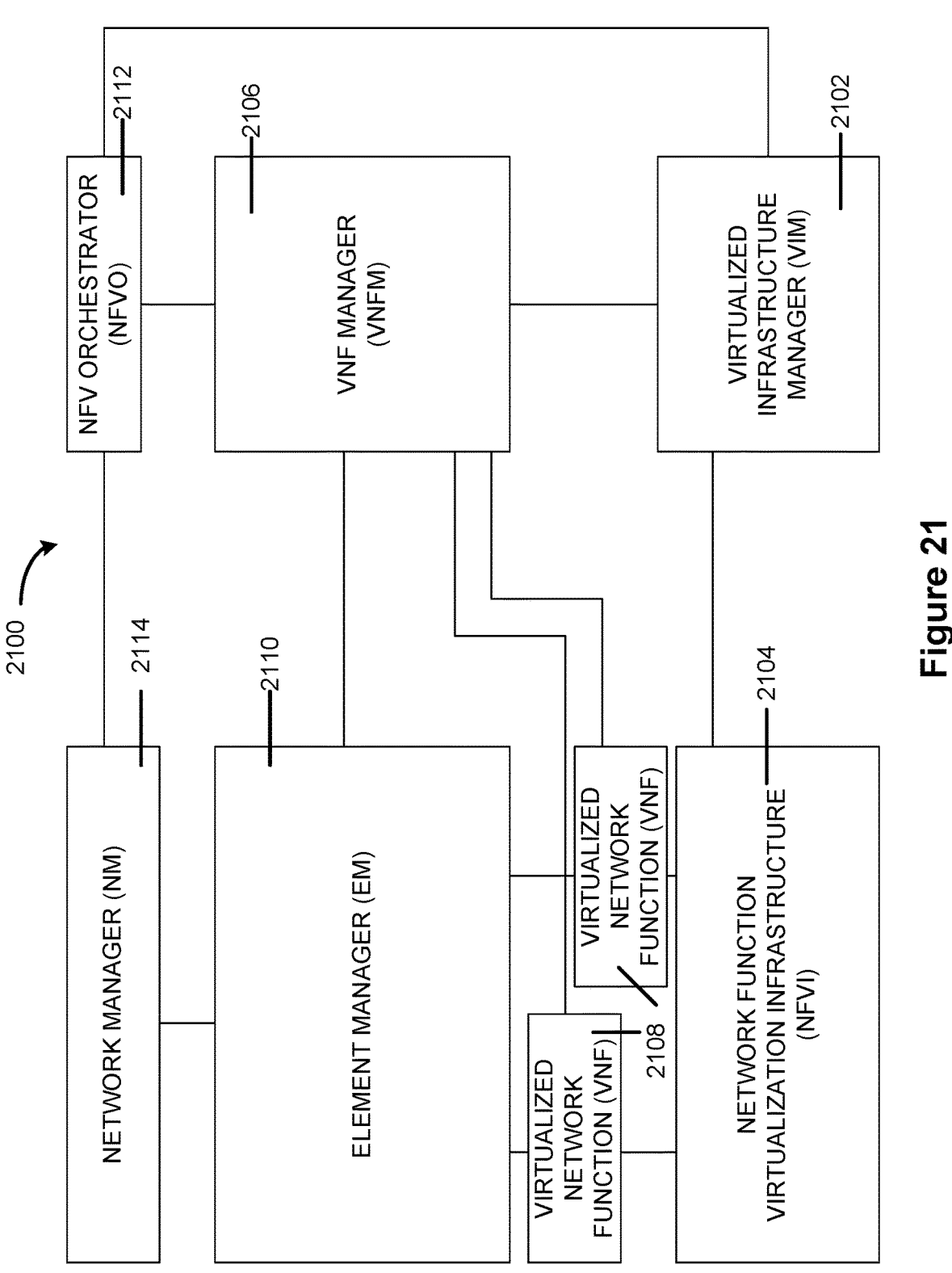
FIG. 21 is a block diagram illustrating components, according to some example embodiments, of a system to support Network Functions Virtualization (NFV)

FIG. 21 is a block diagram illustrating components, according to some example embodiments, of a system 2100 to support Network Functions Virtualization (NFV). The system 2100 is illustrated as including a Virtualized Infrastructure Manager (VIM) 2102, a Network Functions Virtualization Infrastructure (NFVI) 2104, a Virtualized Network Function Manager (VNFM) 2106, VNFs 2108, an Element Manager (EM) 2110, a Network Functions Virtualization Orchestrator (NFVO) 2112, and a Network Manager (NM) 2114.

The VIM 2102 manages the resources of the NFVI 2104. The NFVI 2104 can include physical or virtual resources and applications (including hypervisors) used to execute the system 2100. The VIM 2102 may manage the life cycle of virtual resources with the NFVI 2104 (for example, creation, maintenance, and tear down of Virtual Machines (VMs) associated with one or more physical resources), track VM instances, track performance, fault and security of VM instances and associated physical resources, and expose VM instances and associated physical resources to other management systems.

The VNFM 2106 may manage the VNFs 2108. The VNFs 2108 may be used to execute Evolved Packet Core (EPC) components/functions. The VNFM 2106 may manage the life cycle of the VNFs 2108 and track performance, fault and security of the virtual aspects of VNFs 2108. The EM 2110 may track the performance, fault and security of the functional aspects of VNFs 2108. The tracking data from the VNFM 2106 and the EM 2110 may comprise, for example, PM data used by the VIM 2102 or the NFVI 2104. Both the VNFM 2106 and the EM 1910 can scale up/down the quantity of VNFs of the system 2100.

The NFVO 2112 may coordinate, authorize, release and engage resources of the NFVI 2104 to provide the requested service (for example, to execute an EPC function, component, or slice). The NM 2114 provides a package of end-user functions with the responsibility for the management of a network, which can include network elements with VNFs, non-virtualized network functions, or both (management of the VNFs may occur via the EM 2110).

FIG. 22 is a block diagram illustrating components, according to some example embodiments, able to read instructions from a machine-readable or computer-readable medium (for example, a non-transitory machine-readable storage medium) and perform any one or more of the methodologies described herein. Specifically, FIG. 22 shows a diagrammatic representation of hardware resources 2200 including one or more processors (or processor cores) 2210, one or more memory/storage devices 2220, and one or more communication resources 2230, each of which may be communicatively coupled via a bus 2240. For embodiments where node virtualization (for example, NFV) is utilized, a hypervisor 2202 may be executed to provide an execution environment for one or more network slices/sub-slices to utilize the hardware resources 2200.

The processors 2210 can include, for example, a processor 2212 and a processor 2214. The processor(s) 2210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those described herein), or any suitable combination thereof.

The memory/storage devices 2220 can include main memory, disk storage, or any suitable combination thereof. The memory/storage devices 2220 can include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2230 can include interconnection or network interface components or other suitable devices to communicate with one or more peripheral devices 2204 or one or more databases 2206 via a network 2208. For example, the communication resources 2230 can include wired communication components (for example, for coupling via USB), cellular communication components, NFC components, Bluetooth® (or Bluetooth® Low Energy) components, Wi-Fi® components, and other communication components.

Instructions 2250 may comprise software, a program, an application, an applet, an app, or other executable code for causing at least any of the processors 2210 to perform any one or more of the methodologies described herein. The instructions 2250 may reside, completely or partially, within at least one of the processors 2210 (for example, within the processor's cache memory), the memory/storage devices 2220, or any suitable combination thereof. Furthermore, any portion of the instructions 2250 may be transferred to the hardware resources 2200 from any combination of the peripheral devices 2204 or the databases 2206. Accordingly, the memory of processors 2210, the memory/storage devices 2220, the peripheral devices 2204, and the databases 2206 are examples of computer-readable and machine-readable media.

Exemplary Method of Operation

FIG. 23 illustrates a flowchart for operating on an unlicensed spectrum according to some embodiments according to some embodiments. The disclosure is not limited to this operational description. Rather, it will be apparent to ordinary persons skilled in the relevant art(s) that other operational control flows are within the scope and spirit of the present disclosure. The following discussion describes an exemplary operational control flow 2300 for operating on an unlicensed spectrum as described above. The exemplary operational control flow 2300 can be performed by one or more of the processors, or processor circuitry described herein, including those contained in the application circuitry 1605 or 1705, baseband circuitry 1610 or 1710, and/or processors 2214.

At operation 2302, the operational control flow 2300 can receive a downlink (DL) signal comprising information associated with listen before talk (LBT) type.

At operation 2304, the operational control flow 2300 can perform the UL transmission based on the LBT type.

EXEMPLARY EMBODIMENTS

The exemplary embodiments set forth herein are illustrative and not exhaustive. These exemplary embodiments are not meant to be limiting.

Some embodiments can include a method of performing uplink (UL) transmission in new radio (NR) systems operating on an unlicensed spectrum. In these embodiments, performing the UL transmission can include performing grant based physical uplink shared channel (CG PUSCH)

transmission and performing configured grant based PUSCH (CG PUSCH) transmission.

In these embodiments, a downlink (DL) control information (DCI) format, DCI 0_1, can enable scheduling multiple transmission time intervals (TTIs) for a physical uplink shared channel (PUSCH).

In these embodiments, downlink (DL) control information (DCI) scheduling multiple transmission time intervals (TTIs) for the PUSCH can have a different number of code block group (CBG) transmission information (CBGTI) bits per transport block (TB) from DCI scheduling a single TTI for PUSCH, wherein CBG regrouping is adopted.

In these embodiments, for code block group (CBG) based PUSCH transmission, N>1 hybrid automatic repeat request-acknowledgment (HARQ-ACK) bits are allocated for each hybrid automatic repeat request (HARQ) process for a configured grant (CG). In these embodiments, one bit can be allocated for other HARQ processes with N being an integer number.

In these embodiments, for code block group (CBG) based PUSCH transmission, N>1 hybrid automatic repeat request-acknowledgment (HARQ-ACK) bits are allocated for a subset of hybrid automatic repeat request (HARQ) processes configured for configured grant (CG). In these embodiments, one bit can allocated for all other HARQ processes with N being an integer number.

In these embodiments, for a GB PUSCH associated with multiple slots, a user equipment (UE) can transmit continuously in multiple slots in response to the UE occupying a channel by performing a listen before talk (LBT) operation. In these embodiments, the channel can be the GB PUSCH. In these embodiments, the UE can follow a start symbol indicated in a first slot of the multiple slots for occupying the channel. In these embodiments, the UE can can follow an end symbol indicated in a last slot of the multiple slots for occupying the channel. In these embodiments, the UE can perform a second LBT operation at symbol 0 of a slot of the multiple slots that can follow a first slot of the multiple slots in response to the LBT operation failing in a first slot of the multiple slots.

In these embodiments, wherein in response to the UE being indicated as NO LBT:

the UE can perform a NO LBT operation to start transmission in each UL burst, the UE can perform a NO LBT operation in a first UL burst, or the UE can perform a NO LBT operation in response to a start symbol of the GB PUSCH associated with multiple slots following a downlink (DL) symbol or flexible symbol as indicated by a DL control information (DCI) format, DCI 2_0.

In these embodiments, wherein a demodulation reference signal (DMRS) for a slot from the multiple slots can be based on a PUSCH type indicated by downlink (DL) control information (DCI).

In these embodiments, a first demodulation reference signal (DMRS) associated with a first slot of the multiple slots can be based on a PUSCH type indicated by downlink (DL) control information and a second DMRS associated with a second slot of the multiple slots can include a DMRS of PUSCH type A. In these embodiments, a PUSCH type A mapping can be used for CG transmission.

In these embodiments, channel state information (CSI) can be prioritized to be associated with a last slot of the multiple slots in response to a GB PUSCH in the last slot being available for transmission, or CSI can be associated with a first slot of the multiple slots in response to NO LBT being used to schedule a GB PUSCH associated with multiple slots.

In these embodiments, configured grant (CG) uplink (UL) control information (UCI) can associated with a first slot repetition of a transport block (TB); CG UCI can be associated with each slot of the multiple slots or, CG UCI can be associated in a beginning slot repetition of a TB on each UL burst.

In these embodiments, a user equipment (UE) can perform rate matching of a transport block (TB) over N slots. In these embodiments, the rate matching operation can be repeated M times for a total number of slot repetition MN with M and N being integer numbers.

In these embodiments, a start position of an uplink (UL) transmission can be determined as an offset X on a symbol k with k being an index of a start symbol of a start and length indicator value (SLIV). In these embodiments, a start position of an uplink (UL) transmission can be determined as an offset X on a symbol k−1, a symbol k−2, or a symbol k−4. In these embodiments, the start position can generated in 1, 2, or 4 symbols. In these embodiments, the start position can be generated in one symbol of a 15 kilohertz (kHz) subcarrier spacing (SCS). In these embodiments, an offset X can a subset of one or more of: 0 μs, 16 μs, 25 μs, 25 μs+timing advance (TA), 16 μs+TA, TA, length of 1 symbol, length of 2 symbols, and a special value indicating the UL transmission should follow a downlink (DL) reception timing. In these embodiments, an offset X can be designed independently of a listen before talk (LBT) type. In these embodiments, an offset X can be interpreted based on a listen before talk (LBT) type. In these embodiments, an offset X and a listen before talk (LBT) type can be jointly coded. In these embodiments, for an offset X=16+timing advance (TA), a user equipment (UE) can make a gap between a downlink (DL) signal and an uplink (UL) signal. In these embodiments, the gap ranges from Gmin microseconds (μs) to 16 μs with Gmin being a minimum value of the gap. In these embodiments, for an offset X=16+timing advance (TA), a next generation NodeB (gNB) can generate a gap between a downlink (DL) signal and an uplink (UL) signal with the gap ranging from Gmin microseconds (μs) to 16 μs and with Gmin being a minimum value of the gap.

In these embodiments, inside a channel occupancy time (COT) initiated by a next generation NodeB (gNB), a start position with an offset X>25 μs can be applicable to CG PUSCH. In these embodiments, inside a channel occupancy time (COT) initiated by a next generation NodeB (gNB), a start position with an offset X>16 μs can be applicable to CG PUSCH. In these embodiments, inside a channel occupancy time (COT) initiated by a next generation NodeB (gNB), a NO listen before talk (LBT) can be indicated in downlink (DL) control information (DCI) for GB PUSCH with CG PUSCH being associated with an LBT having a value of 25 μs. In these embodiments, code block group (CBG) transmission or CBG re-transmission can be enabled for configured grant (CG) with 8 bits for CBG transmission information (CBGTI) being carried in the CG uplink (UL) control information (UCI).

In these embodiments, radio resource control (RRC) signaling can be used to configure time domain resources associated with a configured grant (CG) transmission via a 40-bit long bitmap that can be independent of a sub-carrier spacing (SCS) and wherein each bit corresponds to a slot.

In these embodiments, a configured grant (CG) user equipment (UE) can include multiple starting symbols that are a subset of symbols that precede a demodulation reference signal (DMRS). In these embodiments, the multiple starting symbols can include symbol #0 and symbol #1.

In these embodiments, for a sub-carrier spacing (SCS) of SCS 15 kilohertz (kHZ) or a SCS of 60 kHz, an offset can be truncated up to the second symbol.

In these embodiments, wherein uplink control information (UCI) for configured grant (CG) carriers can include an indication of whether two symbols are used throughout two bits with the indication including an indication of whether a CG data transmission starts from symbol #0, symbol #1, or symbol #2.

Some embodiments can include a method of performing uplink (UL) transmission in new radio (NR) systems operating on an unlicensed spectrum. The method can include receiving or causing to receive a downlink (DL) signal comprising information associated with listen before talk (type); and performing or causing to perform the UL transmission based on the LBT type.

In these embodiments, the LBT type can include one or more of: a category 1 (CAT-1) LBT type, a category 2 (CAT-2) LBT type, and a category 4 (CAT-4) LBT type.

In these embodiments, when the LBT type is the CAT-1 LBT type, the performing or causing to perform the UL transmission based on the LBT types can include determining or causing to determine that the UL transmission is to begin no later than T microseconds (µs) after receiving the DL signal, wherein T is a number; and performing or causing to perform the UL transmission at or before T µs.

In these embodiments, T µs can be 16 µs.

In these embodiments, when the LBT type is the CAT-2 LBT type, the performing or causing to perform the UL transmission based on the LBT types can include: determining or causing to determine that a duration of the UL transmission will exceed a threshold, and performing or causing to perform the UL transmission at T microseconds (µs) after receiving the DL signal in response to determining that the duration of the UL transmission will exceed the threshold, wherein T is a number.

In these embodiments, T µs can be 16 µs or 25 µs.

In these embodiments, the threshold can be 584 µs.

In these embodiments, when the LBT type is the CAT-4 LBT type, performing or causing to perform the UL transmission based on the LBT types can include generating or causing to generate a counter, decrementing or causing to decrement the counter based on a number of idle clear channel assessment (CCA) slots, and performing or causing to perform the UL transmission when the counter can no longer be decremented.

In these embodiments, a start position of the UL transmission can be a boundary of reference symbol and wherein the reference symbol can include one or more of: an orthogonal frequency division multiplex symbol (OS) k, an OS k+1, and an OS k+2, wherein k is a number that is equal to or greater than 0.

In these embodiments, a start position of the UL transmission can be a sum of a boundary of a reference symbol boundary and offset and wherein each of the reference symbol boundary and the offset is expressed in microseconds (µs).

In these embodiments the offset can be one or more of: 0 µs, 25 µs, 25 µs+timing advance (TA), 16 µs, 16 µs+TA, TA, a length of 1 symbol, and a length of 2 symbols.

Some embodiments can include an apparatus comprising means to perform one or more elements of a method described in or related to any of the embodiments described above, or any other method or process described herein.

Some embodiments can include one or more non-transitory computer-readable media comprising instructions to cause an electronic device, upon execution of the instructions by one or more processors of the electronic device, to perform one or more elements of a method described in or related to any of the embodiments described above, or any other method or process described herein.

Some embodiments can include an apparatus comprising logic, modules, or circuitry to perform one or more elements of a method described in or related to any of the embodiments described above, or any other method or process described herein.

Some embodiments can include a method, technique, or process as described in or related to any of the embodiments described above, or portions or parts thereof.

Some embodiments can include an apparatus comprising: one or more processors and one or more computer-readable media comprising instructions that, when executed by the one or more processors, cause the one or more processors to perform the method, techniques, or process as described in or related to any of the embodiments described above, or portions thereof.

Some embodiments can include a signal as described in or related to any of the embodiments described above, or portions or parts thereof.

Some embodiments can include a signal in a wireless network as shown and described herein.

Some embodiments can include a method of communicating in a wireless network as shown and described herein.

Some embodiments can include a system for providing wireless communication as shown and described herein.

Some embodiments can include a device for providing wireless communication as shown and described herein.

Some embodiments can include an apparatus comprising means for performing one or more of the methods described above in connection with the embodiments described above.

Some embodiments can include an apparatus comprising circuitry configured to perform one or more of the methods described above in connection with the embodiments described above.

Some embodiments can include an apparatus according to any of any one of the embodiments described above, wherein the apparatus or any portion thereof is implemented in or by a user equipment (UE).

Some embodiments can include a method according to any of any one of the embodiments described above, wherein the method or any portion thereof is implemented in or by a user equipment (UE).

Some embodiments can include an apparatus according to any of any one of the embodiments described above, wherein the apparatus or any portion thereof is implemented in or by a base station (BS).

Some embodiments can include a method according to any of any one of the embodiments described above, wherein the method or any portion thereof is implemented in or by a base station (BS).

Any of the above-described embodiments may be combined with any other embodiments (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of this disclosure, the following abbreviations may apply to the examples and embodiments described herein, but are not meant to be limiting.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (for example, positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (500 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)

MAC Message authentication code (security/encryption context)

MAC-A MAC used for authentication and key agreement (TSG T WG3 context)

MAC-I MAC used for data integrity of signalling messages (TSG T WG3 context)

MANO Management and Orchestration

MBMS Multimedia Broadcast and Multicast Service

MBSFN Multimedia Broadcast multicast service Single Frequency Network

MCC Mobile Country Code

MCG Master Cell Group

MCOT Maximum Channel Occupancy Time

MCS Modulation and coding scheme

MDAF Management Data Analytics Function

MDAS Management Data Analytics Service

MDT Minimization of Drive Tests

ME Mobile Equipment

MeNB master eNB

MER Message Error Ratio

MGL Measurement Gap Length

MGRP Measurement Gap Repetition Period

MIB Master Information Block, Management Information Base

MIMO Multiple Input Multiple Output

MLC Mobile Location Centre

MM Mobility Management

MME Mobility Management Entity

MN Master Node

MO Measurement Object, Mobile Originated

MPBCH MTC Physical Broadcast CHannel

MPDCCH MTC Physical Downlink Control CHannel

MPDSCH MTC Physical Downlink Shared CHannel

MPRACH MTC Physical Random Access CHannel

MPUSCH MTC Physical Uplink Shared Channel

MPLS MultiProtocol Label Switching

MS Mobile Station

MSB Most Significant Bit

MSC Mobile Switching Centre

MSI Minimum System Information, MCH Scheduling Information

MSID Mobile Station Identifier

MSIN Mobile Station Identification Number

MSISDN Mobile Subscriber ISDN Number

MT Mobile Terminated, Mobile Termination

MTC Machine-Type Communications mMTC massive MTC, massive Machine-Type Communications MU-MIMO Multi User MIMO MWUS MTC wake-up signal, MTC WUS NACK Negative Acknowledgement NAI Network Access Identifier NAS Non-Access Stratum, Non-Access Stratum layer NCT Network Connectivity Topology NEC Network Capability Exposure NE-DC NR-E-UTRA Dual Connectivity NEF Network Exposure Function NF Network Function NFP Network Forwarding Path NFPD Network Forwarding Path Descriptor NFV Network Functions Virtualization NFVI NFV Infrastructure NFVO NFV Orchestrator NG Next Generation, Next Gen NGEN-DC NG-RAN E-UTRA-NR Dual Connectivity NM Network Manager NMS Network Management System N-PoP Network Point of Presence NMIB, N-MIB Narrowband MIB NPBCH Narrowband Physical Broadcast CHannel NPDCCH Narrowband Physical Downlink Control CHannel NPDSCH Narrowband Physical Downlink Shared CHannel NPRACH Narrowband Physical Random Access CHannel NPUSCH Narrowband Physical Uplink Shared CHannel NPSS Narrowband Primary Synchronization Signal NSSS Narrowband Secondary Synchronization Signal NR New Radio, Neighbour Relation NRF NF Repository Function NRS Narrowband Reference Signal NS Network Service NSA Non-Standalone operation mode NSD Network Service Descriptor NSR Network Service Record NSSAI 'Network Slice Selection Assistance Information S-NNSAI Single-NSSAI NSSF Network Slice Selection Function NW Network NWUS Narrowband wake-up signal, Narrowband WUS NZP Non-Zero Power O&M Operation and Maintenance ODU2 Optical channel Data Unit—type 2

OFDM Orthogonal Frequency Division Multiplexing

OFDMA Orthogonal Frequency Division Multiple Access

OOB Out-of-band

OOS Out of Sync

OPEX OPerating EXpense

OSI Other System Information

OSS Operations Support System

OTA over-the-air

PAPR Peak-to-Average Power Ratio

PAR Peak to Average Ratio

PBCH Physical Broadcast Channel

PC Power Control, Personal Computer

PCC Primary Component Carrier, Primary CC

PCell Primary Cell

PCI Physical Cell ID, Physical Cell Identity

PCEF Policy and Charging Enforcement Function

PCF Policy Control Function

PCRF Policy Control and Charging Rules Function

PDCP Packet Data Convergence Protocol, Packet Data Convergence Protocol layer

PDCCH Physical Downlink Control Channel

PDCP Packet Data Convergence Protocol

PDN Packet Data Network, Public Data Network

PDSCH Physical Downlink Shared Channel

PDU Protocol Data Unit

PEI Permanent Equipment Identifiers

PFD Packet Flow Description

P-GW PDN Gateway

PHICH Physical hybrid-ARQ indicator channel

PHY Physical layer

PLMN Public Land Mobile Network

PIN Personal Identification Number

PM Performance Measurement

PMI Precoding Matrix Indicator

PNF Physical Network Function

PNFD Physical Network Function Descriptor

PNFR Physical Network Function Record

POC PTT over Cellular

PP, PTP Point-to-Point

PPP Point-to-Point Protocol

PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC Robust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation
Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
2ES EXpected user RESponse
XOR eXclusive OR
ZC Zadoff-Chu
ZP Zero Power Exemplary Terminology For the purposes of the present document, the following terms and definitions are applicable to the examples and embodiments described herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" can include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (for example, software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and can include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which can be used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there can be one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

As described above, aspects of the present technology may include the gathering and use of data available from various sources, for example, to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (for example, vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, for example, during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (for example, date of birth, etc.), controlling the amount or specificity of data stored (for example, collecting location data a city level rather than at an address level), controlling how data is stored (for example, aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method of performing an uplink (UL) transmission in a wireless system operating on an unlicensed spectrum, the method comprising:

receiving, by a user equipment (UE), a downlink (DL) signal comprising information including a listen before talk (LBT) type jointly coded with an offset of a starting position of the UL transmission; and performing, by the UE, the UL transmission based on the LBT type and the offset, wherein the UL transmission comprises a physical uplink shared channel (PUSCH) transmission and wherein a timing advance value for a UL slot associated with the PUSCH transmission is determined as:

(a) 0, if there is a physical random access channel (PRACH) resource configured in the UL slot; and (b) an accumulated timing advance value, if there is no PRACH resource configured in the UL slot, wherein one or more symbols in a slot before the UL slot are punctured for UL shared channel (UL-SCH) symbol mapping when no PRACH resource configured in the UL slot and wherein a number of the one or more symbols is determined based on the accumulated timing advance value.

2. The method of claim 1, wherein the LBT type comprises:

a category 1 (CAT-1) LBT type;

a category 2 (CAT-2) LBT type; or a category 4 (CAT-4) LBT type.

3. The method of claim 2, wherein, when the LBT type is the CAT-1 LBT type, the performing comprises:

determining that the UL transmission is to begin no later than T microseconds (µs) after receiving the DL signal, wherein T is a number; and performing the UL transmission at or before T µs.

4. The method of claim 1, wherein the DL signal is a downlink control information (DCI) and wherein the DCI comprises a 4-bit field used for indicating at least a subset of LBT types jointly coded with offsets.

5. The method of claim 1, wherein, when the LBT type is a category 2 (CAT-2) LBT type, the performing comprises:

determining that a duration of the UL transmission will exceed a threshold; and performing the UL transmission at T microseconds (µs) after receiving the DL signal in response to determining that the duration of the UL transmission will exceed the threshold, wherein T is a number.

6. The method of claim 5, wherein the T μs is 16 μs or 25 μs and the threshold is 584 μs.

7. The method of claim 1, wherein a value of a single field in the DL signal indicates the LBT type jointly coded with the offset and the method further comprises determining the LBT type and the offset from the value of the single field.

8. The method of claim 1, wherein the information contains a jointly coded entry that is shared by a category 1 (CAT-1) LBT type and a category 2 (CAT-2) LBT type with duration of 16 μs and wherein a duration of the UL transmission is used to determine whether the LBT type indicated by the jointly coded entry is the CAT-1 LBT type or the CAT-2 LBT type with duration of 16 μs.

9. A user equipment (UE), comprising:

radio front end circuitry configured to perform wireless communication over an unlicensed spectrum; and processing circuitry configured to:

receive a downlink (DL) signal comprising information including a listen before talk (LBT) type jointly coded with an offset of a starting position of the an uplink (UL) transmission; and perform the UL transmission based on the LBT type and the offset, wherein the UL transmission comprises a physical uplink shared channel (PUSCH) transmission and wherein a timing advance value for a UL slot associated with the PUSCH transmission is determined as:

(a) 0, if there is a physical random access channel (PRACH) resource configured in the UL slot; and (b) an accumulated timing advance value, if there is no PRACH resource configured in the UL slot, wherein the information contains a jointly coded entry that is shared by a category 1 (CAT-1) LBT type and a category 2 (CAT-2) LBT type with duration of 16 μs and wherein a duration of the UL transmission is used to determine whether the LBT type indicated by the jointly coded entry is the CAT-1 LBT type or the CAT-2 LBT type with duration of 16 μs.

10. The UE of claim 9, wherein the LBT type comprises:

the CAT-1 LBT type;

the CAT-2 LBT type; or a category 4 (CAT-4) LBT type.

11. The UE of claim 10, wherein, when the LBT type is the CAT-1 LBT type, the processing circuitry is configured to:

determine that the UL transmission is to begin no later than T microseconds (μs) after receiving the DL signal, wherein T is a number; and perform the UL transmission at or before T μs.

12. The UE of claim 9, wherein the DL signal is a downlink control information (DCI) and wherein the DCI comprises a 4-bit field used for indicating at least a subset of LBT types jointly coded with offsets.

13. The UE of claim 9, wherein, when the LBT type is the CAT-2 LBT type, the processing circuitry is configured to:

determine that a duration of the UL transmission will exceed a threshold; and perform the UL transmission at T microseconds (μs) after receiving the DL signal in response to determining that the duration of the UL transmission will exceed the threshold, wherein T is a number.

14. The UE of claim 9, wherein a value of a single field in the DL signal indicates the LBT type jointly coded with the offset and the processing circuitry is further configured to determine the LBT type and the offset from the value of the single field.

15. A system for performing uplink (UL) transmission in a wireless system operating on an unlicensed spectrum, the system comprising:

an access node configured to provide a downlink (DL) signal comprising information including a listen before talk (LBT) type jointly coded with an offset of a starting position of the UL transmission, wherein a value of a single field in the DL signal indicates the LBT type jointly coded with the offset; and a user equipment (UE) configured to perform the UL transmission based on the LBT type and the offset, wherein the UE is configured to determine the LBT type and the offset from the value of the single field and wherein the UL transmission comprises a physical uplink shared channel (PUSCH) transmission and wherein a timing advance value for a UL slot associated with the PUSCH transmission is determined as:

(a) 0, if there is a physical random access channel (PRACH) resource configured in the UL slot; and (b) an accumulated timing advance value, if there is no PRACH resource configured in the UL slot.

16. The system of claim 15, wherein the LBT type comprises:

a category 1 (CAT-1) LBT type;

a category 2 (CAT-2) LBT type; or a category 4 (CAT-4) LBT type.

17. The system of claim 16, wherein, when the LBT type is the CAT-1 LBT type, the UE is configured to:

determine that the UL transmission is to begin no later than T microseconds (μs) after receiving the DL signal, wherein T is a number; and perform the UL transmission at or before T μs.

18. The system of claim 15, wherein the DL signal is a downlink control information (DCI) and wherein the DCI comprises a 4-bit field used for indicating at least a subset of LBT types jointly coded with offsets.

19. The system of claim 15, wherein, when the LBT type is a category 2 (CAT-2) LBT type, the UE is configured to:

determine that a duration of the UL transmission will exceed a threshold; and perform the UL transmission at T microseconds (μs) after receiving the DL signal in response to determining that the duration of the UL transmission will exceed the threshold, wherein T is a number.

\* \* \* \* \*